United States Patent
Frost et al.

(10) Patent No.: US 11,941,688 B2
(45) Date of Patent: Mar. 26, 2024

(54) FAMILY ACCOUNTS FOR AN ONLINE CONTENT STORAGE SHARING SERVICE

(71) Applicant: Apple Inc., Cupertino, CA (US)

(72) Inventors: Megan M. Frost, Menlo Park, CA (US); Patrick L Coffman, San Francisco, CA (US); Maria D Ioveva, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 18 days.

(21) Appl. No.: 17/020,373

(22) Filed: Sep. 14, 2020

(65) Prior Publication Data

US 2020/0410584 A1     Dec. 31, 2020

Related U.S. Application Data

(63) Continuation of application No. 14/502,937, filed on Sep. 30, 2014, now Pat. No. 10,789,642.

(60) Provisional application No. 62/005,621, filed on May 30, 2014.

(51) Int. Cl.
*G06Q 40/02*  (2023.01)
*G06Q 20/22*  (2012.01)

(52) U.S. Cl.
CPC .......... *G06Q 40/02* (2013.01); *G06Q 20/227* (2013.01)

(58) Field of Classification Search
None
See application file for complete search history.

(56) References Cited

U.S. PATENT DOCUMENTS

| 5,483,261 A | 1/1996 | Yasutake |
| 5,488,204 A | 1/1996 | Mead et al. |
| 5,825,352 A | 10/1998 | Bisset et al. |

(Continued)

FOREIGN PATENT DOCUMENTS

| CN | 101339500 A | 1/2009 |
| CN | 102667841 A | 9/2012 |

(Continued)

OTHER PUBLICATIONS

Final Office Action received for U.S. Appl. No. 14/502,981, dated Oct. 15, 2020, 36 pages.

(Continued)

*Primary Examiner* — Christopher Bridges
(74) *Attorney, Agent, or Firm* — Kubota Basol LLP

(57) ABSTRACT

A computing device provides methods and workflow for setting up a shared family account on a content storage system, including the creation of accounts for child family members. A computing device supports the creation of a family account using an account on the content storage system associated with an adult family member acting as a family organizer. The family organizer can designate a specific account as a purchase account for allowing other family member to purchase content from content servers associated with the content storage system. The family organizer can invite other adult family members to join the shared family account. The family organizer can create new accounts on the content storage system for child family members, and can designate access and purchase restrictions for such child family members. Family members have access to shared storage content, as well as services such as family calendar, group messaging, and device location.

9 Claims, 44 Drawing Sheets

(56) References Cited

U.S. PATENT DOCUMENTS

| | | | |
|---|---|---|---|
| 5,835,079 A | 11/1998 | Shieh |
| 5,880,411 A | 3/1999 | Gillespie et al. |
| 6,108,735 A | 8/2000 | Pawlowski |
| 6,188,391 B1 | 2/2001 | Seely et al. |
| 6,230,204 B1 | 5/2001 | Fleming, III |
| 6,310,610 B1 | 10/2001 | Beaton et al. |
| 6,323,846 B1 | 11/2001 | Westerman et al. |
| 6,570,557 B1 | 5/2003 | Westerman et al. |
| 6,677,932 B1 | 1/2004 | Westerman |
| 6,678,824 B1 | 1/2004 | Cannon et al. |
| 6,690,387 B2 | 2/2004 | Zimmerman et al. |
| 6,769,127 B1 | 7/2004 | Bonomi et al. |
| 6,785,889 B1 | 8/2004 | Williams |
| 7,015,894 B2 | 3/2006 | Morohoshi |
| 7,184,064 B2 | 2/2007 | Zimmerman et al. |
| 7,218,226 B2 | 5/2007 | Wehrenberg |
| 7,434,713 B1 | 10/2008 | Linden |
| 7,614,008 B2 | 11/2009 | Ording |
| 7,627,652 B1 | 12/2009 | Commons et al. |
| 7,633,076 B2 | 12/2009 | Huppi et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,688,306 B2 | 3/2010 | Wehrenberg et al. |
| 7,814,055 B2 | 10/2010 | Hullot et al. |
| 7,822,713 B2 | 10/2010 | Hullot et al. |
| 7,844,914 B2 | 11/2010 | Andre et al. |
| 7,895,661 B2 | 2/2011 | Dowdy et al. |
| 7,899,714 B2 | 3/2011 | Robbin et al. |
| 7,957,762 B2 | 6/2011 | Herz et al. |
| 8,006,002 B2 | 8/2011 | Kalayjian et al. |
| 8,020,105 B1 | 9/2011 | Lemay et al. |
| 8,201,224 B1 | 6/2012 | Spertus |
| 8,239,784 B2 | 8/2012 | Hotelling et al. |
| 8,279,180 B2 | 10/2012 | Hotelling et al. |
| 8,285,810 B2 * | 10/2012 | Svendsen .......... G06F 16/24556 |
| | | | 709/205 |
| 8,352,873 B2 | 1/2013 | Craig et al. |
| 8,381,135 B2 | 2/2013 | Hotelling et al. |
| 8,468,580 B1 | 6/2013 | Casey et al. |
| 8,479,122 B2 | 7/2013 | Hotelling et al. |
| 8,538,458 B2 | 9/2013 | Haney |
| 8,554,861 B2 | 10/2013 | Christie et al. |
| 8,713,535 B2 | 4/2014 | Malhotra et al. |
| 8,812,994 B2 | 8/2014 | Seymour et al. |
| 8,825,036 B2 | 9/2014 | Kemery |
| 9,129,135 B2 | 9/2015 | Hoefel et al. |
| 9,137,389 B2 | 9/2015 | Neal et al. |
| 9,172,705 B1 | 10/2015 | Kong et al. |
| 9,213,845 B1 | 12/2015 | Taraki et al. |
| 9,270,760 B2 | 2/2016 | Heinberg |
| 9,292,882 B2 * | 3/2016 | Blinder .................. G06Q 30/02 |
| 9,294,460 B1 | 3/2016 | Thomas |
| 9,348,458 B2 | 5/2016 | Hotelling et al. |
| 9,473,419 B2 | 10/2016 | Brand |
| 9,557,889 B2 * | 1/2017 | Raleigh ................ H04M 15/46 |
| 9,626,720 B2 | 4/2017 | Robbin et al. |
| 9,654,598 B1 | 5/2017 | Crawford et al. |
| 9,755,842 B2 | 9/2017 | Raleigh et al. |
| 9,769,310 B2 | 9/2017 | Hodge |
| 9,870,238 B2 | 1/2018 | Astete et al. |
| 9,875,346 B2 | 1/2018 | Pitschel et al. |
| 9,933,937 B2 | 4/2018 | Lemay et al. |
| 9,935,956 B1 | 4/2018 | Cha et al. |
| 10,122,723 B1 | 11/2018 | Chang et al. |
| 10,243,824 B2 | 3/2019 | Zalmanovitch et al. |
| 2002/0015024 A1 | 2/2002 | Westerman et al. |
| 2002/0049806 A1 * | 4/2002 | Gatz ...................... G06F 21/62 |
| | | | 709/224 |
| 2002/0065919 A1 | 5/2002 | Taylor et al. |
| 2003/0028622 A1 | 2/2003 | Inoue et al. |
| 2003/0061111 A1 * | 3/2003 | Dutta .................. G06Q 30/0601 |
| | | | 705/26.1 |
| 2003/0112874 A1 | 6/2003 | Rabinowitz et al. |
| 2004/0015985 A1 | 1/2004 | Kweon |
| 2004/0034853 A1 | 2/2004 | Gibbons et al. |
| 2004/0127197 A1 | 7/2004 | Roskind |
| 2004/0133793 A1 | 7/2004 | Ginter et al. |
| 2004/0236650 A1 | 11/2004 | Zapiec et al. |
| 2005/0060412 A1 | 3/2005 | Chebolu et al. |
| 2005/0190059 A1 | 9/2005 | Wehrenberg |
| 2005/0273399 A1 | 12/2005 | Soma et al. |
| 2006/0017692 A1 | 1/2006 | Wehrenberg et al. |
| 2006/0026521 A1 | 2/2006 | Hotelling et al. |
| 2006/0033724 A1 | 2/2006 | Chaudhri et al. |
| 2006/0150240 A1 | 7/2006 | Robinson et al. |
| 2006/0197753 A1 | 9/2006 | Hotelling |
| 2006/0265192 A1 | 11/2006 | Turicchi |
| 2007/0261030 A1 | 11/2007 | Wadhwa |
| 2008/0005319 A1 | 1/2008 | Anderholm et al. |
| 2008/0109319 A1 * | 5/2008 | Foss .................. G06Q 20/3676 |
| | | | 705/17 |
| 2008/0134295 A1 * | 6/2008 | Bailey ..................... G06F 21/30 |
| | | | 726/4 |
| 2008/0154903 A1 | 6/2008 | Crowley et al. |
| 2009/0064314 A1 | 3/2009 | Lee |
| 2009/0086010 A1 | 4/2009 | Tiphane |
| 2009/0150545 A1 | 6/2009 | Flores et al. |
| 2009/0197569 A1 | 8/2009 | Gaznaghi et al. |
| 2009/0254656 A1 | 10/2009 | Vignisson et al. |
| 2009/0300671 A1 | 12/2009 | Scott et al. |
| 2010/0077036 A1 | 3/2010 | Deluca et al. |
| 2010/0146384 A1 | 6/2010 | Peev et al. |
| 2010/0146607 A1 | 6/2010 | Piepenbrink et al. |
| 2010/0188579 A1 | 7/2010 | Friedman |
| 2010/0191575 A1 | 7/2010 | Raleigh |
| 2010/0205656 A1 | 8/2010 | Fein et al. |
| 2010/0302182 A1 | 12/2010 | Wei et al. |
| 2010/0306163 A1 | 12/2010 | Beaty et al. |
| 2010/0312696 A1 | 12/2010 | Sinha et al. |
| 2011/0055735 A1 | 3/2011 | Wood et al. |
| 2011/0065419 A1 | 3/2011 | Book et al. |
| 2011/0078767 A1 | 3/2011 | Cai et al. |
| 2011/0108622 A1 | 5/2011 | Das et al. |
| 2011/0242002 A1 | 10/2011 | Kaplan et al. |
| 2011/0295727 A1 | 12/2011 | Ferris et al. |
| 2011/0302182 A1 | 12/2011 | Crawford |
| 2012/0014516 A1 | 1/2012 | Nies |
| 2012/0036552 A1 | 2/2012 | Dare et al. |
| 2012/0047024 A1 | 2/2012 | Urban et al. |
| 2012/0101952 A1 | 4/2012 | Raleigh et al. |
| 2012/0117478 A1 | 5/2012 | Vadde et al. |
| 2012/0173356 A1 * | 7/2012 | Fan .................... H04N 21/2743 |
| | | | 705/26.1 |
| 2012/0210444 A1 | 8/2012 | Yabe et al. |
| 2012/0265803 A1 | 10/2012 | Ha et al. |
| 2012/0291101 A1 | 11/2012 | Ahlstrom et al. |
| 2012/0317609 A1 | 12/2012 | Carrara et al. |
| 2012/0331568 A1 * | 12/2012 | Weinstein .............. H04L 12/185 |
| | | | 726/29 |
| 2013/0017806 A1 | 1/2013 | Sprigg et al. |
| 2013/0018960 A1 | 1/2013 | Knysz et al. |
| 2013/0031191 A1 | 1/2013 | Bott |
| 2013/0060616 A1 | 3/2013 | Block et al. |
| 2013/0065555 A1 | 3/2013 | Baker et al. |
| 2013/0073654 A1 * | 3/2013 | Cohen .................... G06Q 10/10 |
| | | | 709/206 |
| 2013/0080522 A1 | 3/2013 | Ren |
| 2013/0083059 A1 | 4/2013 | Hwang et al. |
| 2013/0086169 A1 | 4/2013 | Bruich et al. |
| 2013/0088650 A1 | 4/2013 | Rouady et al. |
| 2013/0143521 A1 | 6/2013 | Hernandez et al. |
| 2013/0169546 A1 | 7/2013 | Thomas et al. |
| 2013/0174100 A1 | 7/2013 | Seymour et al. |
| 2013/0227675 A1 | 8/2013 | Fujioka |
| 2013/0231093 A1 | 9/2013 | Toy et al. |
| 2013/0254288 A1 | 9/2013 | Harrison |
| 2013/0254660 A1 | 9/2013 | Fujioka |
| 2013/0311597 A1 | 11/2013 | Arrouye et al. |
| 2014/0009378 A1 | 1/2014 | Chew |
| 2014/0045472 A1 | 2/2014 | Sharma et al. |
| 2014/0068755 A1 | 3/2014 | King et al. |
| 2014/0113593 A1 | 4/2014 | Zhou et al. |
| 2014/0136607 A1 | 5/2014 | Ou et al. |

(56) References Cited

U.S. PATENT DOCUMENTS

| | | |
|---|---|---|
| 2014/0150068 A1 | 5/2014 | Janzer |
| 2014/0162595 A1 | 6/2014 | Raleigh et al. |
| 2014/0237235 A1 | 8/2014 | Kuno et al. |
| 2014/0248852 A1 | 9/2014 | Raleigh et al. |
| 2014/0281997 A1 | 9/2014 | Fleizach et al. |
| 2014/0289866 A1 | 9/2014 | Beck et al. |
| 2014/0298207 A1 | 10/2014 | Ittah et al. |
| 2014/0320398 A1 | 10/2014 | Papstein |
| 2014/0325407 A1 | 10/2014 | Morris et al. |
| 2014/0330945 A1 | 11/2014 | Dabbiere et al. |
| 2014/0331314 A1 | 11/2014 | Fujioka |
| 2014/0337997 A1 | 11/2014 | Beck et al. |
| 2014/0344951 A1 | 11/2014 | Brewer |
| 2014/0351952 A1 | 11/2014 | Gopu |
| 2014/0364056 A1 | 12/2014 | Belk et al. |
| 2015/0006723 A1 | 1/2015 | Sheth et al. |
| 2015/0049018 A1 | 2/2015 | Gomez |
| 2015/0056974 A1 | 2/2015 | Kim et al. |
| 2015/0106833 A1 | 4/2015 | Kang et al. |
| 2015/0153928 A1 | 6/2015 | Chen et al. |
| 2015/0269547 A1 | 9/2015 | Fan et al. |
| 2015/0323974 A1 | 11/2015 | Shuster et al. |
| 2015/0334118 A1 | 11/2015 | Yuan et al. |
| 2015/0341484 A1 | 11/2015 | Yablokov et al. |
| 2015/0341506 A1 | 11/2015 | Mirza et al. |
| 2015/0348032 A1 | 12/2015 | Ioveva et al. |
| 2015/0348185 A1 | 12/2015 | Frost et al. |
| 2015/0350215 A1 | 12/2015 | Shi et al. |
| 2015/0370428 A1 | 12/2015 | Chan et al. |
| 2015/0373295 A1 | 12/2015 | Outters |
| 2016/0050194 A1 | 2/2016 | Rachmiel |
| 2016/0080510 A1 | 3/2016 | Dawoud et al. |
| 2016/0094538 A1 | 3/2016 | Dabbiere et al. |
| 2016/0094881 A1 | 3/2016 | Khatua |
| 2016/0127210 A1 | 5/2016 | Noureddin et al. |
| 2016/0139752 A1 | 5/2016 | Shim et al. |
| 2016/0188821 A1 | 6/2016 | Ozeran |
| 2016/0198322 A1 | 7/2016 | Pitis |
| 2016/0232336 A1 | 8/2016 | Pitschel et al. |
| 2016/0292060 A1 | 10/2016 | Mathew et al. |
| 2016/0323191 A1 | 11/2016 | Aoki |
| 2016/0330078 A1 | 11/2016 | Bostick et al. |
| 2016/0342290 A1 | 11/2016 | Mathur et al. |
| 2016/0349932 A1 | 12/2016 | Gorny |
| 2016/0357394 A1 | 12/2016 | Tae et al. |
| 2016/0373588 A1 | 12/2016 | Raleigh et al. |
| 2017/0010794 A1 | 1/2017 | Cho et al. |
| 2017/0019858 A1 | 1/2017 | Zhao et al. |
| 2017/0034228 A1 | 2/2017 | Grossman et al. |
| 2017/0053129 A1 | 2/2017 | Arif et al. |
| 2017/0055110 A1 | 2/2017 | Tian et al. |
| 2017/0068822 A1 | 3/2017 | Cave |
| 2017/0149795 A1 | 5/2017 | Day, II |
| 2017/0180494 A1 | 6/2017 | Agrawal et al. |
| 2017/0201850 A1 | 7/2017 | Raleigh et al. |
| 2017/0251268 A1 | 8/2017 | Zhao |
| 2017/0279971 A1 | 9/2017 | Raleigh et al. |
| 2017/0295258 A1 | 10/2017 | Raleigh et al. |
| 2018/0018252 A1 | 1/2018 | Farrell et al. |
| 2018/0046818 A1 | 2/2018 | Amacker et al. |
| 2018/0060102 A1 | 3/2018 | Zhu et al. |
| 2018/0224915 A1 | 8/2018 | Shuster et al. |
| 2018/0242036 A1 | 8/2018 | Watanabe et al. |
| 2018/0276353 A1 | 9/2018 | Pitschel et al. |
| 2018/0324567 A1 | 11/2018 | Mao |
| 2018/0332178 A1 | 11/2018 | Ni et al. |
| 2018/0343306 A1 | 11/2018 | Lotter et al. |
| 2019/0028548 A1 | 1/2019 | Auer et al. |
| 2019/0037037 A1 | 1/2019 | Umeya et al. |
| 2019/0081949 A1 | 3/2019 | Wu et al. |
| 2019/0082227 A1 | 3/2019 | Zhao |
| 2019/0124065 A1 | 4/2019 | Hodge |
| 2019/0220290 A1 | 7/2019 | Yu |
| 2019/0347180 A1 | 11/2019 | Cranfill et al. |
| 2019/0347181 A1 | 11/2019 | Cranfill et al. |
| 2020/0358765 A1 | 11/2020 | Olsen et al. |
| 2020/0382637 A1 | 12/2020 | Cranfill et al. |
| 2021/0109836 A1 | 4/2021 | Cranfill et al. |
| 2022/0261460 A1 | 8/2022 | Pitschel et al. |
| 2022/0303387 A1 | 9/2022 | Cranfill et al. |
| 2023/0153898 A1 | 5/2023 | Frost et al. |

FOREIGN PATENT DOCUMENTS

| | | |
|---|---|---|
| CN | 102934467 A | 2/2013 |
| CN | 103294965 A | 9/2013 |
| CN | 104471521 A | 3/2015 |
| CN | 104487929 A | 4/2015 |
| CN | 104636645 A | 5/2015 |
| CN | 105308634 A | 2/2016 |
| CN | 105321096 A | 2/2016 |
| CN | 105389078 A | 3/2016 |
| CN | 106415431 A | 2/2017 |
| CN | 106415476 A | 2/2017 |
| CN | 107533368 A | 1/2018 |
| CN | 107637055 A | 1/2018 |
| EP | 2429183 A1 | 3/2012 |
| EP | 2801925 A1 | 11/2014 |
| EP | 2860608 A1 | 4/2015 |
| JP | 2000-163031 A | 6/2000 |
| JP | 2001-218976 A | 8/2001 |
| JP | 2002-342033 A | 11/2002 |
| JP | 2007-125338 A | 5/2007 |
| JP | 2009-171115 A | 7/2009 |
| JP | 2012-511282 A | 5/2012 |
| JP | 2013-85236 A | 5/2013 |
| JP | 2014-502383 A | 1/2014 |
| JP | 2016-13151 A | 1/2016 |
| JP | 2016-517598 A | 6/2016 |
| JP | 2017-534934 A | 11/2017 |
| KR | 10-2011-0024212 A | 3/2011 |
| KR | 10-2011-0063466 A | 6/2011 |
| KR | 10-2014-0088459 A | 7/2014 |
| KR | 101560760 B1 | 10/2015 |
| WO | 2007/064200 A1 | 6/2007 |
| WO | 2011/163481 A2 | 12/2011 |
| WO | 2012/047932 A2 | 4/2012 |
| WO | 2013/169849 A2 | 11/2013 |
| WO | 2014/105276 A1 | 7/2014 |
| WO | 2014/144908 A1 | 9/2014 |
| WO | 2015/010111 A1 | 1/2015 |

OTHER PUBLICATIONS

Final Office Action received for U.S. Appl. No. 15/875,934, dated Aug. 21, 2020, 11 pages.
Non-Final Office Action received for U.S. Appl. No. 16/179,106, dated Jul. 27, 2020, 15 pages.
Notice of Allowance received for U.S. Appl. No. 16/147,069, dated Aug. 19, 2020, 8 pages.
Corrected Notice of Allowance received for U.S. Appl. No. 16/179,106, dated Jan. 13, 2021, 2 pages.
Non-Final Office Action received for U.S. Appl. No. 15/875,934, dated Feb. 4, 2021, 12 pages.
Non-Final Office Action received for U.S. Appl. No. 16/888,543, dated Feb. 17, 2021, 14 pages.
Search Report received for Chinese Patent Application No. 201811616437.2, dated Jan. 28, 2021, 4 pages (2 page of English Translation and 2 pages of Official Copy).
International Search Report received for PCT Patent Application No. PCT/US2020/035430, dated Oct. 28, 2020, 5 pages.
Invitation to Pay Additional Fees received for PCT Patent Application No. PCT/US2019/029214, mailed on Aug. 14, 2019, 16 pages.
Invitation to Pay Additional Fees received for PCT Patent Application No. PCT/US2020/035430, mailed on Sep. 7, 2020, 12 pages.
Notice of Allowance received for U.S. Appl. No. 16/179,106, dated Dec. 17, 2020, 8 pages.
Search Report received for Chinese Patent Application No. 201780013393.1, dated Dec. 2, 2020, 4 pages (2 pages of English Translation and 2 pages of Official Copy).

(56) References Cited

OTHER PUBLICATIONS

Check your Apple ID device list to see where you're signed in, Apple Support, Available online at: <https://support.apple.com/en-us/HT205064>, Mar. 7, 2018, 4 pages.
Extended Search Report received for European Patent Application No. 17756993.6, dated Oct. 4, 2019, 7 pages.
Final Office Action received for U.S. Appl. No. 14/502,937, dated Aug. 9, 2019, 11 pages.
Final Office Action received for U.S. Appl. No. 14/502,937, dated May 10, 2018, 23 pages.
Final Office Action received for U.S. Appl. No. 14/502,981, dated Dec. 28, 2018, 29 pages.
Final Office Action received for U.S. Appl. No. No. 14/502,981, mailed on Oct. 12, 2017, 22 pages.
Final Office Action received for U.S. Appl. No. 14/683,093, dated Dec. 15, 2016, 11 pages.
Final Office Action received for U.S. Appl. No. 15/274,887 dated Jan. 5, 2018, 17 pages.
Final Office Action received for U.S. Appl. No. 15/875,934, dated Aug. 8, 2019, 11 pages.
Final Office Action received for U.S. Appl. No. 16/179,106, dated Mar. 6, 2020, 12 pages.
International Search Report received for PCT Patent Application No. PCT/US2015/023406, dated Jun. 26, 2015, 3 pages.
International Search Report received for PCT Patent Application No. PCT/US2019/029214, dated Nov. 4, 2019, 6 pages.
My Data Manager Track your Mobile Data Usage and Save Money, AppPicker, Aug. 18, 2015, 4 pages.
Non-Final Office Action received for U.S. Appl. No. 14/502,937, dated Aug. 14, 2017, 19 pages.
Non-Final Office Action received for U.S. Appl. No. 14/502,937, dated Dec. 14, 2018, 24 pages.
Non-Final Office Action received for U.S. Appl. No. 14/502,981, dated Apr. 3, 2020, 42 pages.
Non-Final Office Action received for U.S. Appl. No. 14/502,981, dated Apr. 11, 2018, 20 pages.
Non-Final Office Action received for U.S. Appl. No. 14/502,981, dated Feb. 14, 2017, 17 pages.
Non-Final Office Action received for U.S. Appl. No. 14/683,093, dated Apr. 20, 2017, 11 pages.
Non-Final Office Action received for U.S. Appl. No. 14/683,093, dated May 5, 2016, 12 pages.
Non-Final Office Action received for U.S. Appl. No. 15/274,887 dated Jun. 23, 2017, 16 pages.
Non-Final Office Action received for U.S. Appl. No. 15/875,934, dated Jan. 23, 2020, 11 pages.
Non-Final Office Action received for U.S. Appl. No. 15/875,934, dated Nov. 30, 2018, 12 pages.
Non-Final Office Action received for U.S. Appl. No. 16/147,069, dated Jan. 6, 2020, 29 pages.
Non-Final Office Action received for U.S. Appl. No. 16/147,108, dated Mar. 22, 2019, 17 pages.
Non-Final Office Action received for U.S. Appl. No. 16/179,106, dated Oct. 23, 2019, 10 pages.
Notice of Allowance received for U.S. Appl. No. 14/502,937, dated Jul. 27, 2020, 4 pages.
Notice of Allowance received for U.S. Appl. No. 14/502,937, dated May 14, 2020, 20 pages.
Notice of Allowance received for U.S. Appl. No. 14/683,093, dated Sep. 6, 2017, 12 pages.
Notice of Allowance received for U.S. Appl. No. 15/274,887 dated Jul. 20, 2018, 10 pages.
Notice of Allowance received for U.S. Appl. No. 15/875,934, dated Nov. 25, 2019, 8 pages.
Notice of Allowance received for U.S. Appl. No. 16/147,069, dated Apr. 29, 2020, 8 pages.
Notice of Allowance received for U.S. Appl. No. 16/147,108, dated Sep. 26, 2019, 28 pages.
Restriction Requirement received for U.S. Appl. No. 14/502,937, dated Feb. 14, 2017, 6 pages.
Search Report received for Danish Patent Application No. PA201870341, Completed on Sep. 6, 2018, 4 pages.
Search Report received for Danish Patent Application No. PA201870345, Completed on Aug. 28, 2018, 4 pages.
Golightly Daniel, "Google Is Taking Steps in Search of "Digital Wellbeing"—I/O 2018", Google Blog, Available Online at: <https://www.androidheadlines.com/2018/05/google-is-taking-steps-in-search-of-digital-wellbeing-i-o-2018.html>, May 8, 2018, 3 pages.
Koester Mark, "Moment: Automatic Track and Know Your iPhone Usage", Minding the Borderlands, Available online at: <http://www.markwk.com/2016/11/iphone-tracking-with-moment.html>, Jan. 30, 2018, 6 pages.
Langer Christina, "How to Disable Gmail Notifications on Android", Available online at: <https://ccm.net/faq/35590-how-to-disable-gmail-notifications-on-android>, Mar. 6, 2018, 2 pages.
Lee et al., "A Multi-Touch Three Dimensional Touch-Sensitive Tablet", CHI'85 Proceedings, Apr. 1985, pp. 21-25.
Nam Luke, "Live in the Moment (app review)", deTeched, Available online at: <http://www.deteched.com/2017/11/20/live-moment-app-review/amp/>, Dec. 6, 2017, 5 pages.
Rubine Dean, "Combining Gestures and Direct Manipulation", CHI'9, May 3-7, 1992, pp. 659-660.
Rubine Dean H., "The Automatic Recognition of Gestures", CMU-CS-91-202, Submitted in Partial Fulfillment of the Requirements for the Degree of Doctor of Philosophy in Computer Science at Carnegie Mellon Univeristy, Dec. 1991, 285 pages.
Westerman Wayne, "Hand Tracking, Finger Identification, and Chordic Manipulation on a Multi-Touch Surface", A Dissertation Submitted to the Faculty of the University of Deleware in Partial Fulfillment of the Requirements for the Degree of Philosophy in Electrical Engineering, 1999, 363 pages.
Non-Final Office Action received for U.S. Appl. No. 17/127,779, dated Jul. 21, 2022, 35 Pages.
Examiner's Answer to Appeal Brief received for U.S. Appl. No. 14/502,981, dated Jan. 12, 2022, 12 pages.
Extended European Search Report received for European Patent Application No. 20209029.6, dated Jul. 16, 2021, 10 pages.
Extended European Search Report received for European Patent Application No. 21180955.3, dated Jul. 14, 2021, 4 pages.
Notice of Allowance received for U.S. Appl. No. 16/888,543, dated Feb. 11, 2022, 5 pages.
Notice of Allowance received for U.S. Appl. No. 16/888,543, dated Oct. 7, 2021, 5 pages.
Notice of Allowance received for U.S. Appl. No. 15/875,934, dated Jul. 30, 2021, 9 pages.
Search Report Received for Chinese Patent Application No. 202111610141.1 dated Apr. 15, 2022, 4 Pages (2 Pages of English Translation and 2 Pages of Official Copy).
Final Office Action received for U.S. Appl. No. 17/127,779, dated Apr. 26, 2023, 36 pages.
Non-Final Office Action received for U.S. Appl. No. 17/456,803, dated Dec. 6, 2022, 16 pages.
Notice of Allowance received for U.S. Appl. No. 17/456,803, dated Mar. 16, 2023, 9 pages.
International Search Report received for PCT Patent Application No. PCT/US2017/017525 dated Apr. 28, 2017, 3 pages.
Search Report received for Chinese Patent Application No. 202110862930.8, dated Sep. 1, 2023, 5 pages (3 pages of English Translation and 2 Pages of Official Copy).

* cited by examiner

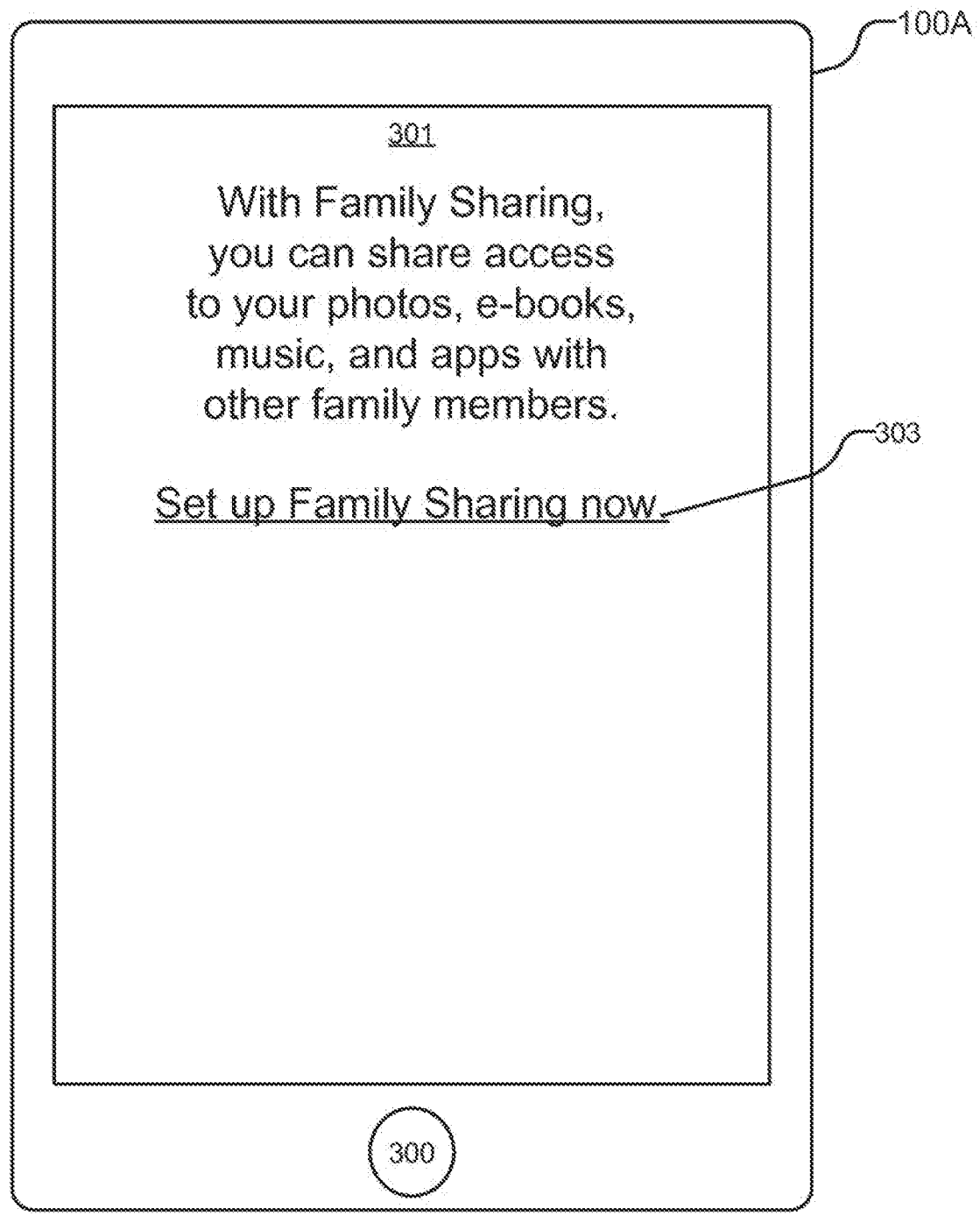
FIG. 3.1

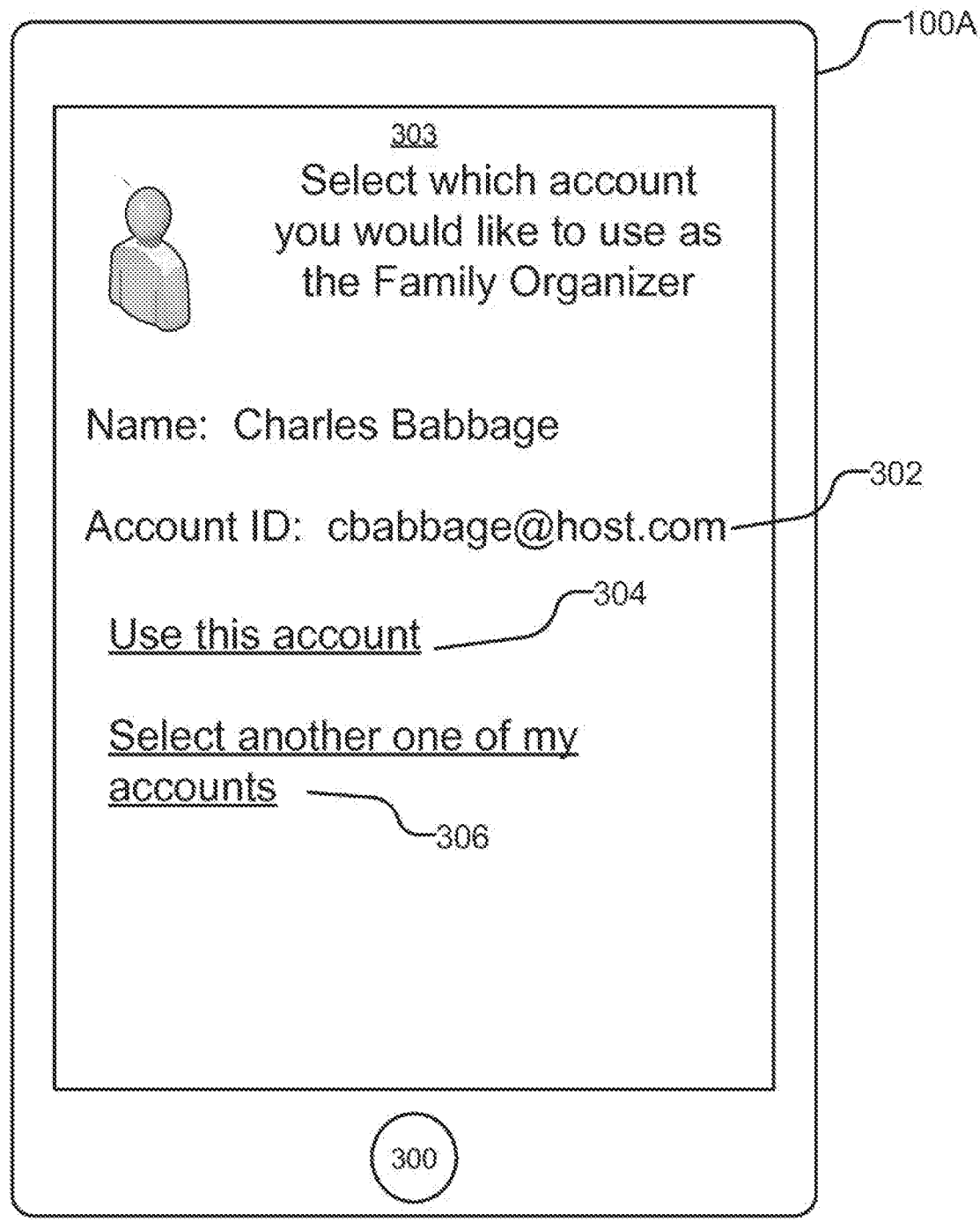
FIG. 3.2

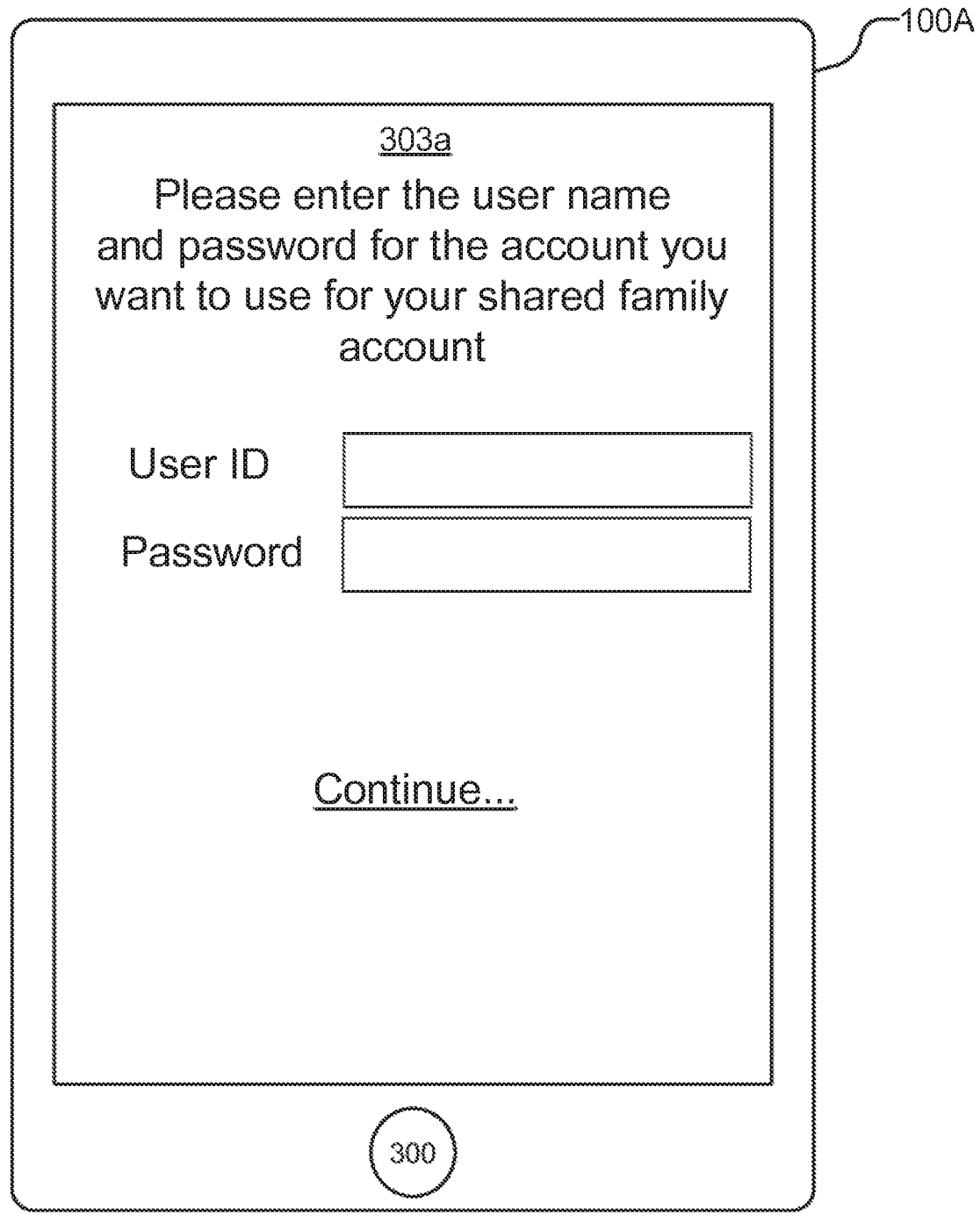
FIG. 3.2a

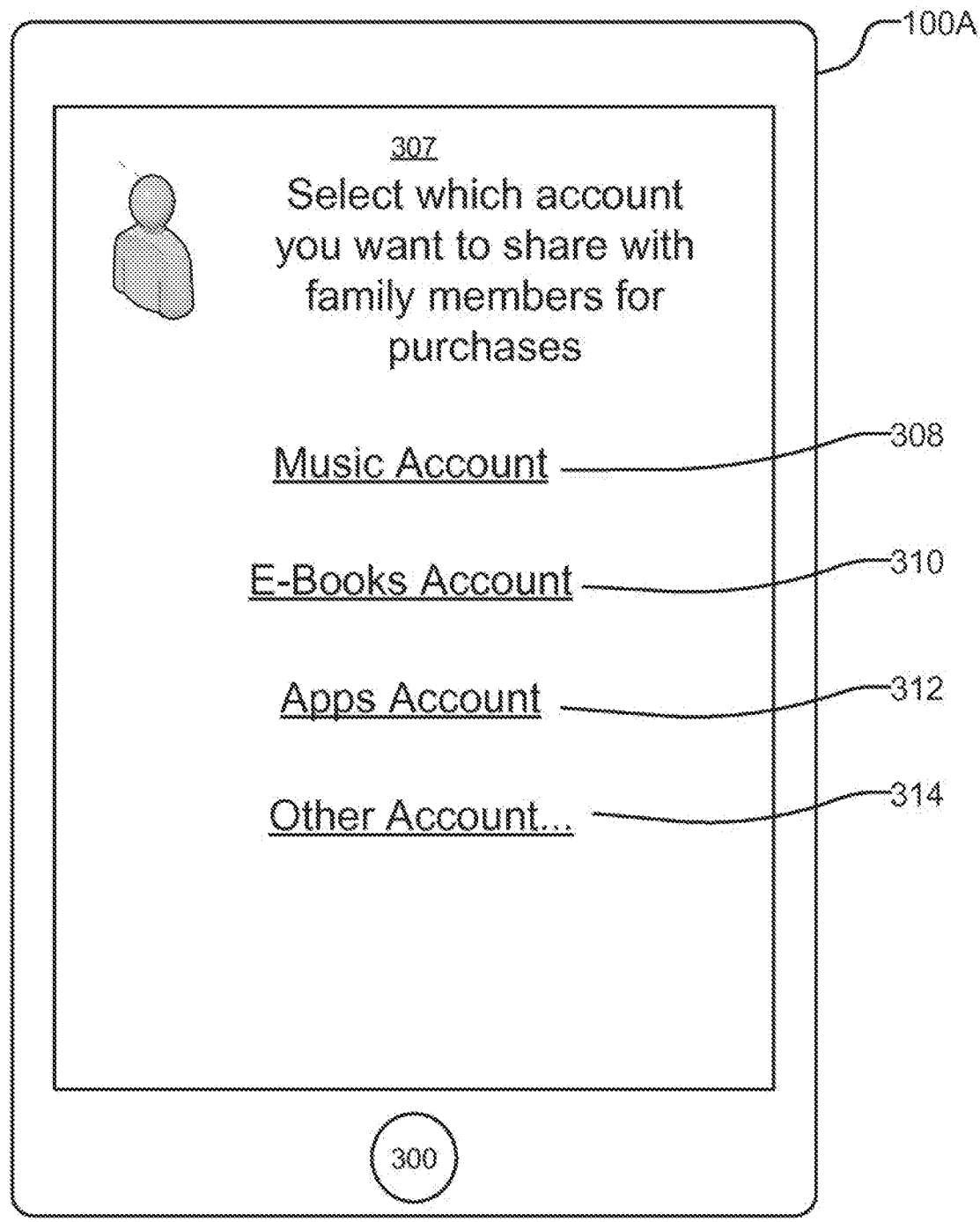
FIG. 3.3

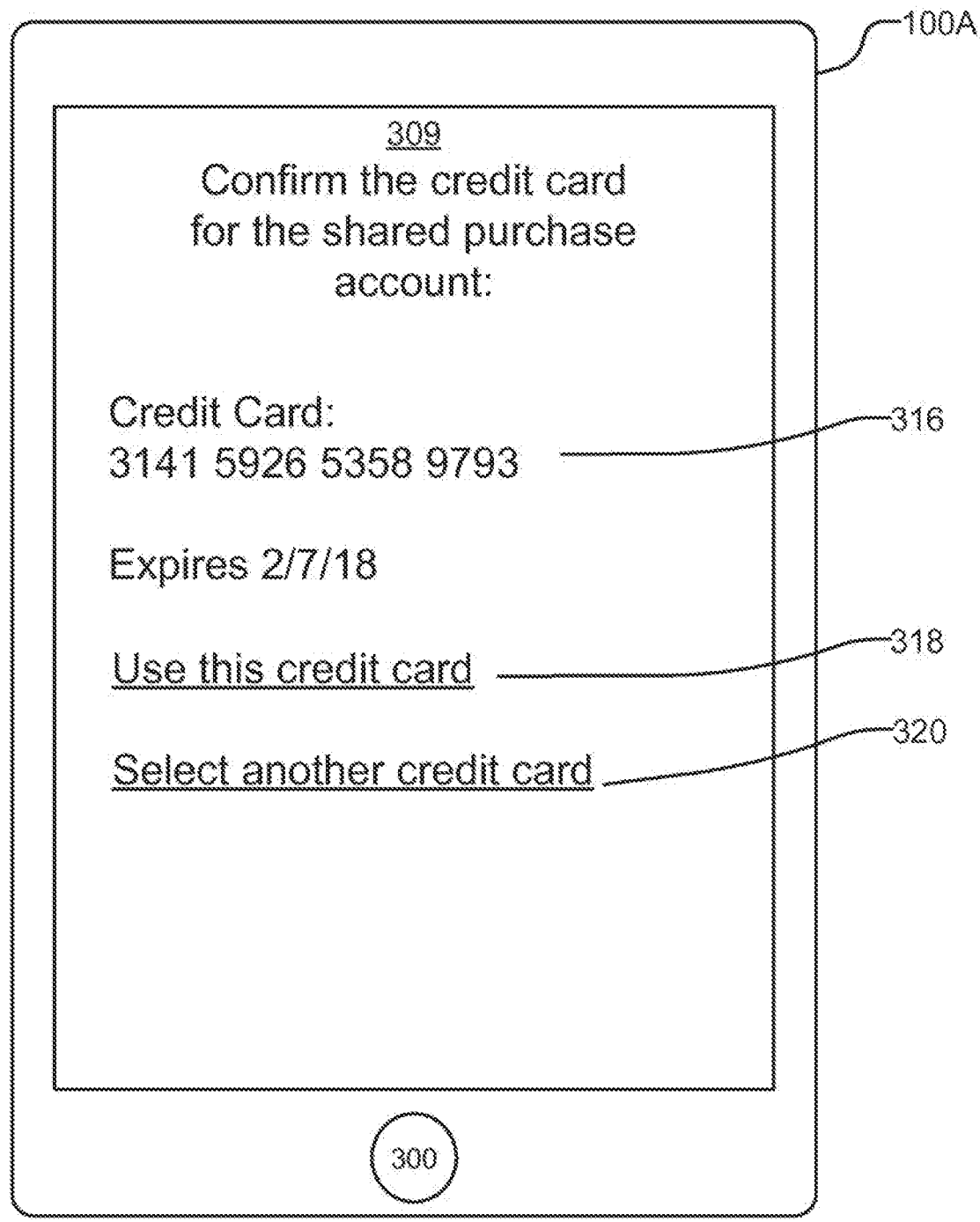
FIG. 3.4

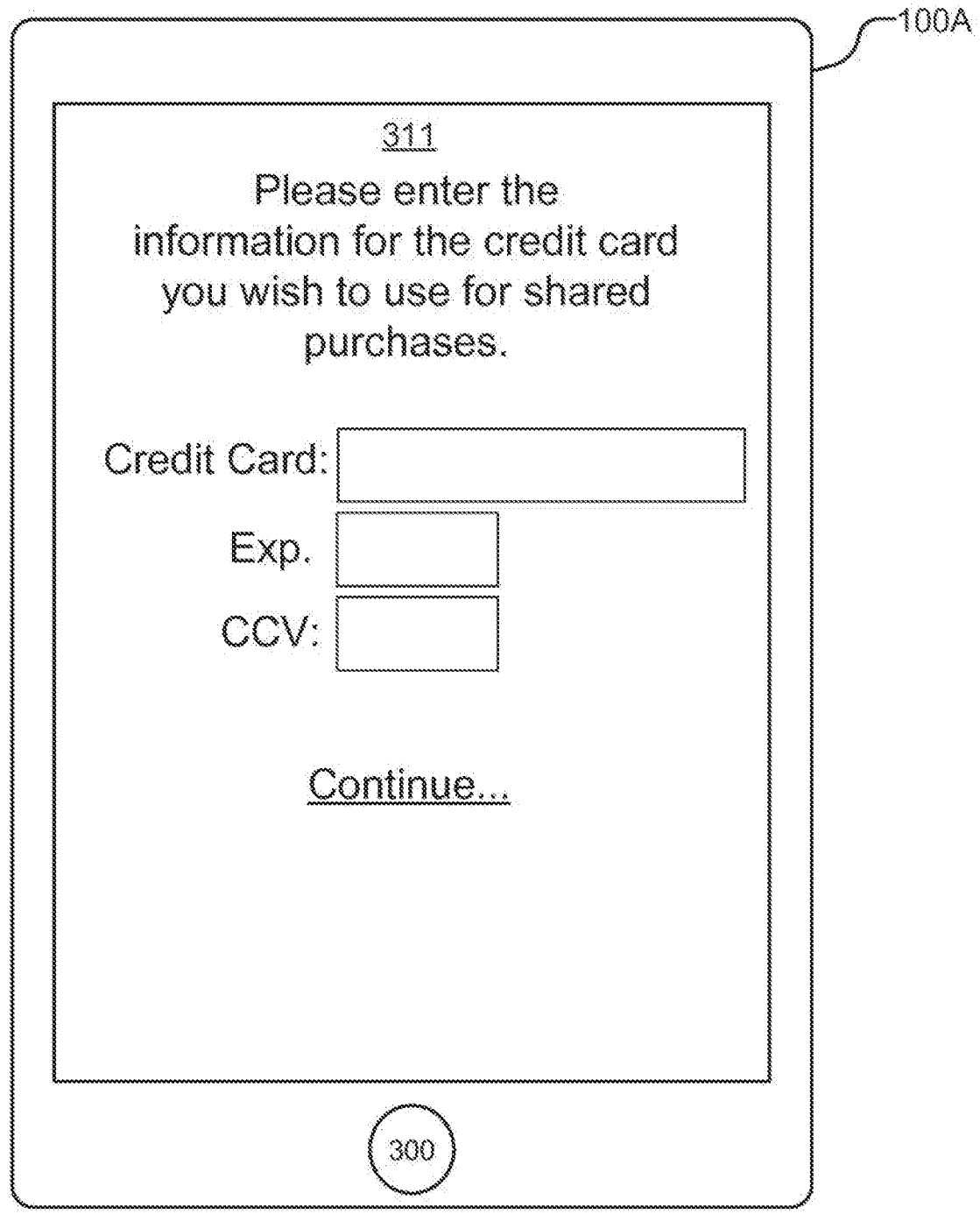
FIG. 3.4a

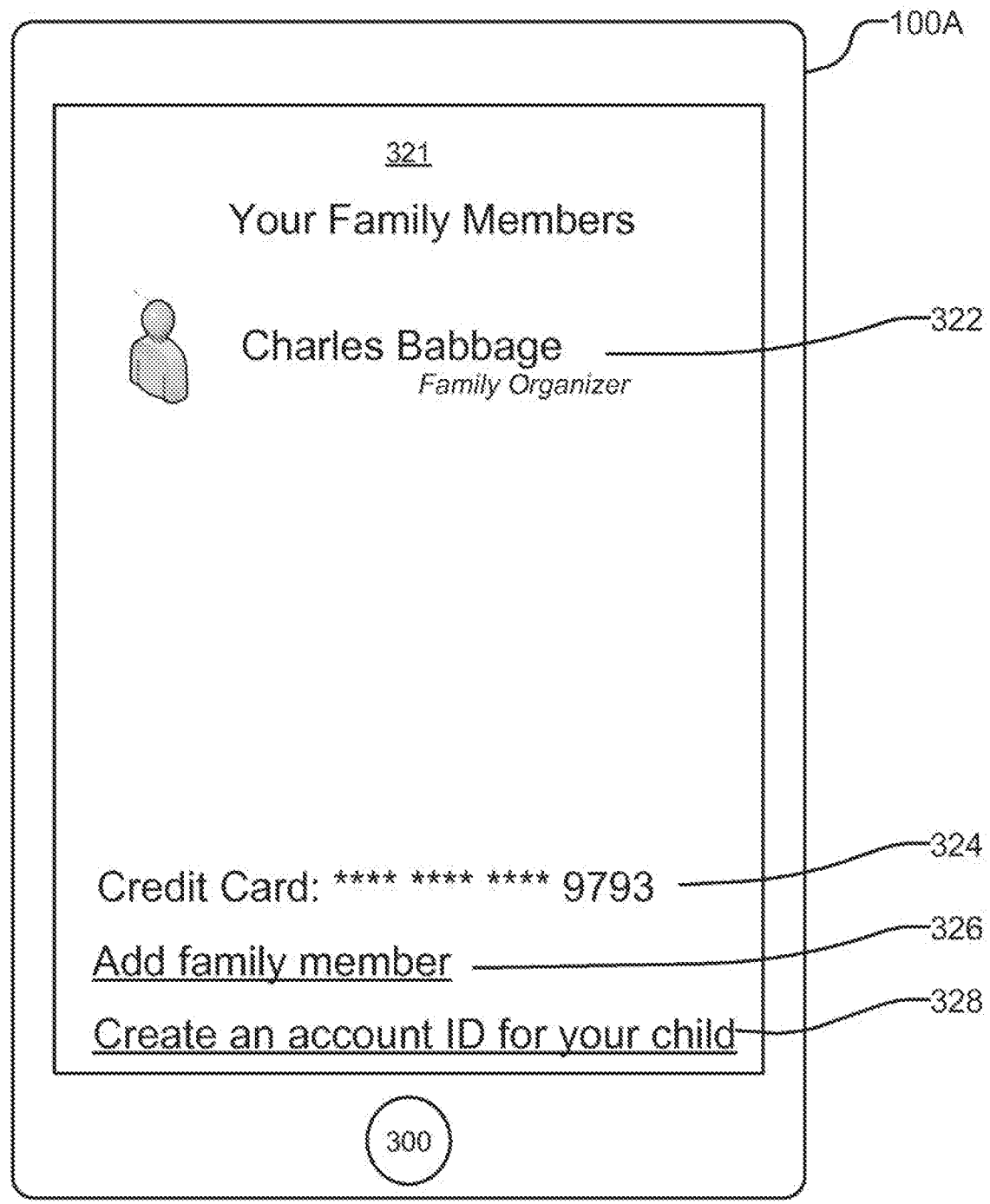
FIG 3.5

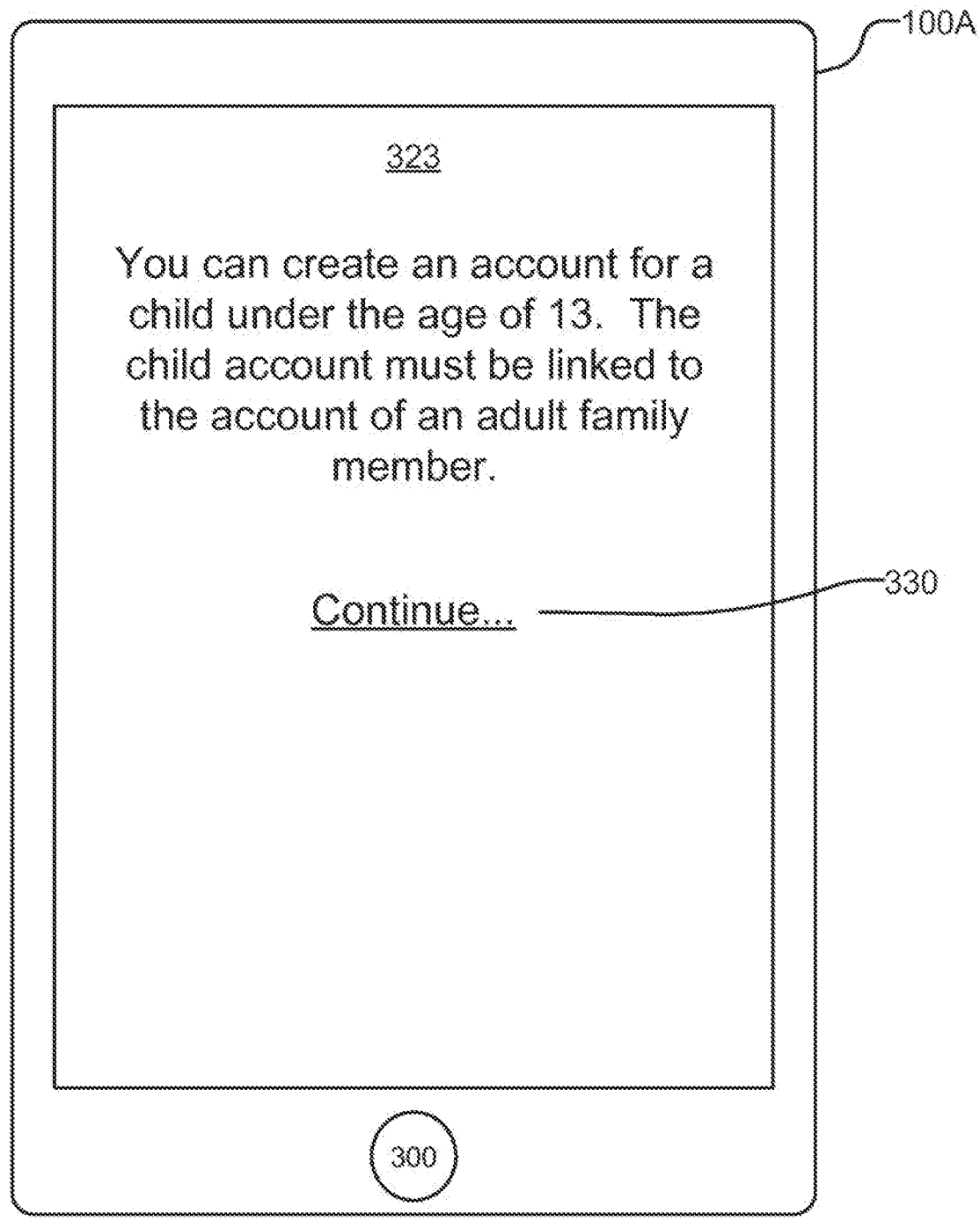
FIG. 3.6

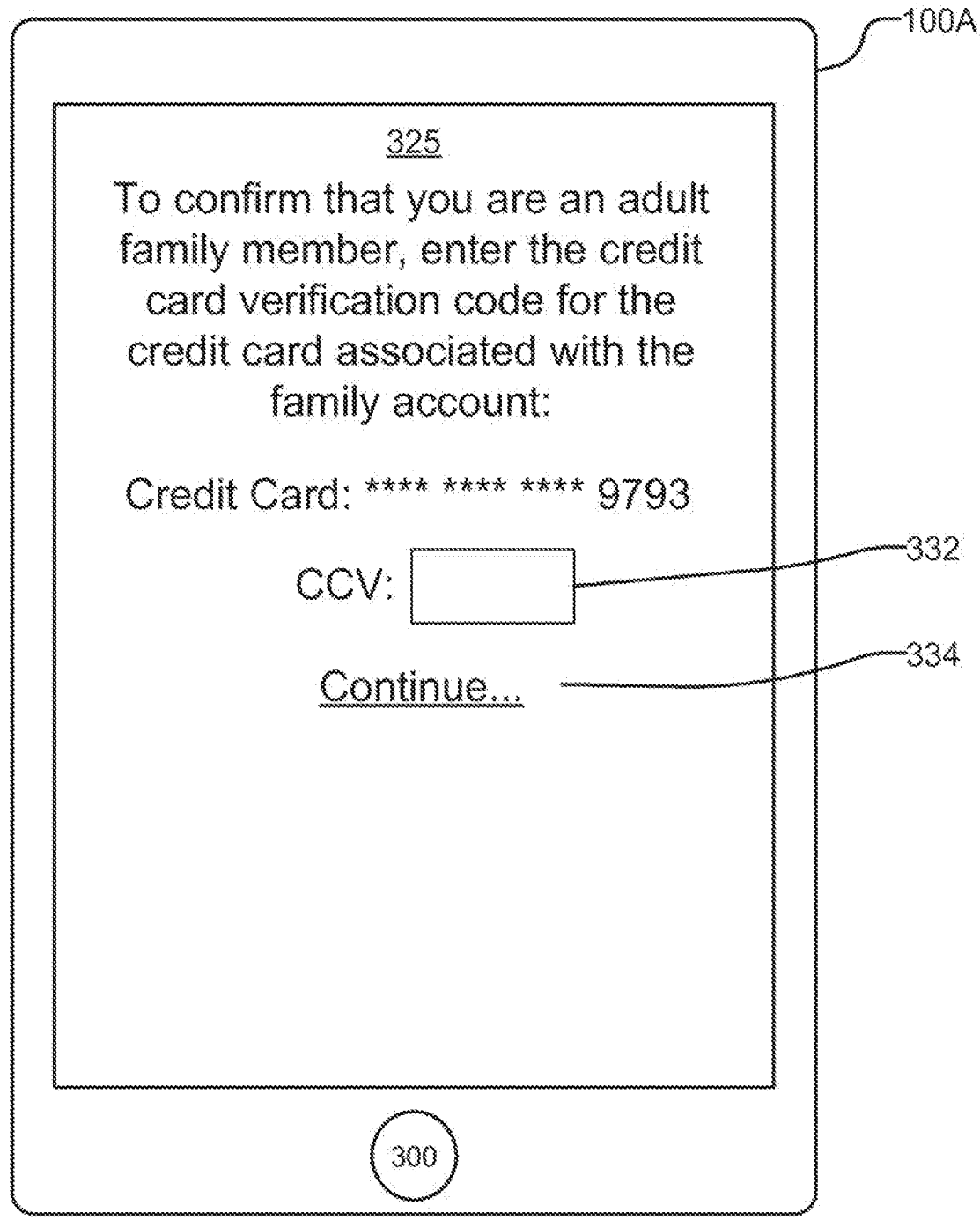
FIG. 3.7

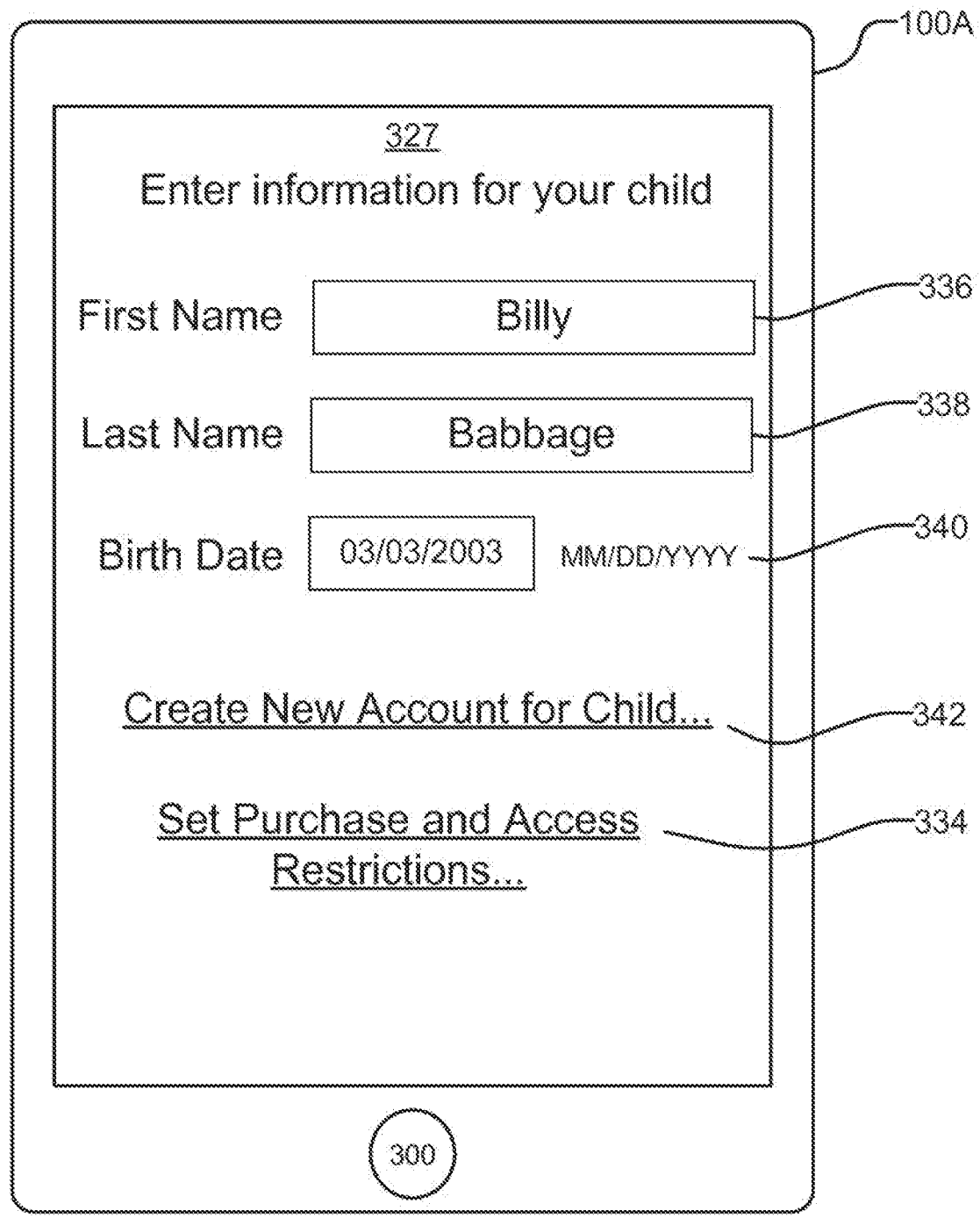
FIG. 3.8

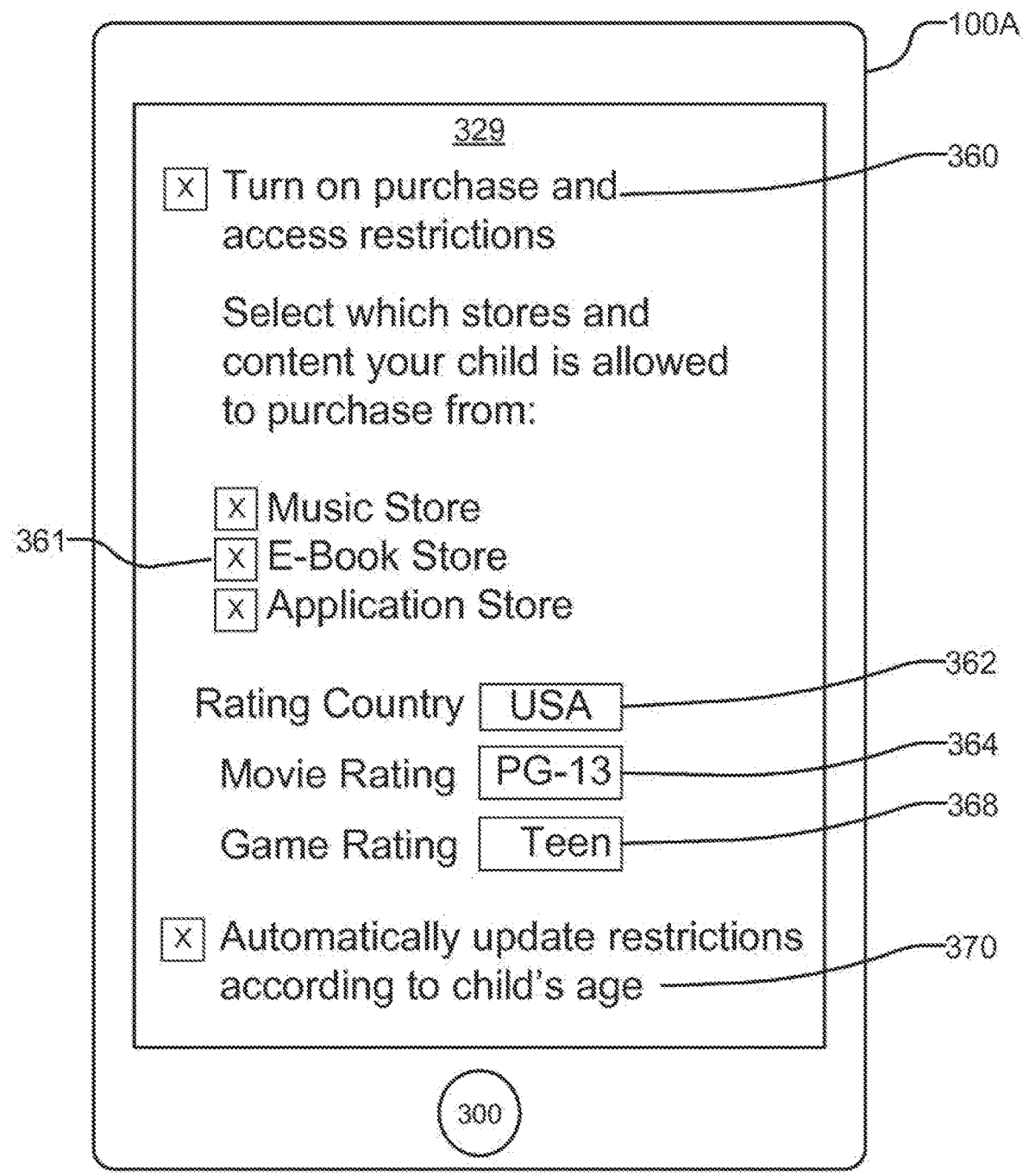
FIG. 3.9

FIG. 3.10

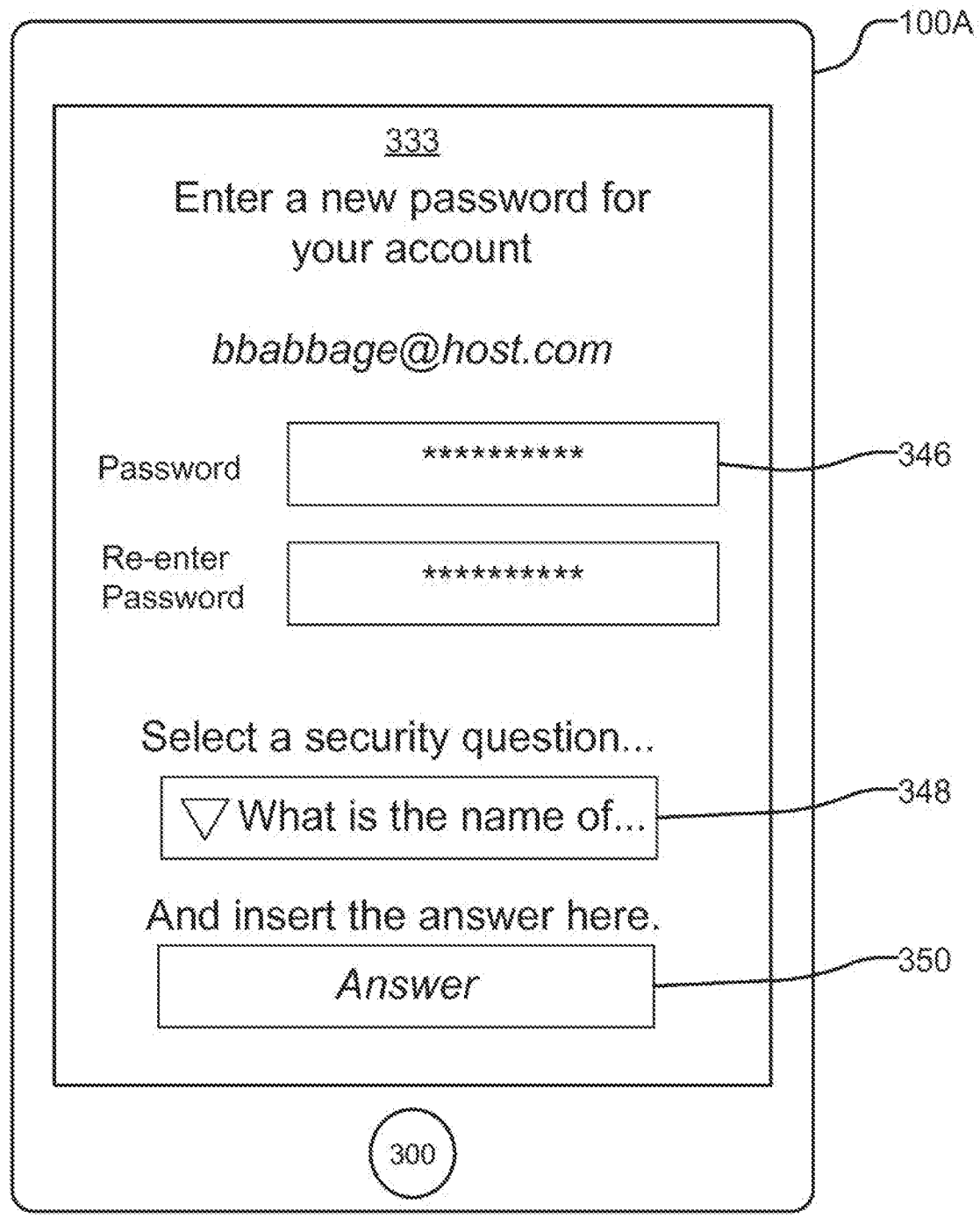
FIG. 3.11

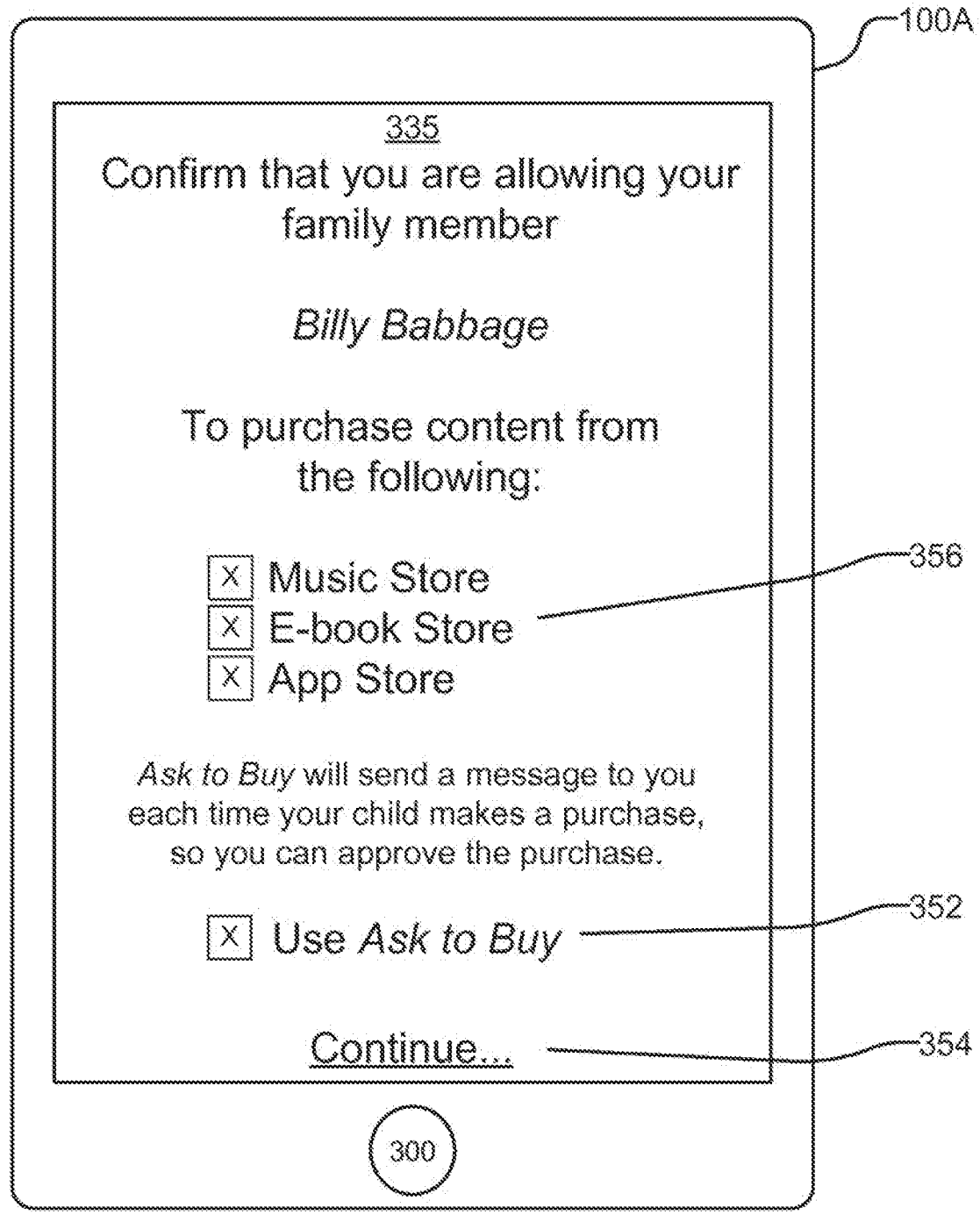
FIG. 3.12

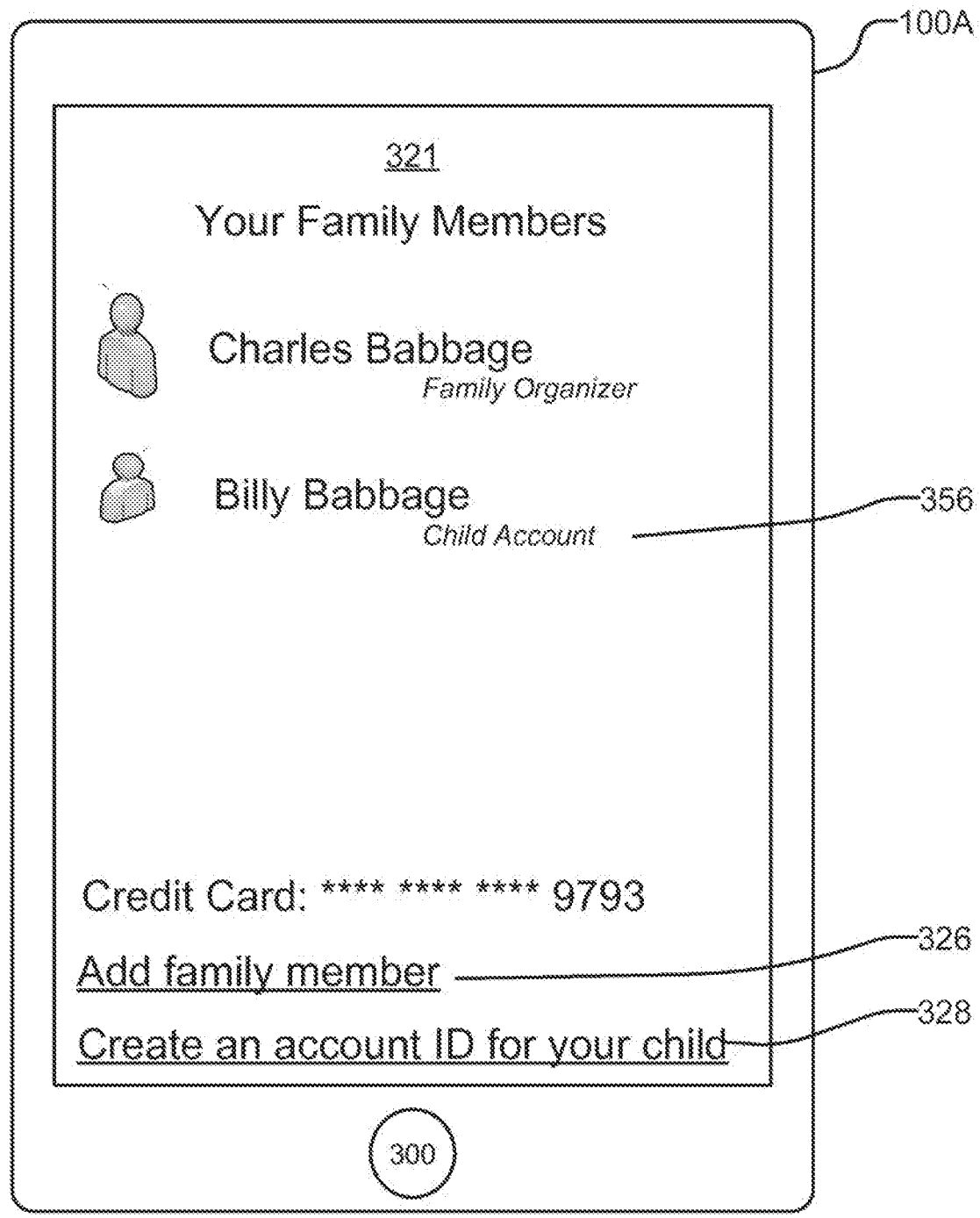
FIG. 3.13

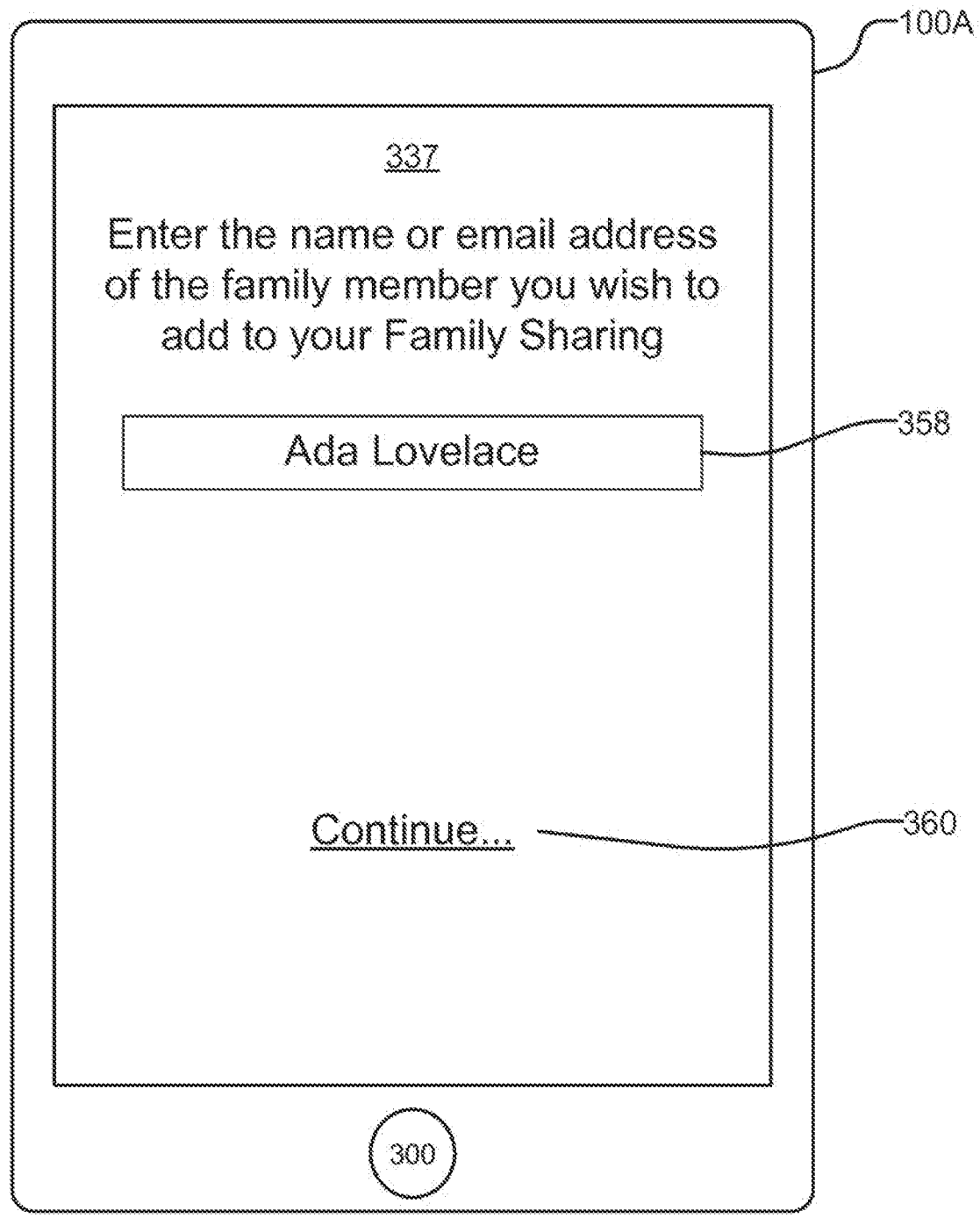
FIG. 3.14

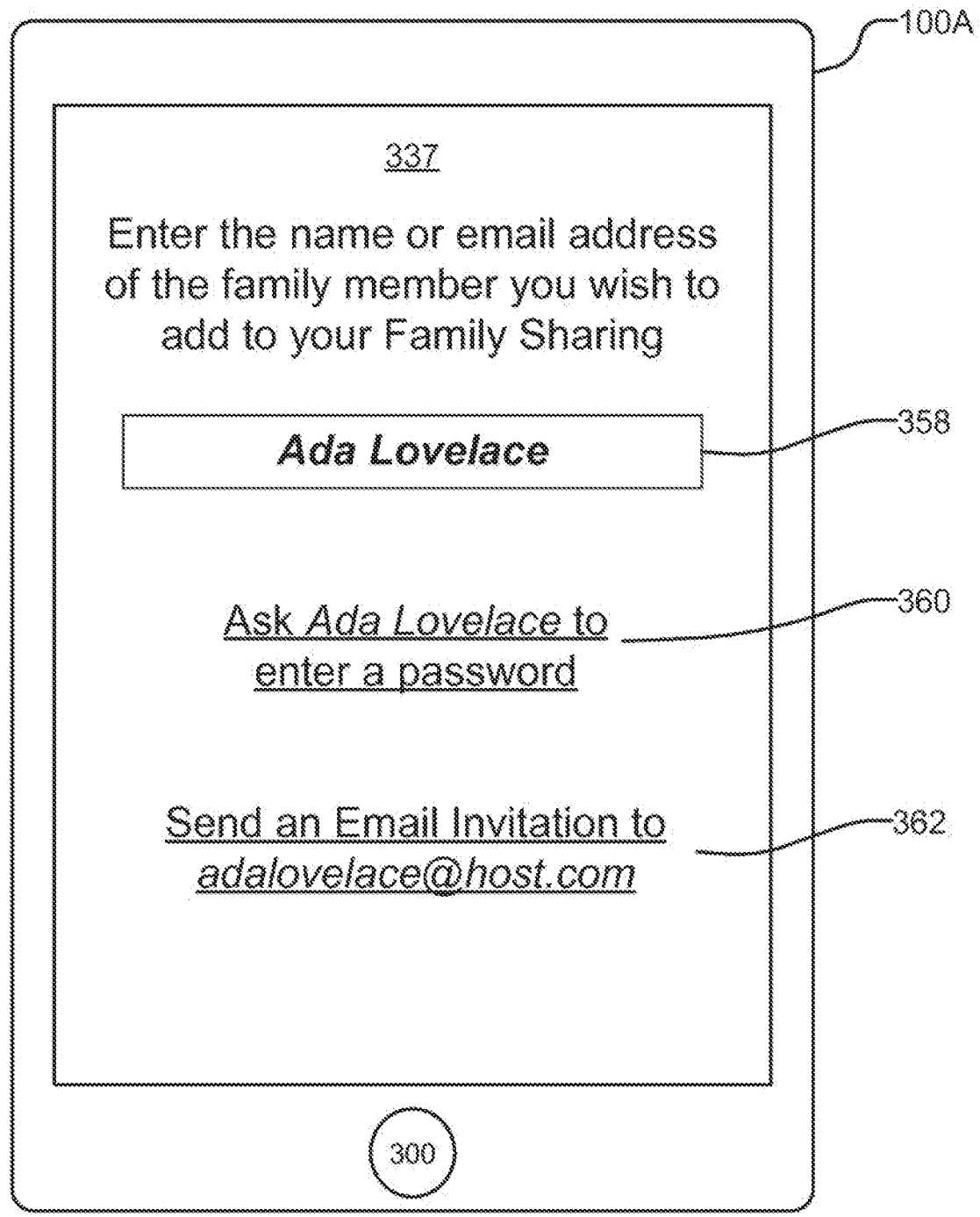
FIG. 3.15

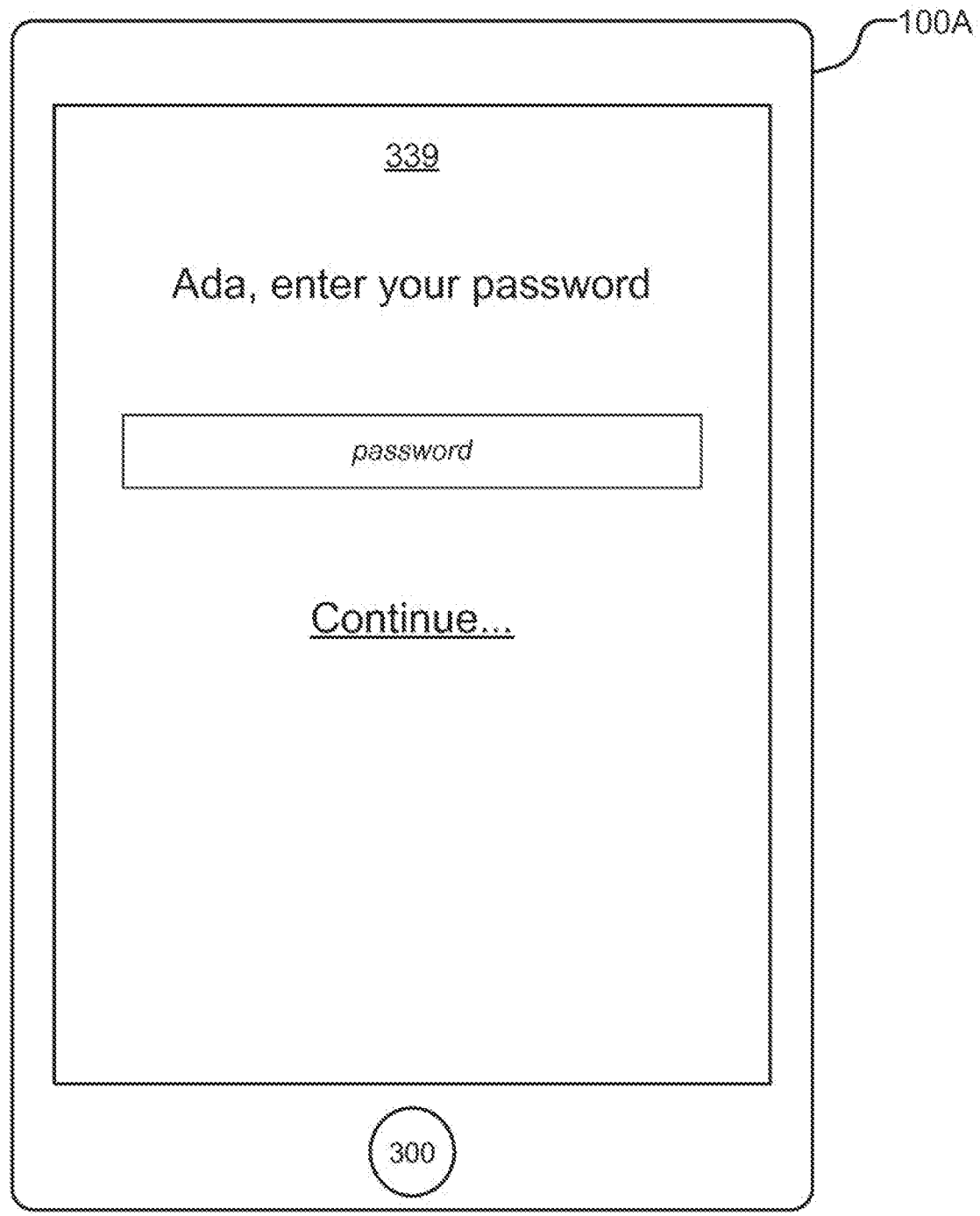
FIG. 3.16

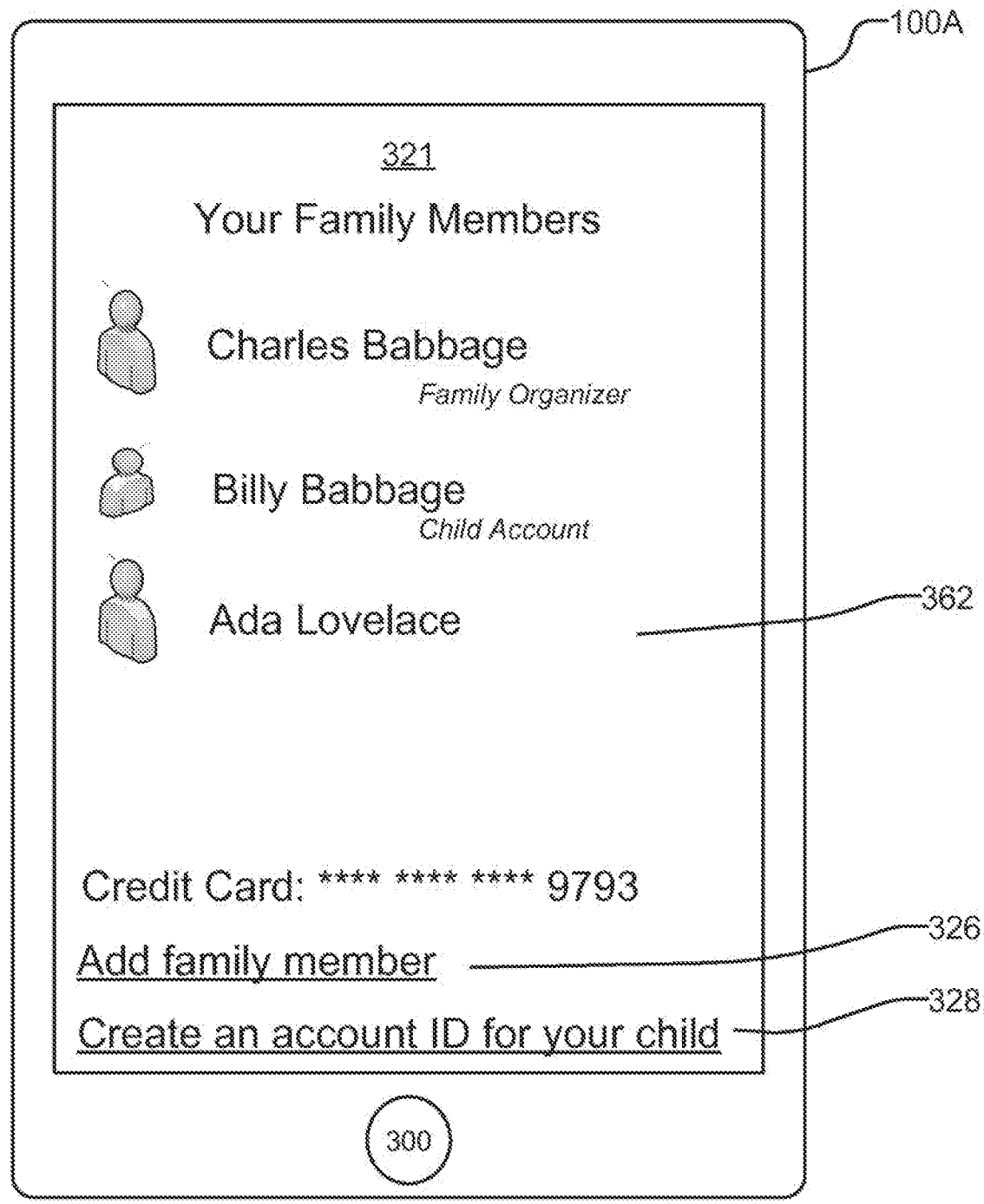
FIG. 3.17

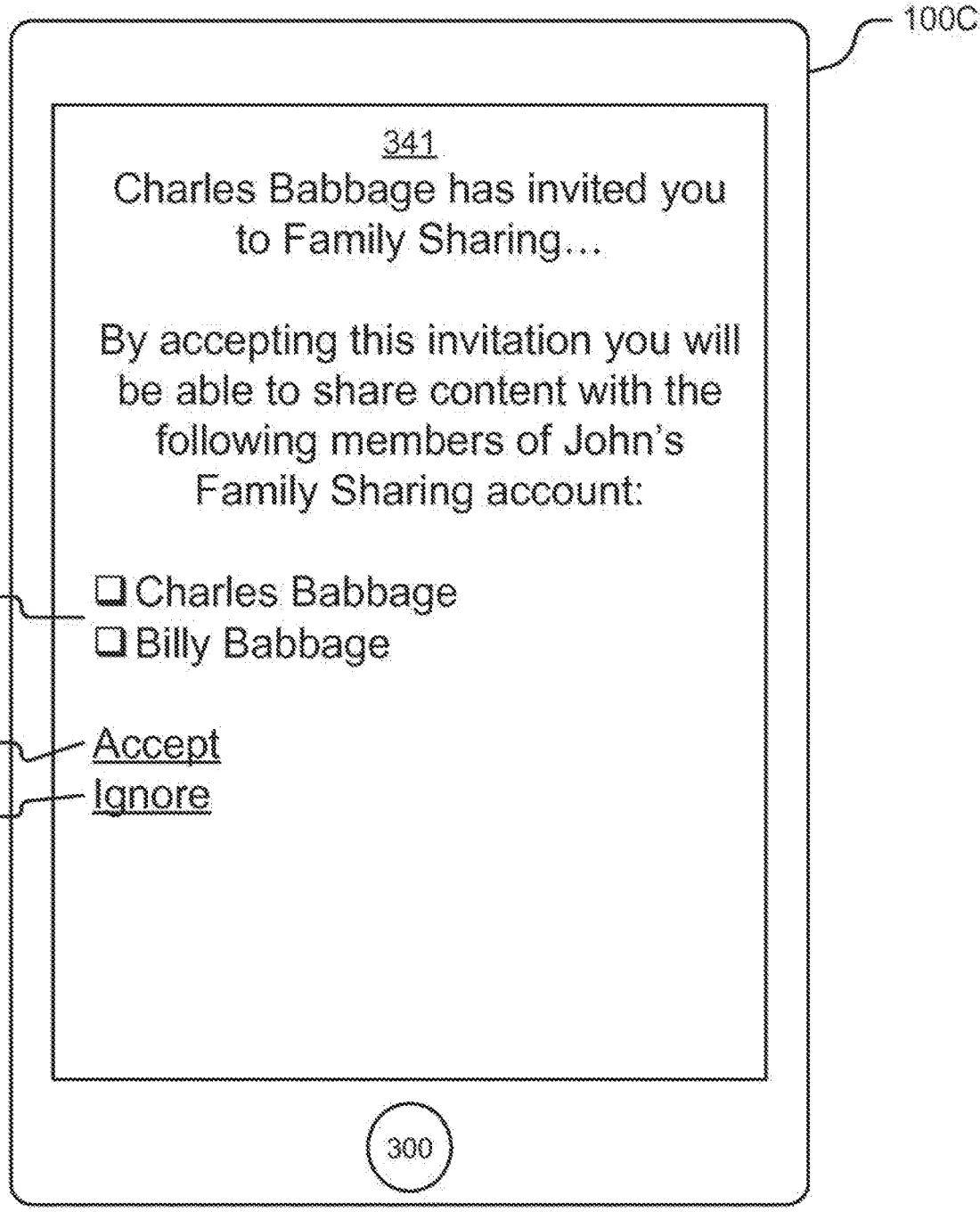
FIG. 3.18

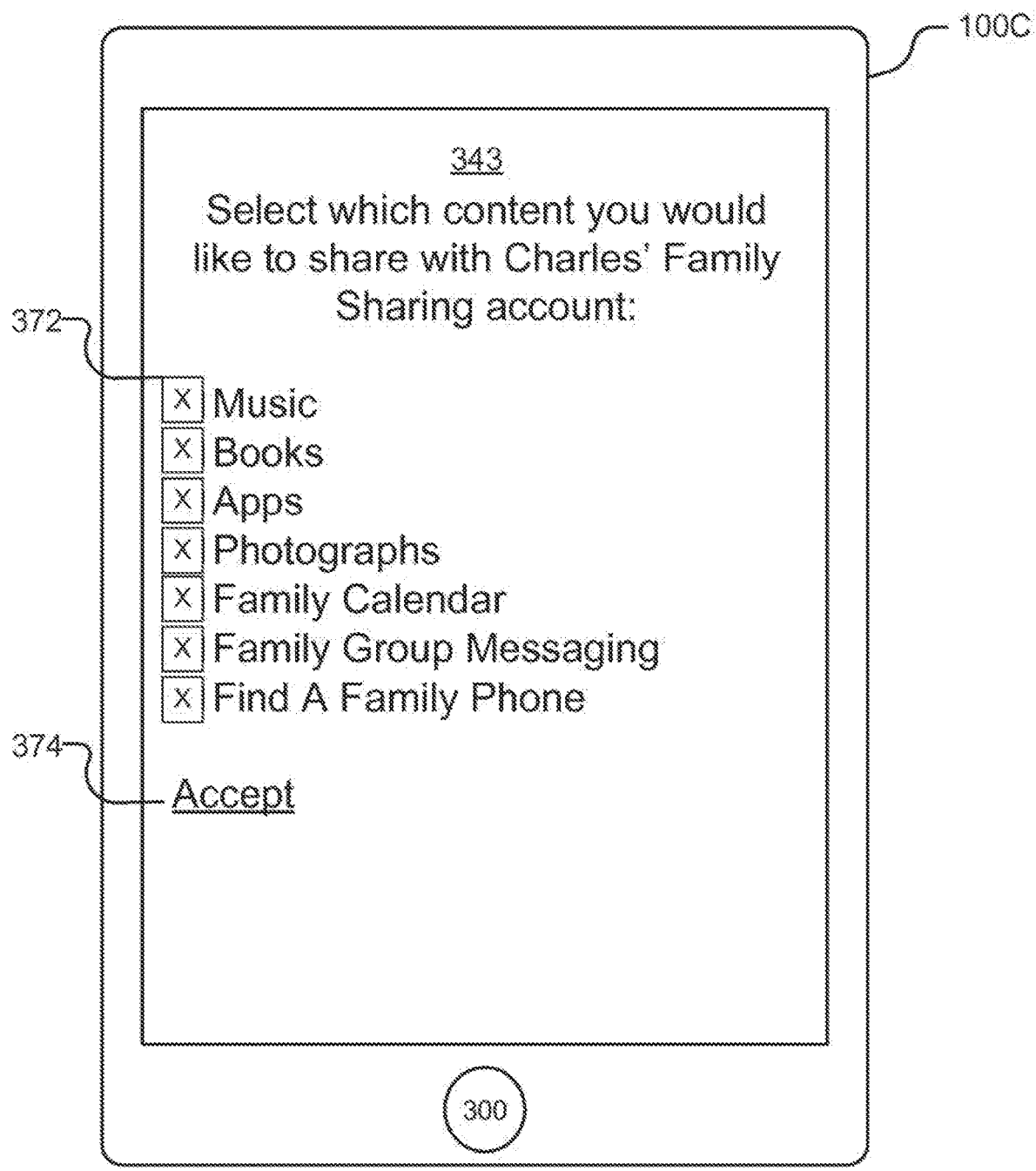
FIG. 3.19

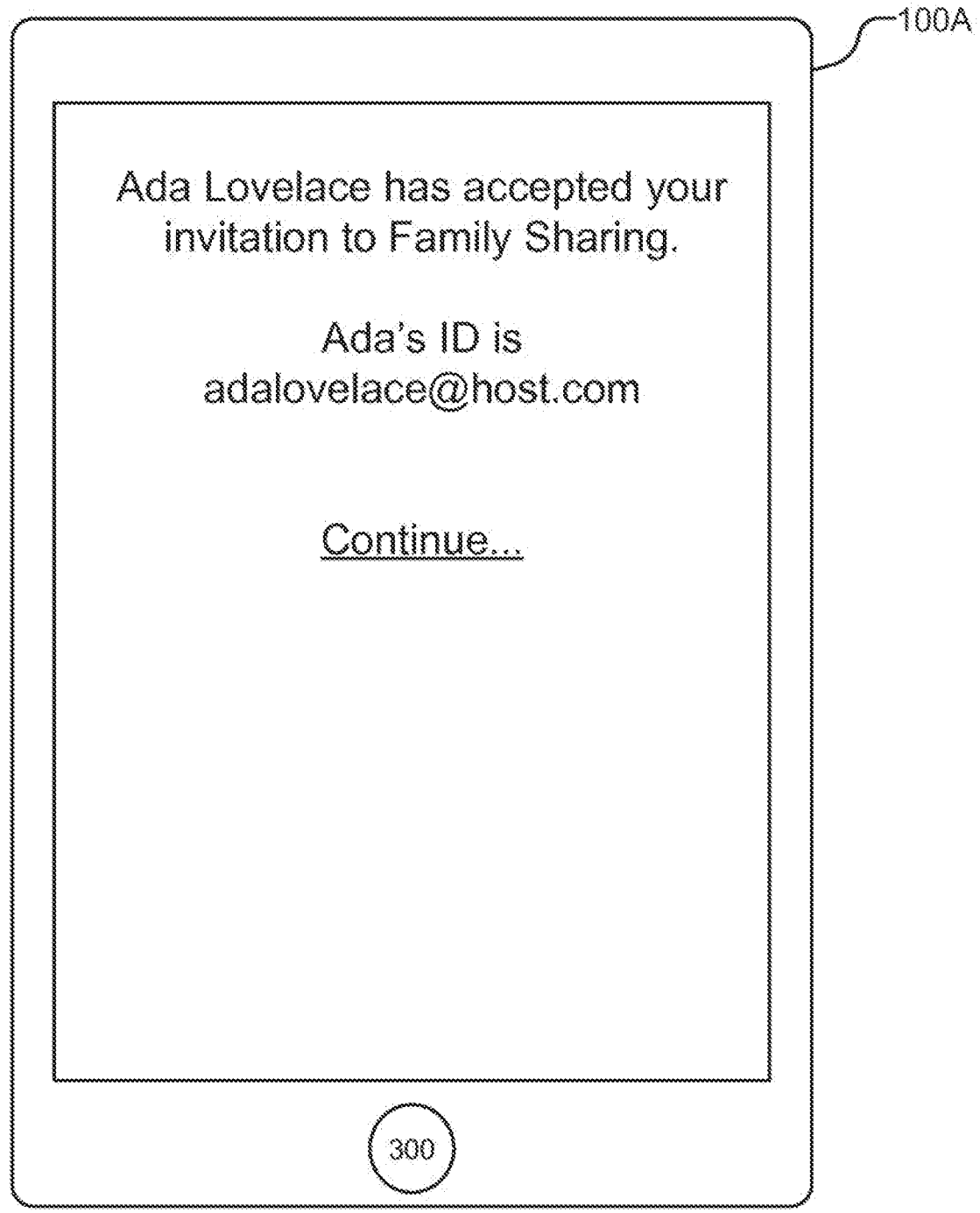
FIG. 3.20

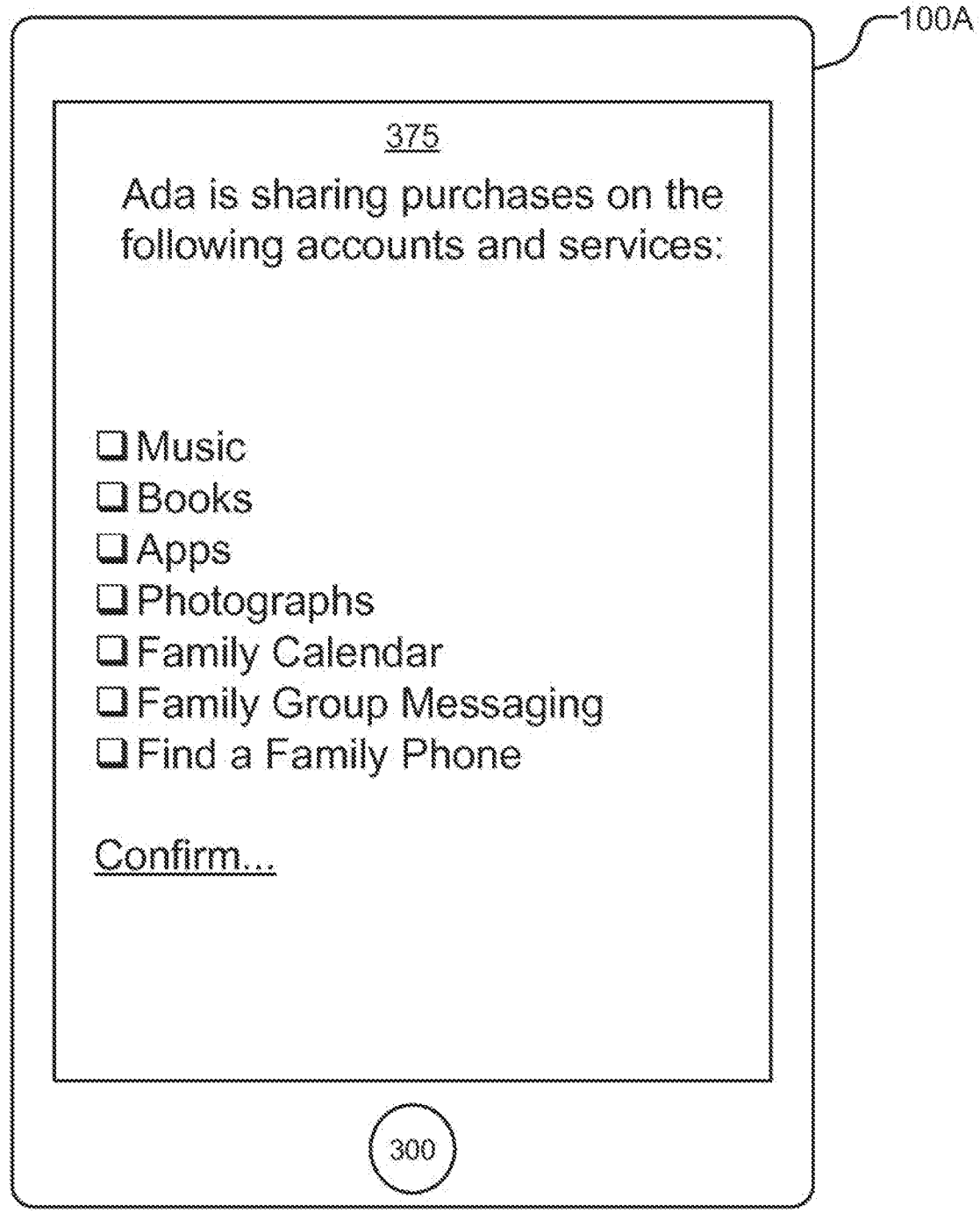
FIG. 3.21

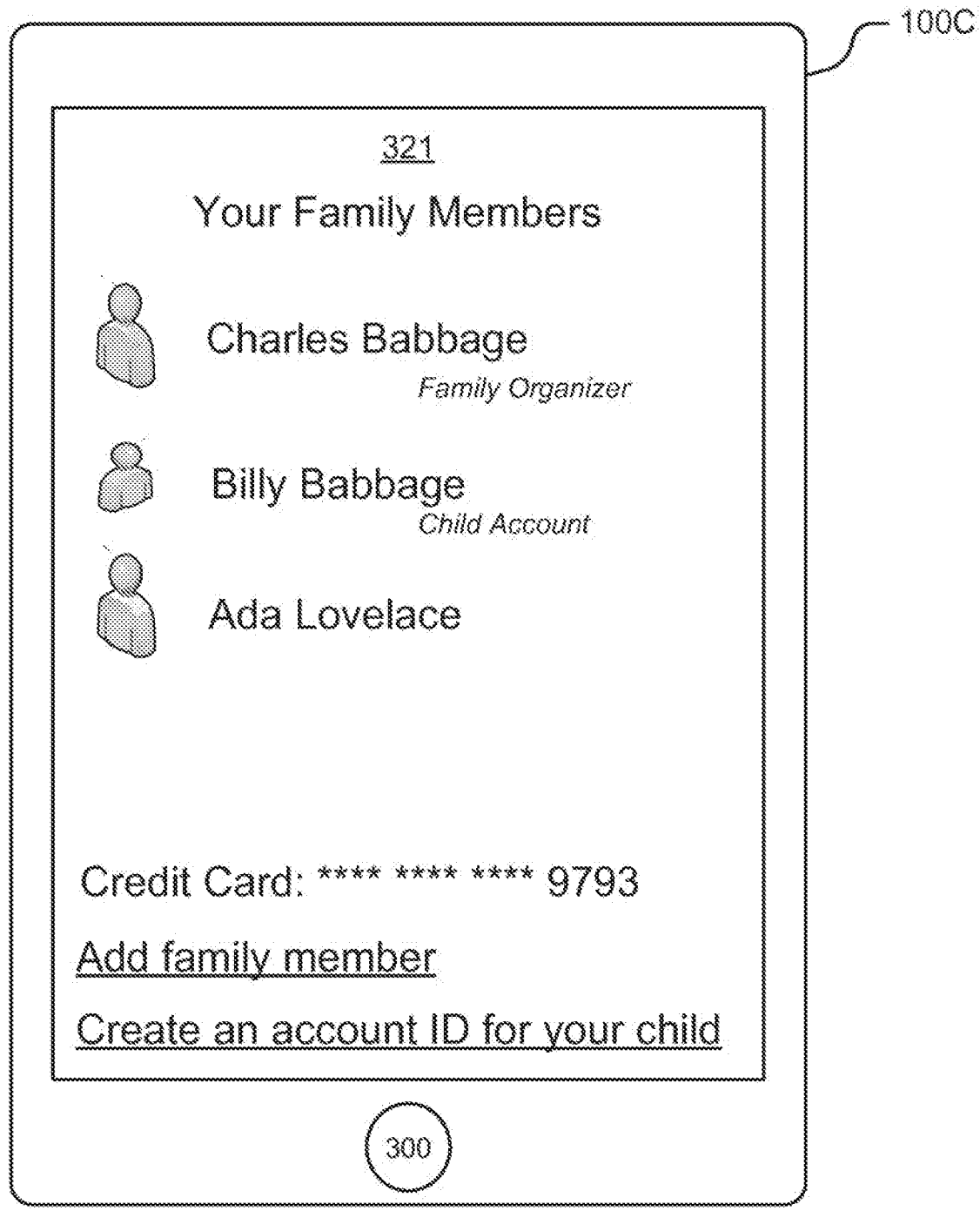
FIG. 3.22

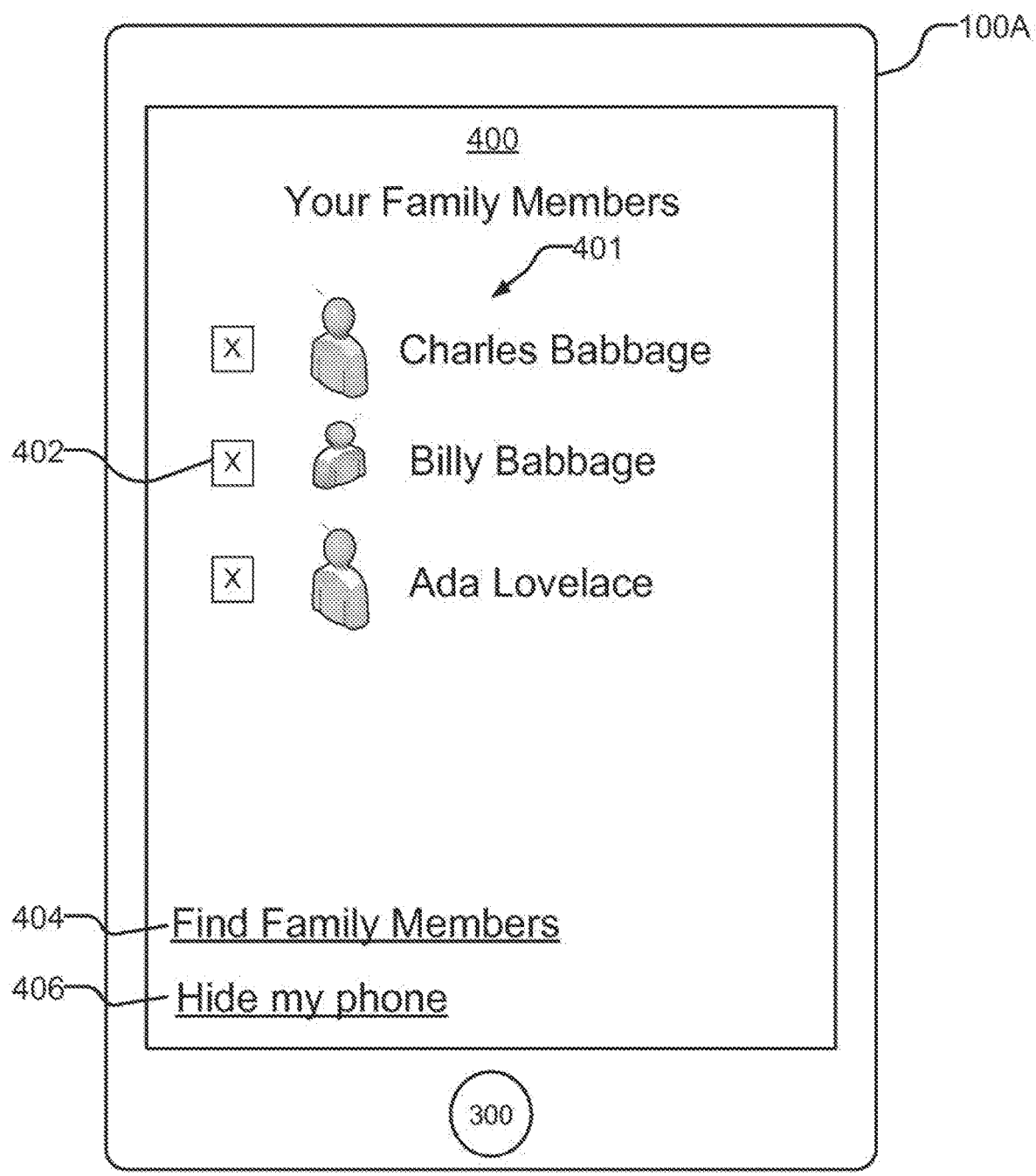
FIG. 4.1

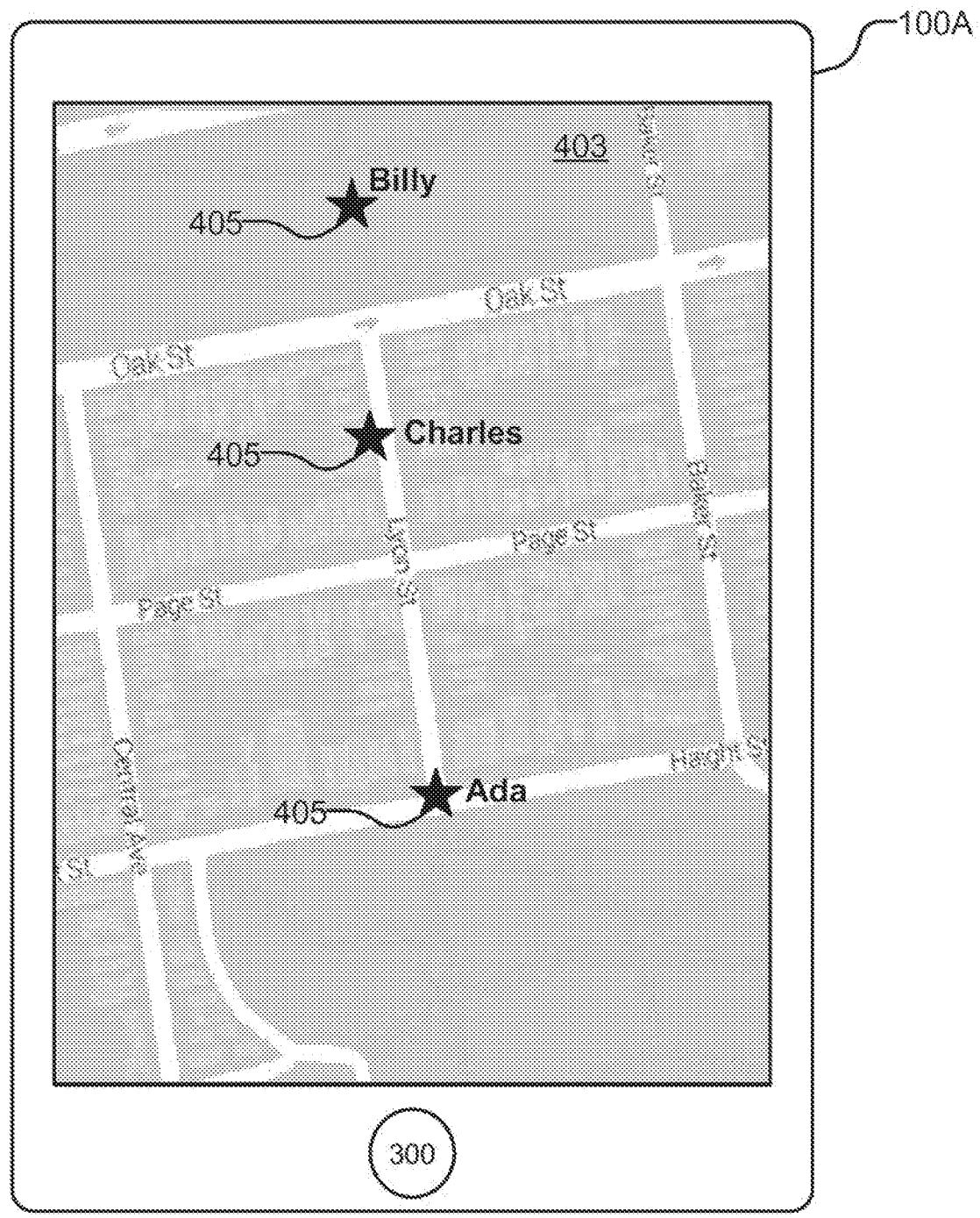
FIG. 4.2

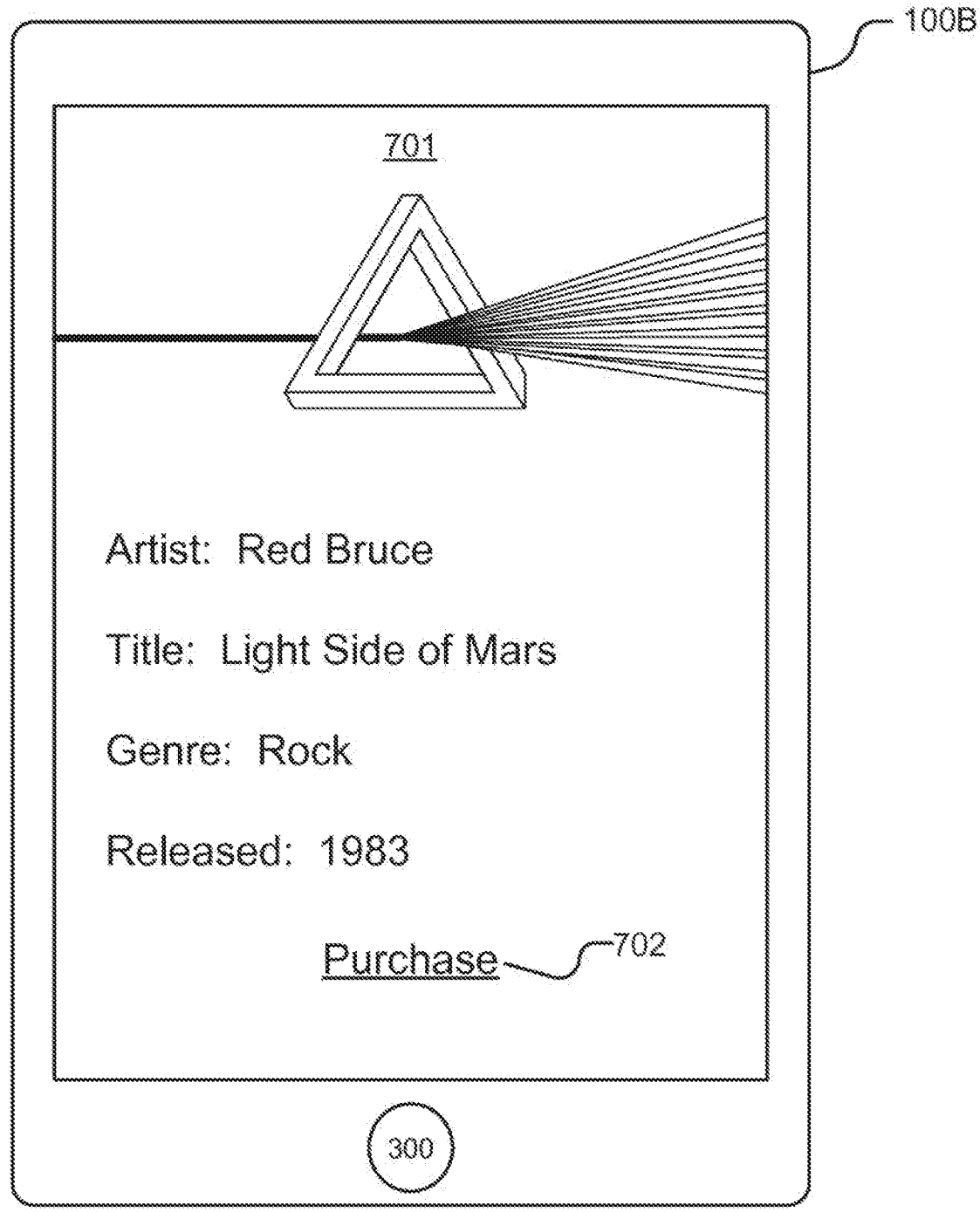
FIG. 7.1

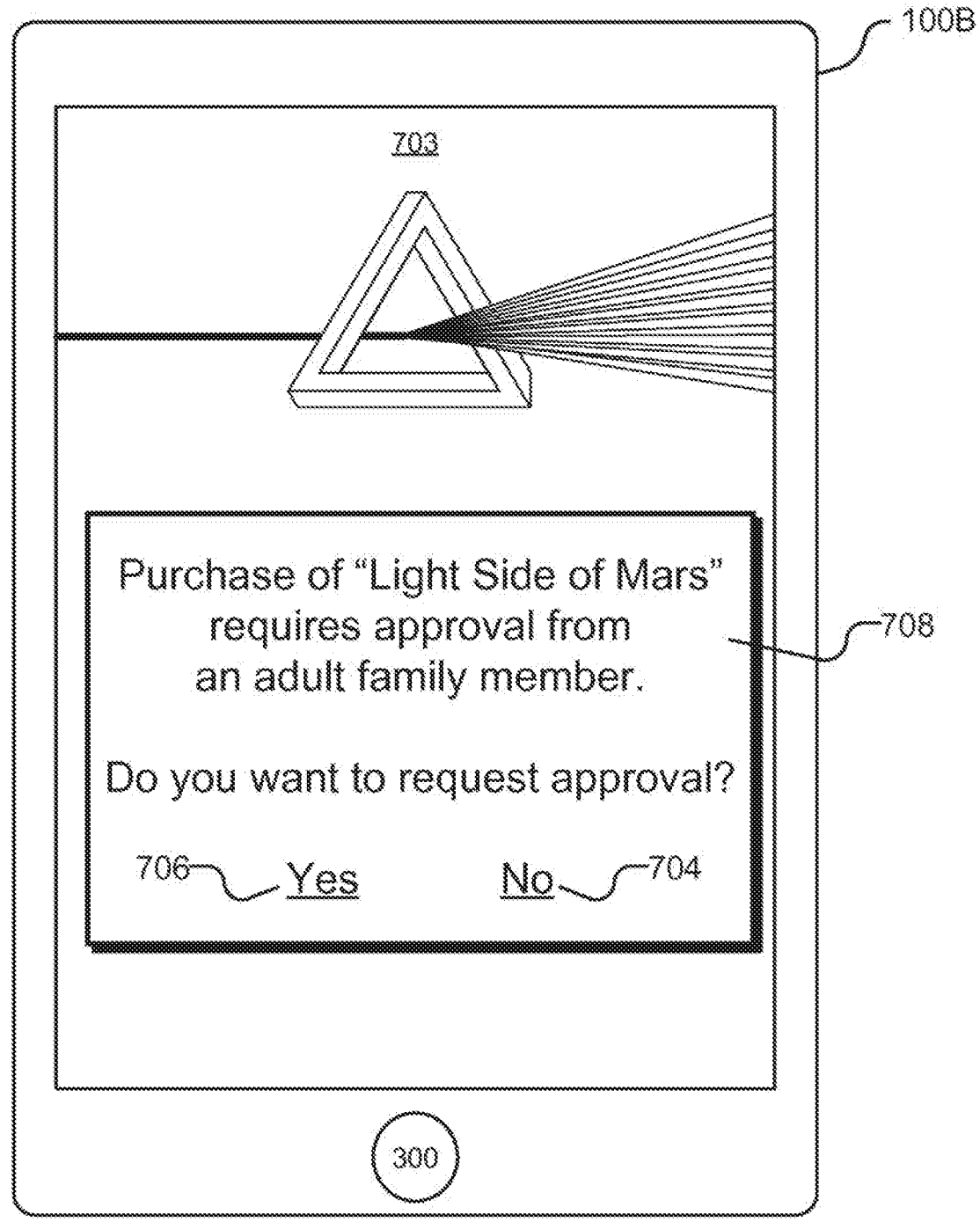
FIG. 7.2

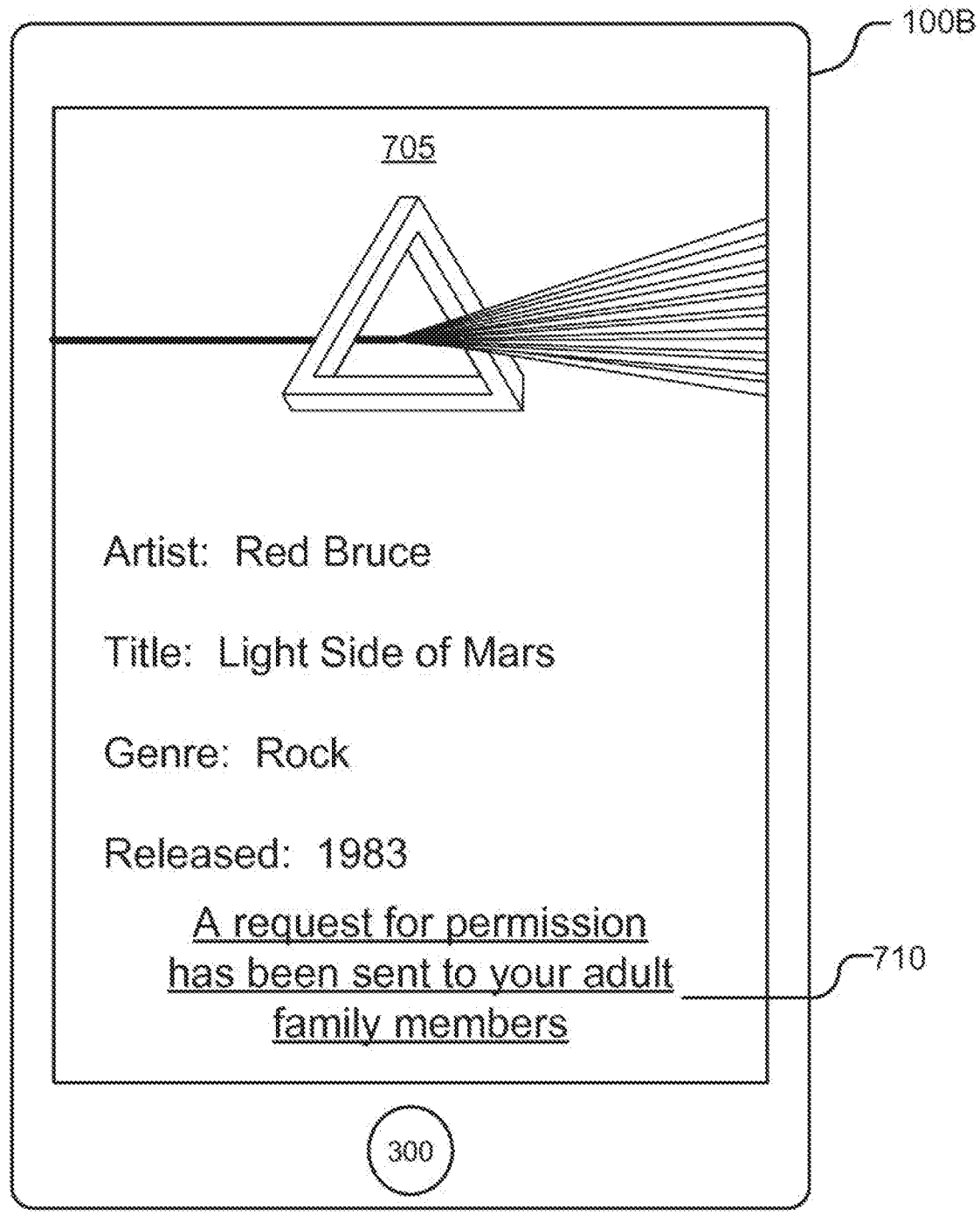
FIG. 7.3

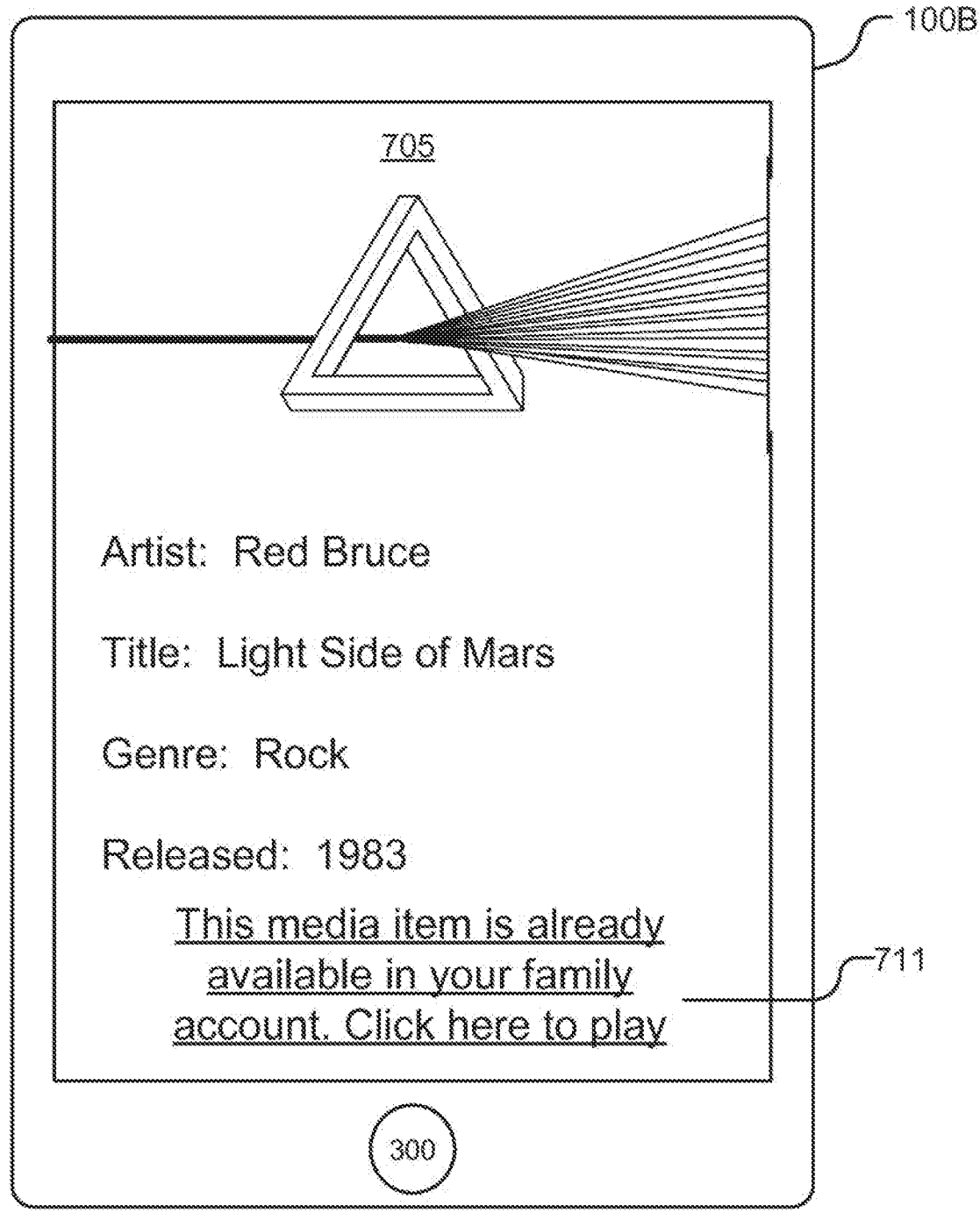
FIG. 7.3a

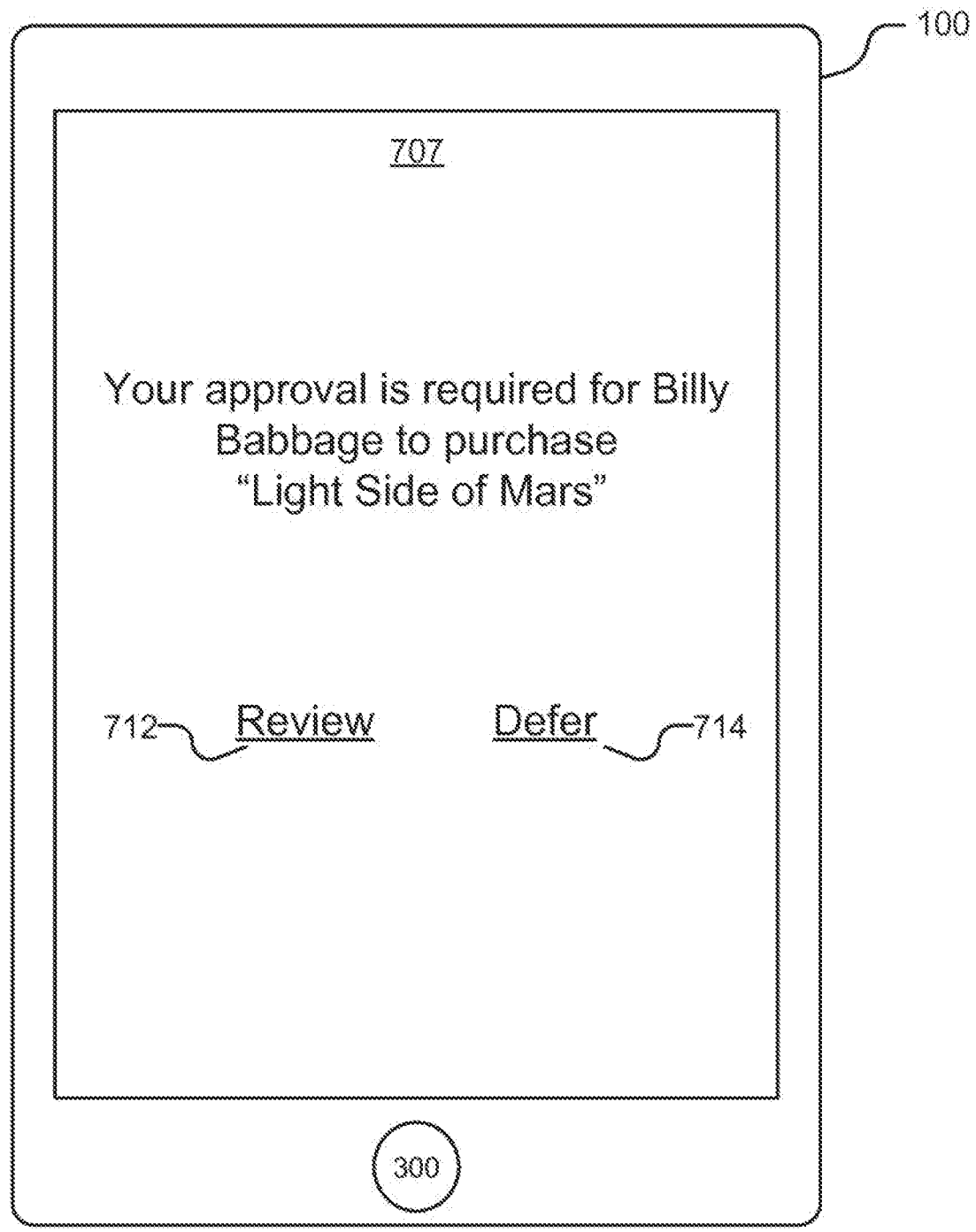
FIG. 7.4

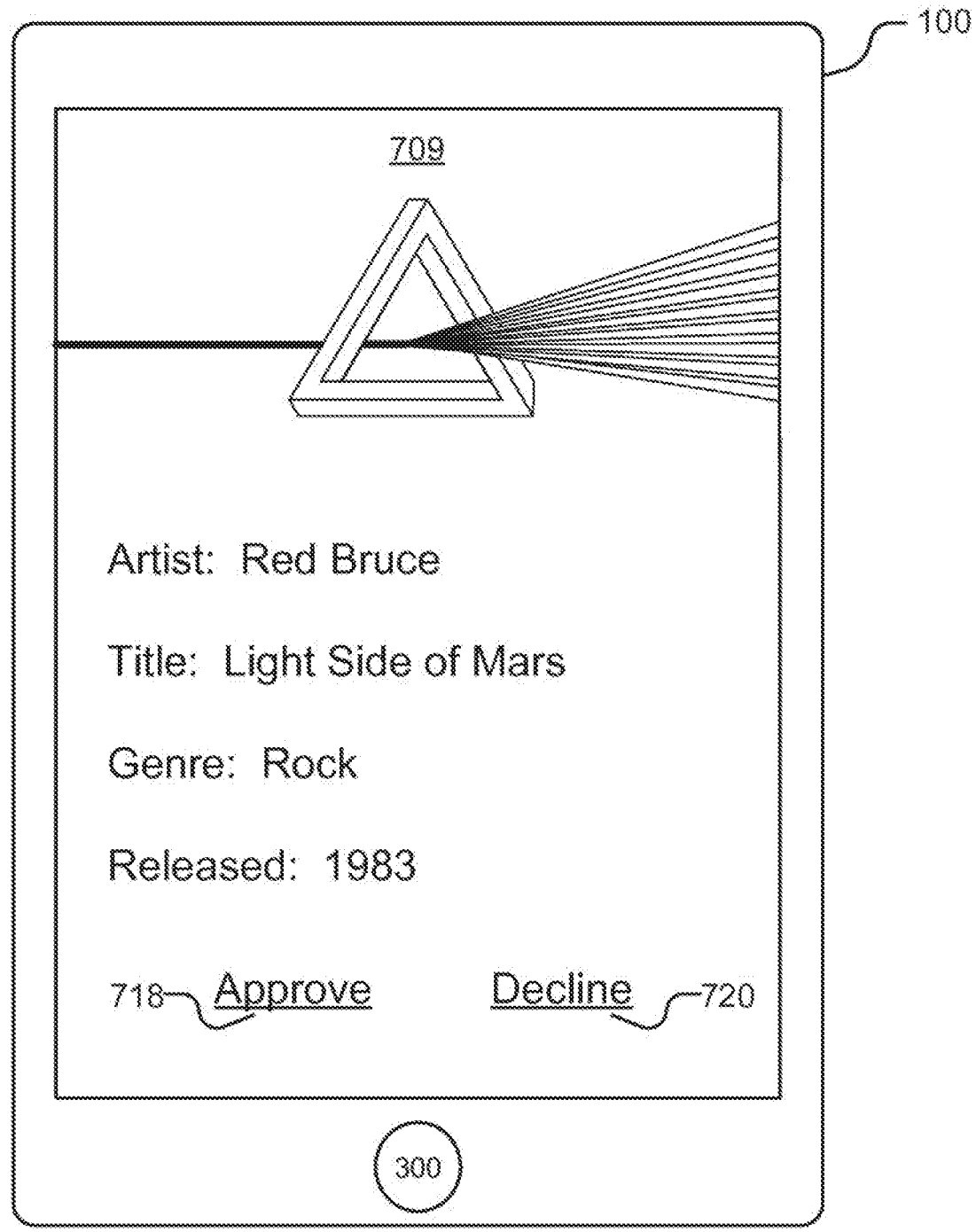
FIG. 7.5

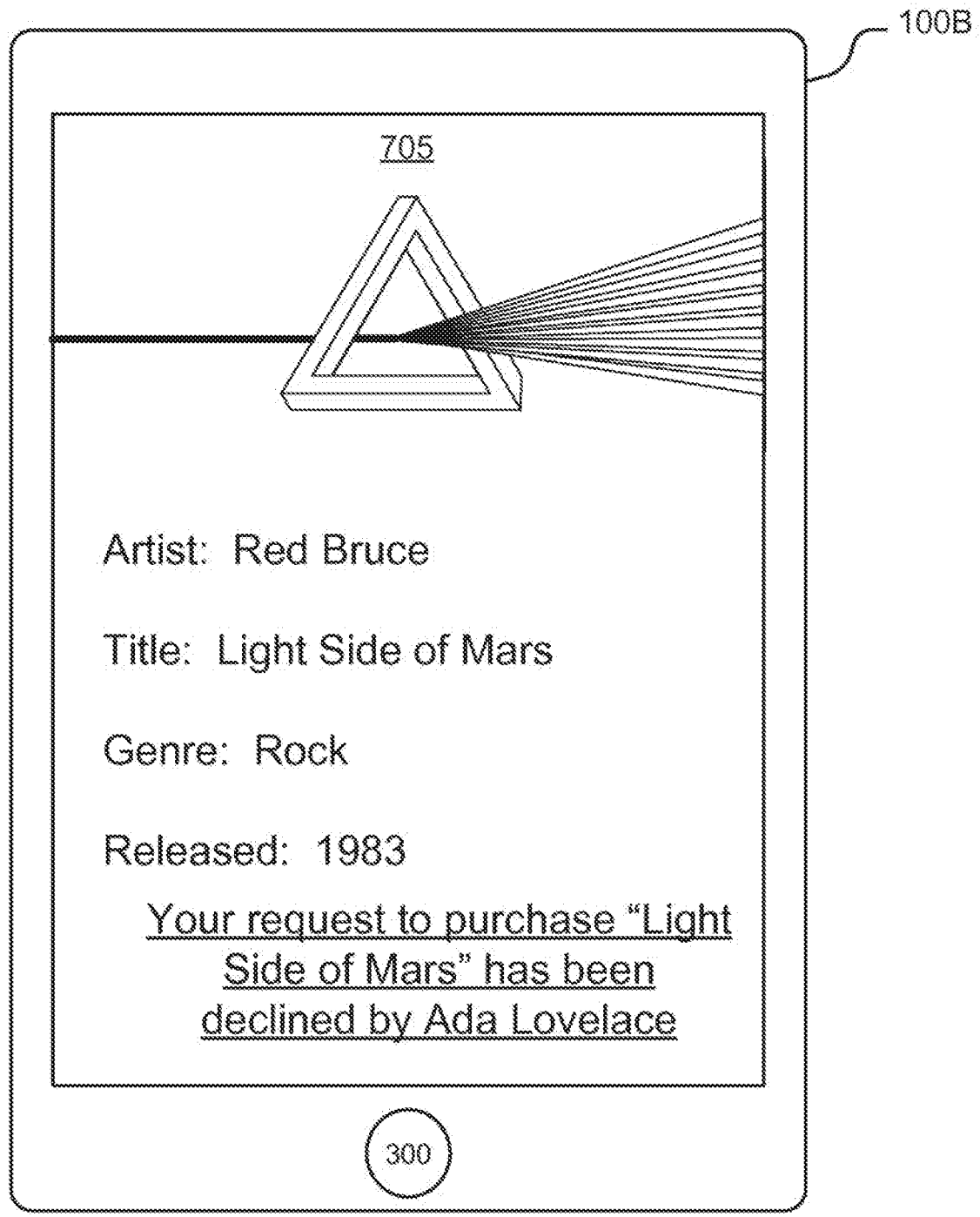
FIG. 7.6

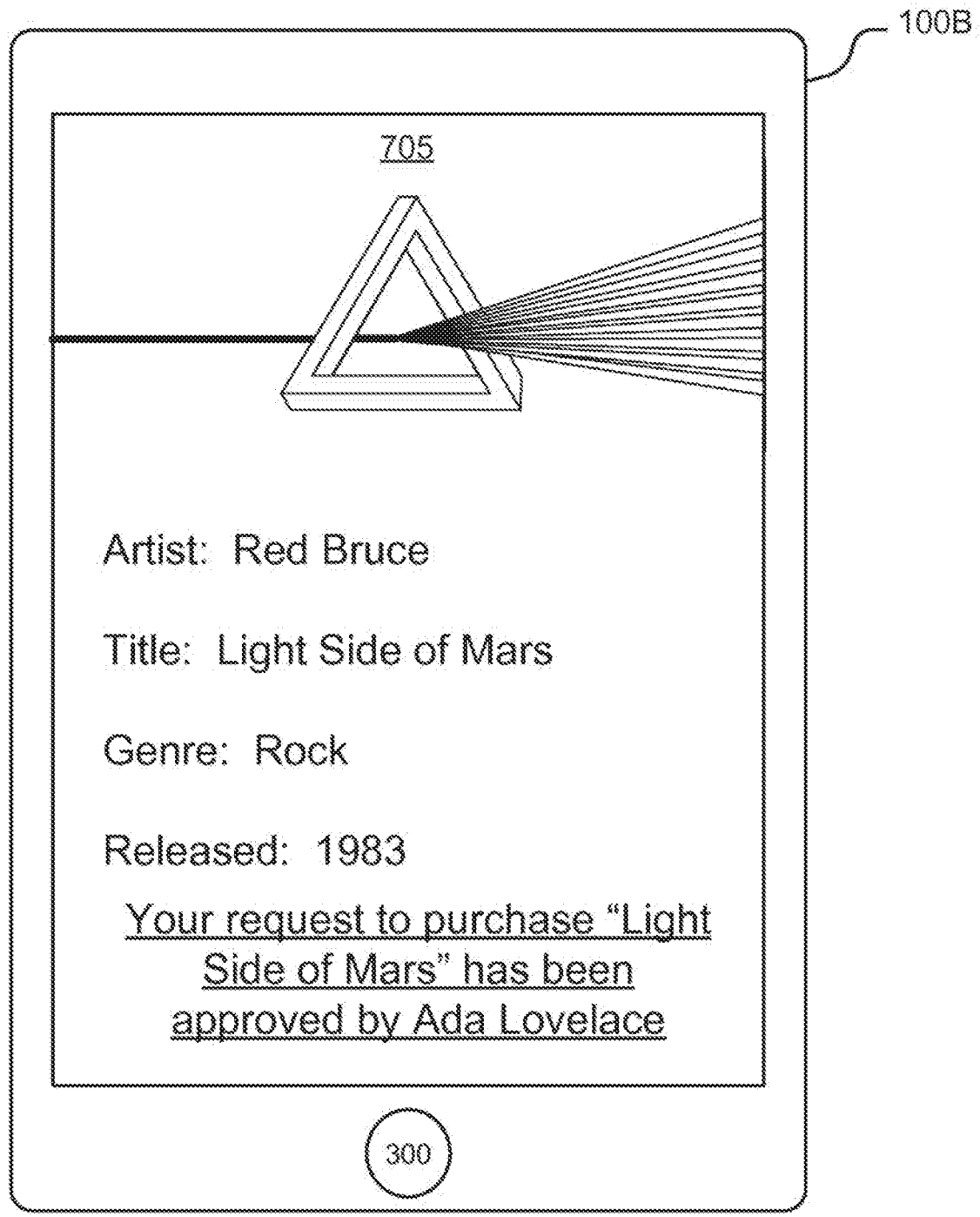
FIG. 7.7

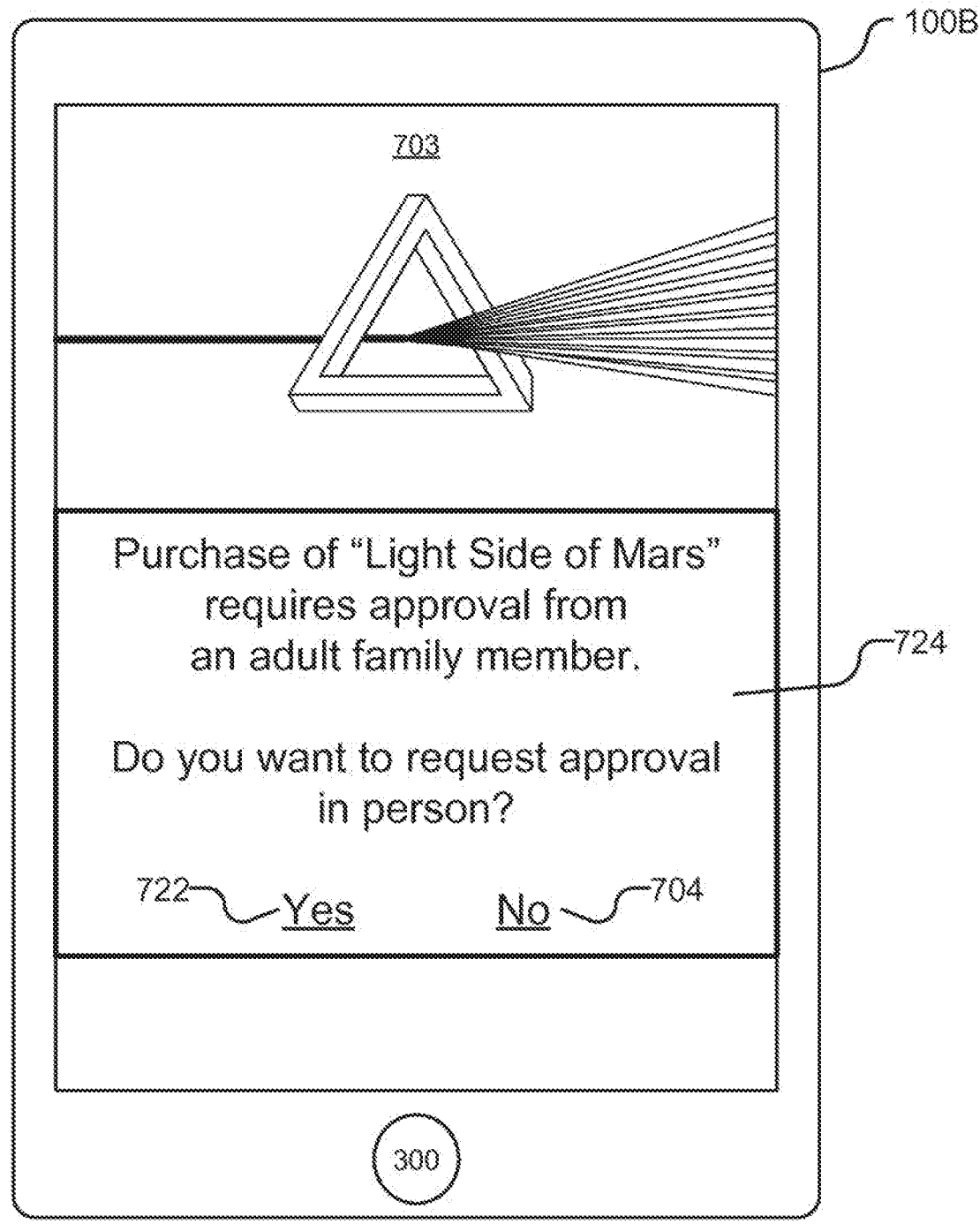
FIG. 7.8

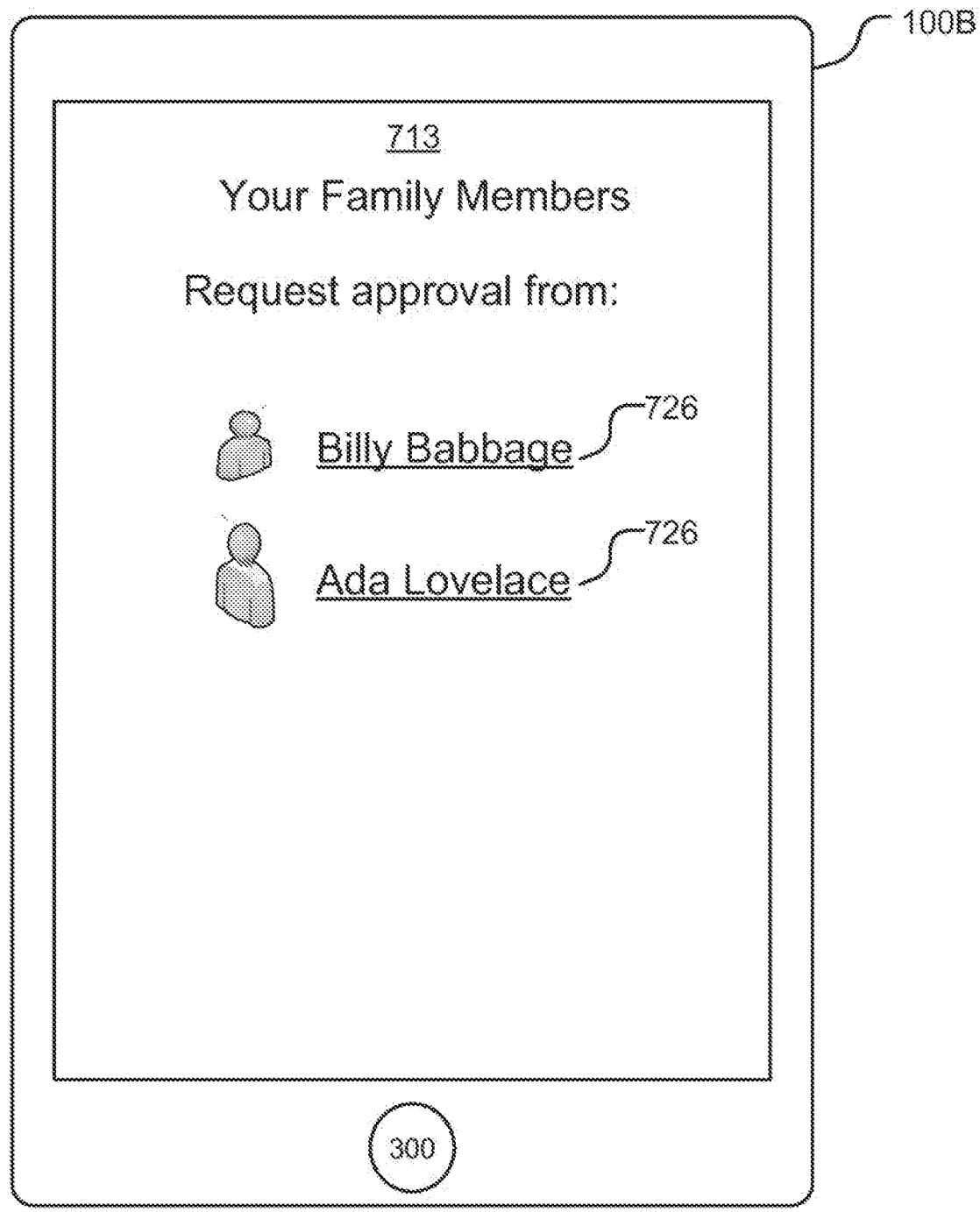
Fig. 7.9

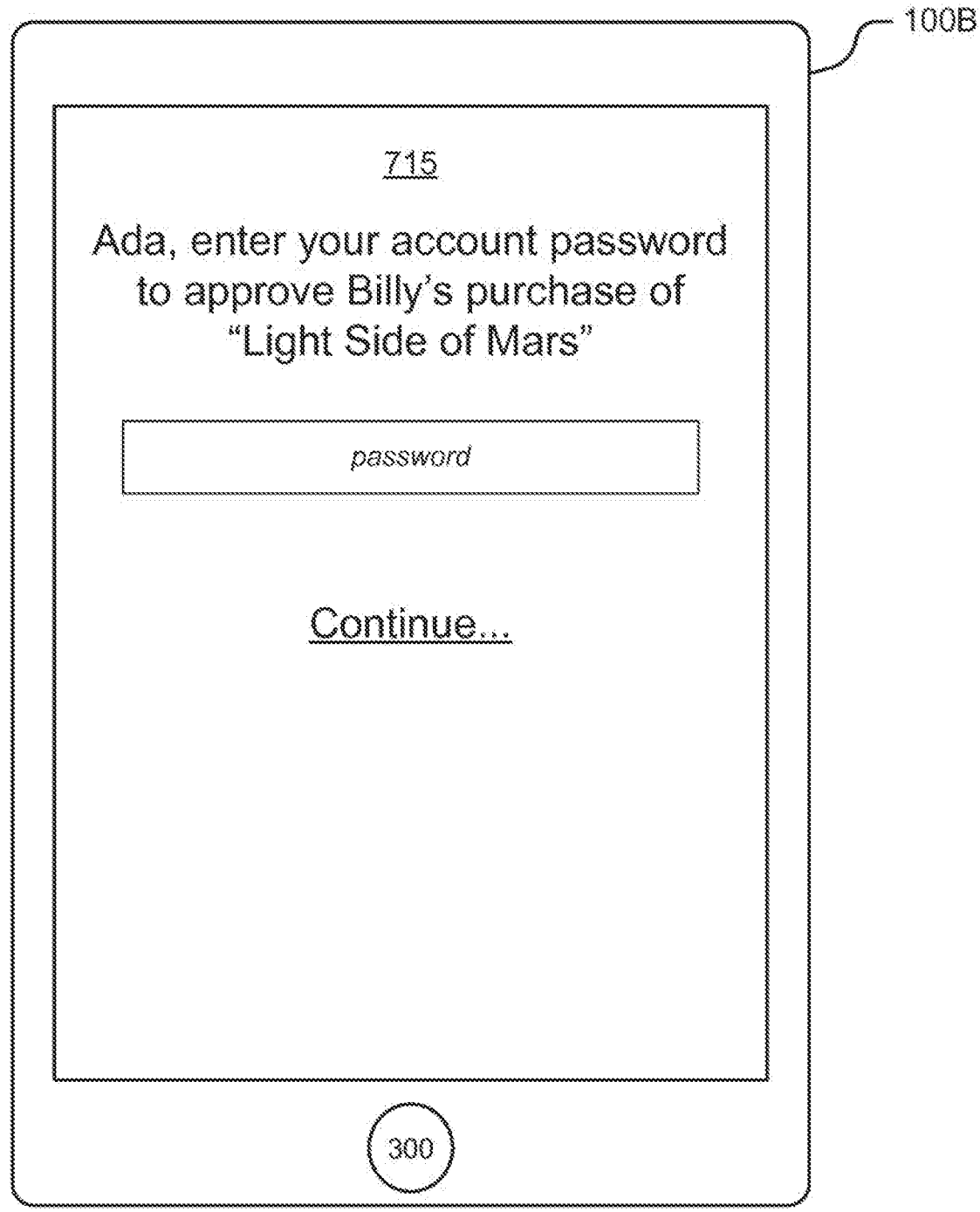
FIG. 7.10

FAMILY ACCOUNTS FOR AN ONLINE CONTENT STORAGE SHARING SERVICE

CROSS-REFERENCE TO RELATED APPLICATIONS

This application is a continuation of U.S. patent application Ser. No. 14/502,937, filed Sep. 30, 2014 and published on Dec. 3, 2015 as U.S. Publication No. 2015-0348185, which claims the benefit of U.S. Provisional Application No. 62/005,621 filed on May 30, 2014, the contents of which are incorporated by reference in their entirety for all purposes.

BACKGROUND

1. Field of Technology

The embodiments herein generally relate to online content storage systems that enable sharing of content between user accounts, and in particular to accounts shared among family members.

2. Background

Some online (or more colloquially, "cloud") based content storage systems enable users to share content between multiple devices and multiple different users. Typically, each user must have their own account with the content storage system, whereby they then designate particular folders or files to be shared with other users.

Some content storage systems do not allow children (typically under the age of thirteen, but may vary depending on jurisdiction) to establish accounts due to legal concerns. However, many families would like to be able to allow their children to be able to share content with other family members. Not all online content storage systems allow for family accounts that include child accounts, and among those that do, establishing an account for a child can be complex and time consuming.

Content storage systems are sometimes associated with online digital stores where users can purchase digital content, such as music, video, electronic books, and computer applications. For content storage systems of this type, child family members typically have the ability to purchase digital content subject only to content rating restrictions, without direct supervision or approval by other family members. These content storage systems do not provide easy to administrator facilities for controlling the kinds of content that child family members can purchase.

SUMMARY

An online content storage system enables a user to create a family account to be shared by a number of family members, including child family members. In one aspect, an adult family member having an account on the content storage system can initiate processes to set up a shared family account on the content storage system. The adult family member, acting an family organizer can select an account to be used as the shared family account, select an account to use as a purchase account to allow purchases to be made by other family members, invite other family members to join the shared family account, and to create a new account for child family members in an efficient and flexible manner.

In creating a new account for a child family member, the family organizer can use credit card related information, such as a credit card verification code to authenticate to the content storage system that the family organizer is setting up the account, rather than the child family member. The family organizer can also select particular content servers to which the child family member can have access. The family organizer can designate a real time purchase approval process be associated with the account of the child family member so that future purchases of content from the content servers by the child family member must be approved in real time by an adult family member prior to the purchase being approve and the content downloaded to the child family member's computing device. The family organizer can further select particular content restrictions based on country and media type to be applied to the child family member's account. Different content restriction templates can be provided by the content storage system for different countries and age ranges; the system can automatically select and periodically update the content restriction template applied to the child family member's account based on the age and country location.

Upon acceptance of an invitation to join a shared family account, an adult family member automatically obtains access to the shared family account, as well as designated content servers for obtaining content, and various services, such as a family group messaging service, a family calendar service, and device location service by which the computing devices of other family members may be easily located and shown on a map or caused to output an audio sound for locating.

Accordingly, in one aspect a method comprises, at an electronic device with a display, displaying a first screen to initiate setup of a family account at an online content storage system that is to be shared between family members. The electronic device receives an input on the first screen initiating setup of the online content storage account, and displays an identifier of a family account organizer and an indication of a source account with the online content storage system. The electronic device then displays at least one account to be selected as a purchase account for the family account, wherein purchases of content items by any family member having access to the family account are stored on the online content storage system in association with the family account, and can be accessed by any other family member having access to the family account. The electronic device receives an input selecting an account as the purchase account, and then displays credit card information associated with the purchase account. The electronic device receives an input confirming the credit card information, and sends to the online content storage system an indication to associate the credit card number for the purchase account with the family account. The device then displays a list of family members having access to the family account, along with an indication of the credit card number associated with the family account, and a first user interface element to add a family member to the family account.

In another aspect, the method includes the electronic device receives a selection of the user interface element to create an account identifier for a child family member, and then displays an input field for receiving a credit card verification number for a credit card number associated with the family account. Where electronic device receives an input that matches an actual credit card verification number of the credit card number associated with the account, and proceeds with the creation of an account identifier for the child family member by displaying input fields for receiving identification information for the child family member. If the electronic device receives an input that does not match the actual card verification number of the credit card number associated with the account, it terminates the creation of an account identifier for the child family member, and displays a list of family members having access to the family account, wherein the list of family members does not include the family child member.

In another aspect, the method includes the electronic device displaying a control for receiving an input selectively enabling the online content storage system to transmit to an adult family member associated with the family account, prior to a purchase of content by the added family member, a message indicating the content being to be purchased by the added family member and indicating that the adult family member has an option to approve the purchase prior to the purchase being processed and the content downloaded to a computing device of the added family member.

In another aspect the method includes the electronic device displaying an indication that the added family member is automatically associated with a shared family calendar service associated with the family account, or displaying an indication that the added family member is automatically associated with a group messaging service associated with the family account, or displaying an indication that the added family member is automatically associated with a device location service associated with the family account.

In another aspect the method includes the electronic device displaying an input field for receiving an identifier of the family member to be added to a family account at an online content storage system that is shared between family members, and receiving the identifier of the family member to be added to the family account. The electronic device determines an age of the family member to be added to the family account. Responsive to the age of the family member being less than a predetermined age limit, the electronic device selects one of a plurality of content access and purchase restriction templates to be associated with the family member, and displays an indication of the selected content access and purchase restriction template. The selected content access and purchase restriction template is applied the account of the added family member.

A real time purchase approval process enables an adult family member to approve a purchase of content being made by a child family member from a content server accessible to the child family member. In this aspect, a content storage system (and associated content servers) receives from the computing device of the child family member, a selection of content item to be purchased by the child family member. The content storage system determines from the account of the child family member whether a real time approval process is required. If so, the content storage system notifies, via the computing device, that approval of an adult family member is required prior to the purchase, and providing options for the child family member to request approval of the purchase or decline. If the child family member requests approval of the purchase, then in one embodiment the content storage system transmits to a computing device of at least one adult family member a message informing the adult family member that their approval is required for the child family member to purchase the content and providing options for the adult family member to review the request or defer the request until a later time. If the adult family member defers the request, the content storage system sets a timer and repeats the approval request at a later time. If the adult family member reviews the request, the content storage system provides an indication of the content being purchased, and options to either accept or decline the purchase. If the adult family member declines the purchase, then the purchase is terminated and the content is not made available to the child family member. If the adult family member approves the purchase, then content storage system proceeds to process the transaction and download the content to the child family member's computing device. In one embodiment, the child family member's computing device displays a message providing the child family member options for having an adult family member approve the purchase request in person. If the child family member selects the option to have an adult family member approve in person, then the computing device displays a screen into which the adult family member can enter their account password, or other authentication information (e.g., credit card verification code). Once the adult family member is authenticated then the purchase is processed and the content is downloaded to the child family member's computing device.

In one aspect, a method comprises at a content storage system associated with a one content server from which content can be purchased, storing a family account at the content storage system, the family account having at least one adult family member and at least one child family member, the family account associated with a purchase account. The content storage system receives from a computing device of a child family member a request to purchase a content item from the content server associated with the content storage system. The content storage system determines from family account whether the purchase requires a real time approval by an adult family member associated with the family account. In response to determining that the purchase requires a real time approval, and prior to processing the purchase and downloading the content item to the computing device of the child family member, the content storage system transmits to a computing device of the at least one adult family member a message indicating that approval of the purchase by the child family member is required. In response to receiving an approval message from the computing device of the adult family member, the content storage system processes the purchase transaction using the purchase account, and transmits the purchased content item to the computing device of the child family member. In response to receiving an a decline message from the computing device of the adult family member, the content storage system terminate the purchase.

Note that the various embodiments of the family sharing account described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

FIGS. 3.1 to 3.22 are illustrations of exemplary user interface screens displayed on a computing device in conjunction with the family account management operations described with respect to FIG. 2.

FIGS. 4.1 and 4.2 are illustrations of exemplary user interface screen displayed on a computing device in conjunction with operations for locating a user's computing device.

FIGS. 7.1-7.10 are illustrations of exemplary user interface screens displayed on a computing device in conjunction with the operations described with respect to FIGS. 6A-6B for a real-time purchase approval process.

The figures depict, and the detail description describes, various non-limiting embodiments for purposes of illustration only. One skilled in the art will readily recognize from the following discussion that alternative embodiments of the structures and methods illustrated herein may be employed without departing from the principles described herein.

DETAILED DESCRIPTION

Overview of System Architecture

Figure 1A:
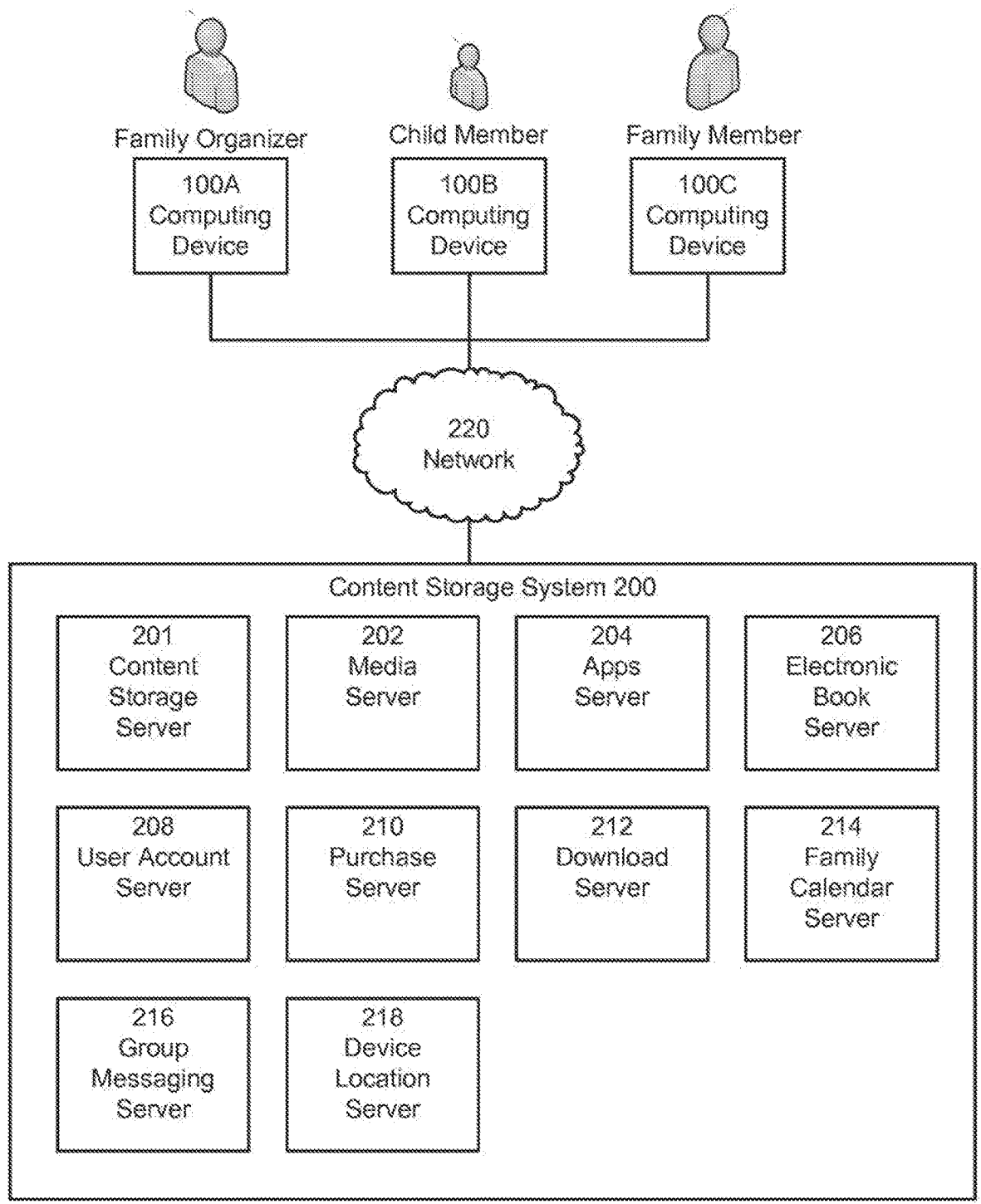
FIG. 1A is a high level block diagram of an exemplary environment for a content storage system.

An online content storage system enables users to set up family accounts that include accounts accessible by children of the family. FIG. 1A is a high level block diagram of an exemplary environment for such an online content storage system 200. The environment includes multiple computing devices 100, as would be used by a user to access the sharing system 200. For purposes of illustration, as will become apparent further below, there are shown three representative electronic computing devices 100A, 100B, and 100C, each associated with a family member; when referring to the computing devices in general, reference 100 will be used. The environment further includes a content storage server 201, a media server 202, an application ("apps") server 204, an electronic book ("e-book") server 206, a user account server 208, a purchase server 210, a download server 212, a family calendar server 214, a group messaging server 216, and a device location server 218. These various systems and servers are communicatively coupled to the computing devices 100 via network 220.

The content storage server 201 enables users to upload, search, browse and share content with others, including but not limited to other family members. Content handled by the content storage server 201 includes any type of files, including documents, presentations, computer data, spreadsheets, images, movies, music, applications, and so forth. Embodiments of a content storage server suitable use as the content storage server 201 are disclosed in US20130311597 which is incorporated by reference herein in its entirety.

The media server 202 provides an online, digital media store through which users of computing devices 100 to search, browse and obtain various types of media, including music, videos, movies, and television programs. The apps server 204 provides an online, digital media store through which user to search, browse and obtain executable computer applications and computer data for their computing device 100. The e-book server 206 provides an online, digital media store through which users to search, browse and obtain electronic books, magazines, journals for reading on their computing devices 100. Embodiments of various servers suitable for use as the media server 202, app server 204, and e-book server are described in U.S. Pat. Nos. 7,895,661 and 7,899,714 which are incorporated by reference in their entirety, herein. Any of the foregoing types of digital content can be free, rented, trial, or purchased. In one embodiment, the transactions are from these various servers are handled by the purchase server 210, and the subsequent downloading of content is handled by the download server 212.

The family calendar server 214 provides support for hosted calendars that can be shared among family members. Embodiments of a calendar server suitable for use as the family calendar server 214 are disclosed in U.S. Pat. Nos. 7,822,713 and 7,814,055, which are incorporated by reference in their entirety, herein.

The group messaging server 216 provides a platform for instant messaging between users, and in the embodiments described here, is beneficially used to provide instant messaging services between family members associated with a family account. Embodiments of a messaging server suitable for use as the group messaging server 216 are disclosed in U.S. Pat. Nos. 8,468,580, 8,352,873, 8,554,861, 8,020,105 and US20110055735, each of which is incorporated by reference in its entirety, herein.

User accounts server 208 stores information regarding user profile data (e.g., name, address, account ID, birthdate, access preferences and restrictions) and transactional information (e.g., purchase history, search history, etc.) for each user. The accounts server 208 handles updating of user account information, as well as verification and authentication of user credentials such as user name, user email address, user passwords.

Figure 1B:
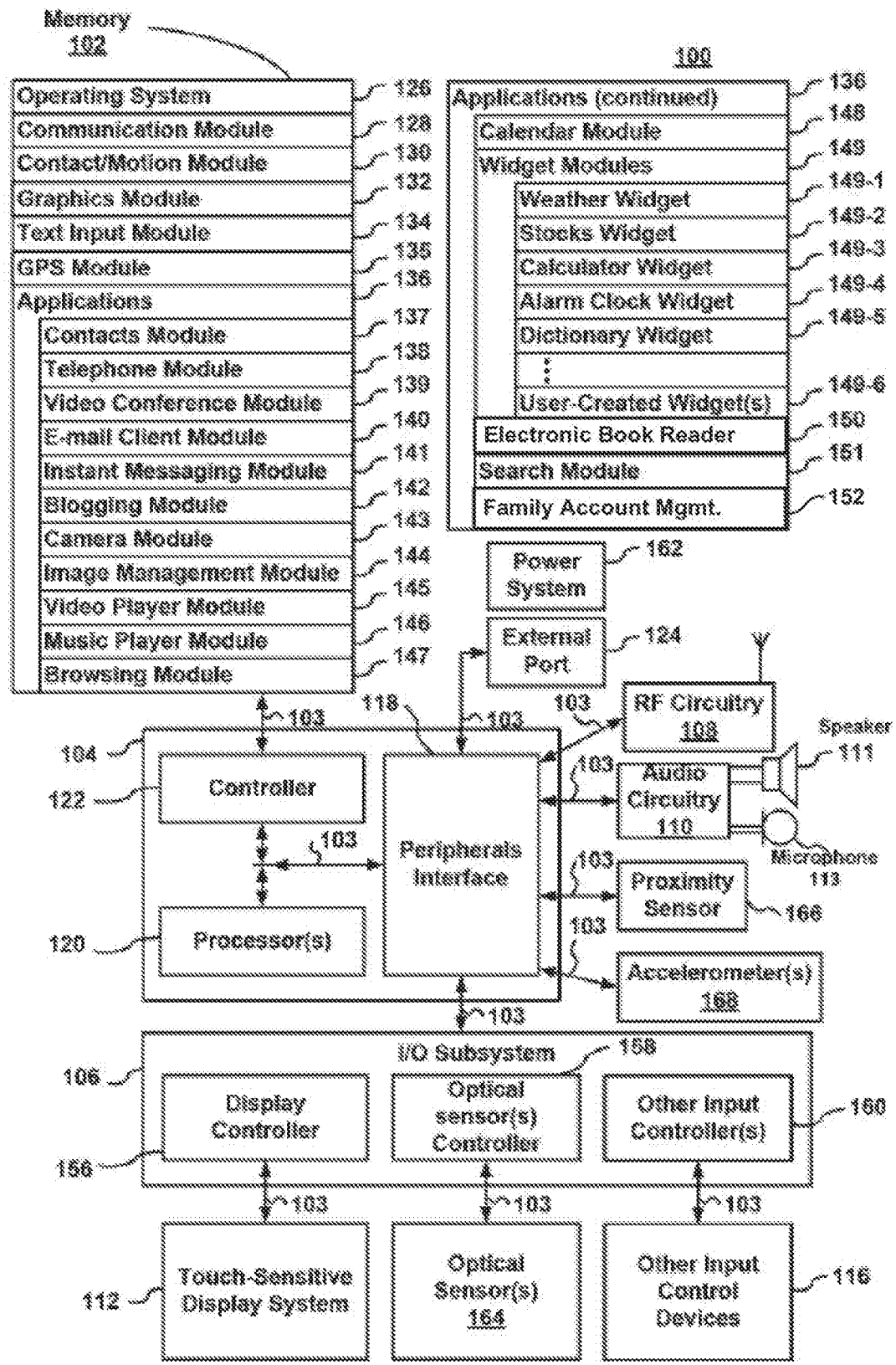
FIG. 1B is a high-level block diagram of an exemplary computing device.

FIG. 1B is a diagram of a computing device 100. The computing device 100 includes a memory 102 (which may include one or more computer readable storage mediums), a memory controller 122, and one or more processing units (CPU's) 120, a peripherals interface 118. The device 100 may further include RF circuitry 108, audio circuitry 110, a speaker 111, a microphone 113, an input/output (I/O) subsystem 106, other input or control devices 116, and an external port 124. The computing device 100 may include one or more optical sensors 164. These components communicate over one or more communication buses or signal lines 103. The device 100 includes display, which can be a touch-sensitive display system 112 according to one embodiment. The touch-sensitive display system 112 is referred to herein as a "touch screen" for convenience, and may also be known as or called a touch-sensitive display system.

The computing device 100 shown in FIG. 1B is only one example of a portable multifunction device, and the computing device 100 may have more or fewer components than shown, may combine two or more components, or a may have a different configuration or arrangement of the components. The various components shown in FIG. 1A may be implemented in hardware, software or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an Intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons may include an up/down button for volume control of the speaker 111 and/or the microphone 113. The one or more buttons may include a push button. A quick press of the push button may disengage a lock of the touch screen 112 or begin a process that uses gestures on the touch screen to unlock the device, as described in U.S. Pat. No. 7,657,849, which is hereby incorporated by reference. A longer press of the push button may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects, further details of which are described below.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112.

The display controller 156 determine movement of contact based on speed, velocity, pressure, and/or an acceleration of the contact point, and tracks the movement across the touch screen 112. The display controller 156 determines if the contact has stopped such as the detection of a finger-up event or a break in contact with the touch screen 112. These operations may be applied to a single contact (e.g., one finger touch) or to multiple simultaneous contacts.

The display controller 156 detects a gesture input by a user on the computing device 100. Different gestures have different touch patterns. A touch pattern is characterized by one or more contact points and their associated movements, from which the spatial or geometrical relationships between the contact points can be determined. The display controller 156 detects a gesture based on a particular touch pattern on the display screen. For example, the display controller 156 detects a finger tap gesture by detecting a finger-down event indicating an initial contact of a position on the touch screen 112 followed by detecting a finger-up event at substantially the same position where the finger is no longer touching the touch screen. In another example, the display controller 156 detects a finger swipe gesture on the touch screen based on detecting a finger-down event (appearance of a contact point) followed by detecting one or more finger-dragging events where the user drags his or her finger from the position associated with the finger-down event to another position on the touch screen 112 (movement of a contact point), and subsequently followed by a finger-up event (disappearance of the contact point).

A touch-sensitive display in some embodiments of the touch screen 112 may be analogous to the multi-touch sensitive tablets described in U.S. Pat. Nos. 6,323,846, 6,570,557, and US20020015024, each of which is hereby incorporated by reference herein, in its entirety. However, a touch screen 112 displays visual output from the portable device 100, whereas touch sensitive tablets do not provide visual output.

A touch-sensitive display in some embodiments of the touch screen 112 may be as described in U.S. Pat. Nos. 8,279,180, 7,663,607, 20060026521 U.S. Pat. Nos. 8,239, 784, 7,614,008, 7,844,914, US20060033724, and US20060197753, each of which are incorporated by reference in its entirety, herein.

The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen 112, the computing device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the computing device 100 may include a physical or virtual click wheel as an input control device 116. A user may navigate among and interact with one or more graphical objects (henceforth referred to as icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The computing device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The computing device 100 may also include one or more optical sensors 164. FIG. 1B shows an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the computing device 100, opposite the touch screen 112 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The computing device 100 may also include one or more proximity sensors 166. FIG. 1A shows a proximity sensor 166 coupled to the peripherals interface 118. Alternately, the proximity sensor 166 may be coupled to an input controller 160 in the I/O subsystem 106. The proximity sensor 166 may perform as described in U.S. Pat. Nos. 7,653,883, 8,381,135, 7,957,762, 7,633,076, and 8,006,002, each of which are incorporated by reference herein, in its entirety. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

The computing device 100 may also include one or more accelerometers 168. FIG. 1B shows an accelerometer 168 coupled to the peripherals interface 118. Alternately, the accelerometer 168 may be coupled to an input controller 160 in the I/O subsystem 106. The accelerometer 168 may perform as described in U.S. Pat. Nos. 7,218,226 and 7,688,306, each of which are incorporated by reference herein, in its entirety. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/ motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred, determining if there is movement of the contact and tracking the movement across the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 also detects contact on a touchpad. In some embodiments, the contact/motion module 130 and the controller 160 detects contact on a click wheel.

The graphics module 132 includes various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like.

The text input module 134, which may be a component of graphics module 132 provides soft keyboards for entering text in various applications (e.g., contacts 137, e-mail 140, IM 141, blogging 142, browser 147, and any other application that needs text input).

The GPS module 135 determines the location of the device and provides this information for use in various applications (e.g., to telephone 138 for use in location-based dialing, to camera 143 and/or blogger 142 as picture/video metadata, and to applications that provide location-based services such as weather widgets, local yellow page widgets, and map/navigation widgets).

The applications 136 may include the following modules (or sets of instructions), or a subset or superset thereof:
a contacts module 137 (sometimes called an address book or contact list);
a telephone module 138;
a video conferencing module 139;
an e-mail client module 140;
an instant messaging (IM) module 141;
a blogging module 142;
a camera module 143 for still and/or video images;
an image management module 144;
a video player module 145;
a music player module 146;
a browser module 147;
a calendar module 148;
widget modules 149, which may include weather widget 149-1, stocks widget 149-2, calculator widget 149-3, alarm clock widget 149-4, dictionary widget 149-5, and other widgets obtained by the user, as well as user-created widgets 149-6;
electronic book reader module 150
search module 151;
family account management module 152,
Examples of other applications 136 that may be stored in memory 102 include a video chat application, a messaging application, other word processing applications, JAVA-enabled applications, encryption, digital rights management, voice recognition, and voice replication.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module. In some embodiments, memory 102 may store a subset of the modules and data structures identified above. Furthermore, memory 102 may store additional modules and data structures not described above.

In some embodiments, the computing device 100 is a device where operation of a predefined set of functions on the device is performed exclusively through a touch screen 112 and/or a touchpad. By using a touch screen and/or a touchpad as the primary input/control device for operation of the computing device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the computing device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 1C:
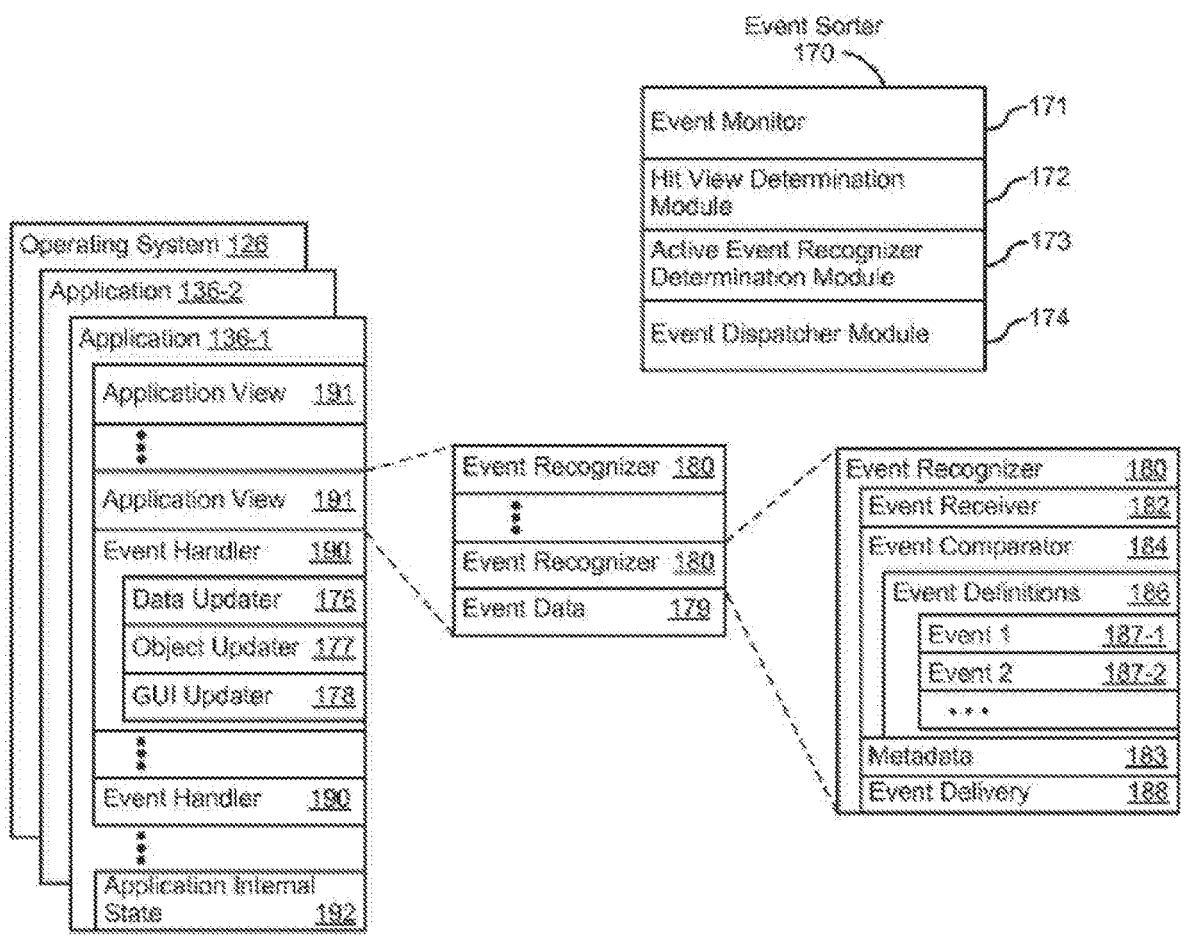
FIG. 1C is a block diagram of exemplary components for event handling.

FIG. 1C is a block diagram illustrating exemplary components for event handling in accordance with one embodiment. In one embodiment, memory 102 (in FIG. 1A) includes event sorter 170 (e.g., in operating system 126), operating system 126, one or more applications (e.g., 136-1 and 136-2, which can be any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to one or more event recognizers (e.g., event recognizer 180). In some embodiments, event dispatcher module 174 dispatches the event information to one or more event recognizers in a single application. In other embodiments, event dispatcher module 174 dispatches the event information to event recognizers in a plurality of applications 136, or the operating system 126 and at least one application. In embodiments including active event recognizer determination module 173, event dispatcher module 174 delivers the event information to one or more event recognizers including an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, respective applications (e.g., 136-1 and 136-2) include a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In some embodiments, the operating system 126 includes one or more event recognizers 180. In some embodiments, the event sorter 170 includes one or more event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Family Account Management

The online content storage system 200 enables users to set up and manage family accounts that include accounts accessible by children of the family. To facilitate the set up process, a computing device 100 executes the family account management module 152 which displays a sequence of user interface screens configured to obtain information pertinent to the attributes of the accounts of the family members. The family account management module 152 can be locally executed on the computing device as illustrated, or can be itself hosted on the content storage system 200, e.g., as a browser accessing screens provided by the content storage system 200.

Referring again to FIG. A, there is shown three computing devices 100A, 100B, and 100C. In the context of the following description, device 100A is assumed to be used by an adult family member identified as the "family organizer," device 100B is assumed to be used by a child family member, and device 100C is assumed to be used by another adult family member.

Figure 2:
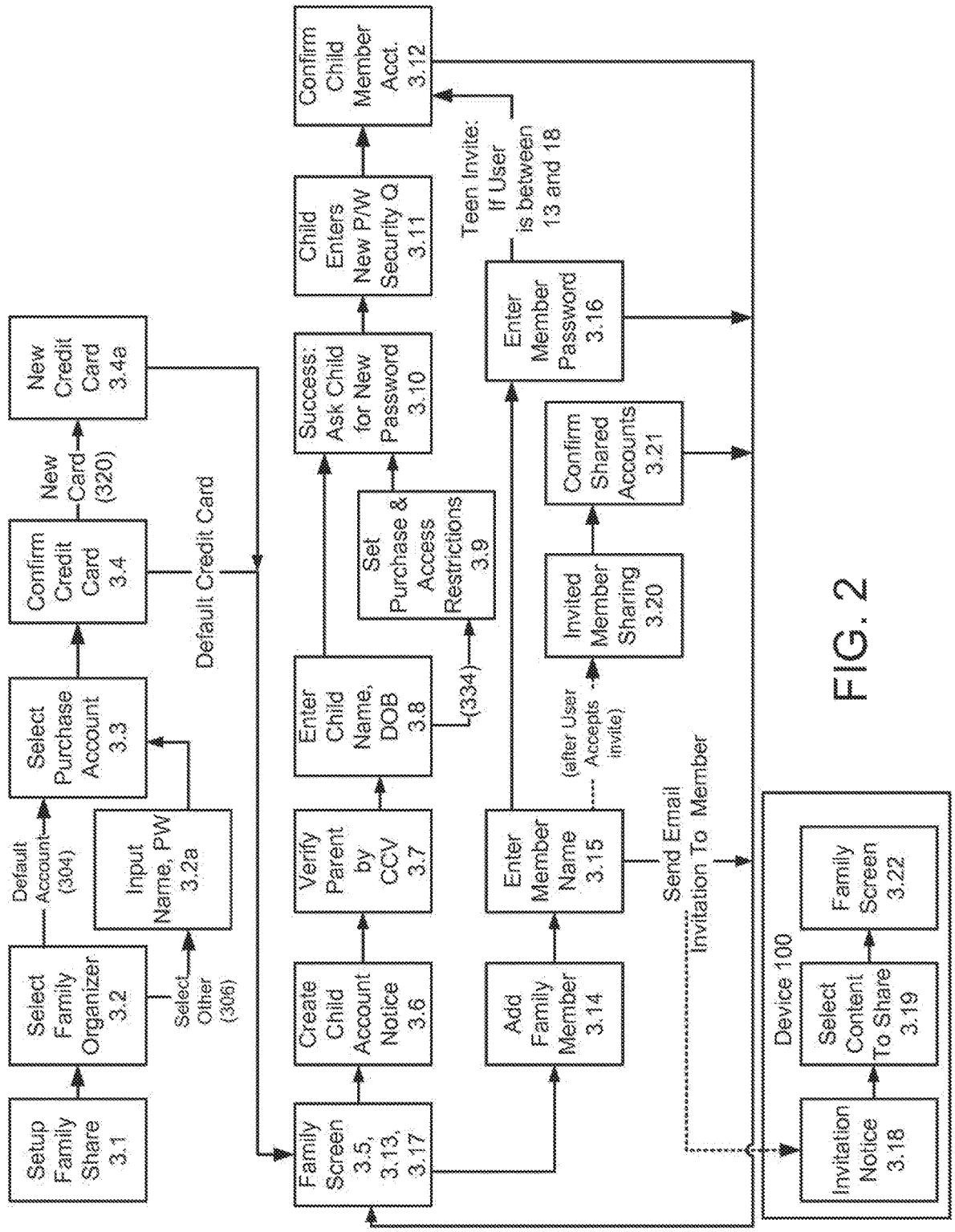
FIG. 2 is a flow diagram illustrating various sequences of operations for setting up a family account in the content storage system.

Referring generally to FIG. 2 there is shown an overall execution flow provided by the family account management module 152, according to one embodiment. Other embodiments may perform the operations in the execution flow in other sequences. Examples of various user interfaces that can be displayed by the computing device 100 in conjunction with the steps of the method flow are illustrated in FIGS. 3.1 to 3.22, as indicated in FIG. 2. These user interfaces are referred herein as "screens," which is understood to include windows, banners, pages, dialogs, messages and other graphical presentations of information. In addition, throughout reference is made to actions and operations initiated in response to various user interface elements including links and controls; other types of user interface elements such as buttons, check boxes, menus, dials, and the like may be used in place of the described links and controls to achieve the described functionality. Further, transmissions of information between the computing devices 100 and the content storage system 200 (or component thereof) may be characterized equivalently as messages, indications, notifications, packets, or other carriers of data between computing systems, whether or not explicitly described as such below. It is understood that such transmissions occur via the network 220 using communications protocols such as previously identified. It is further understood that the described processes require the use of computer systems, and cannot be performed in whole or in part by mental steps by a human being.

Generally, FIGS. 3.1 to 3.22 illustrate the user interface of the family account management module 152 as it would be displayed on a display device of the computing device 100. For ease of understanding, the steps in FIG. 2 are numbered in correspondence with the figure numbers, thus when reference is made to a step 3.x in FIG. 2 the corresponding FIG. 3.x should be consulted as well. For example, when referring to step 3.1 in FIG. 2, reference FIG. 3.1 should be consulted as an illustration.

The method flow begins with a family sharing setup prompt 3.1, such as illustrated in screen 301 shown in FIG. 3.1, which notifies the user of the overall purpose of the family sharing setup to share media (e.g., photos and videos), electronic books, music, and applications with other family members. The user can continue via selection of a link 303, or can exit by selection of the navigation button 300. Generally, selection of navigation button 300 at any time exits the family sharing setup process, (or any other process currently being handled) and returns the computing device 100A to a prior application state or home page.

Following selection of link 303, the family sharing module 152 prompts 3.2 the user to select a specific account to use for sharing with other family members ("family account"). The user setting up the family sharing accounts is termed the "family organizer," as shown in screen 305 in FIG. 3.2. The family sharing module 152 selects by default as the family account the account that the user is currently signed in with the content storage system 200. To identify the currently signed in account, the family sharing module 152 may, for example, send a query from the computing device 100A to the media server 202 with the user's email address (which is stored in the computing device 100A) to obtain the user's account ID 302. The user can select the default account at link 304 or select another one of the user's accounts at link 306. If the user selects 306 another account, the family sharing module 152 presents a screen that accepts a user ID and password for a different one of the user's accounts, such as screen 302a in FIG. 3.2a; this user ID and password is provided to the media server 202 which verifies the user's credentials and displays the user ID and name on screen 305 shown in FIG. 3.2 to indicate the family organizer for the account. The account selection is transmitted to the content storage system 200.

Following selection 3.2 of an account for use as the family account, the family sharing module 152 prompts 3.3 the family organizer to select which account is to be used for purchases by other family members ("purchase account"), with a selection of links for a music account 308, an e-books account 310, an apps account 312, or another account 314, such as illustrated on screen 307 in FIG. 3.3. The availability of these accounts can be determined by the family sharing module 152 by querying the user account server 208 to determine which accounts are associated with the user's account ID, which information is then returned and associated with the displayed link. The selection of purchase account enables the family members having access to the family account with an account to which they may use for payment of content items available from the media server, e-books server, or apps server. In one embodiment, one of the identified music, e-books, or apps accounts is preselected as a default account.

Each of the user's music account 308, an e-books account 310, an apps account 312, or another account 314 is associated with a credit card, debit card or other payment mechanism. Accordingly, following selection 3.3 of one of the user's accounts as a purchase account, the family sharing module 152 retrieves from the user account 208 the payment information, e.g., credit card number, associated with the selected account, and displays at least a portion (e.g., the full number or the last 4 digits) of the credit card number 316 to user, along with auxiliary information such as expiration date, such as illustrated on screen 309 in FIG. 3.4. The user can select link 318 to confirm 3.4 the use of the identified card, or select link 320 to input 3.4a information for another payment mechanism, e.g., a different credit card number, expiration date, and verification code, as illustrated on screen 311 in FIG. 3.4a. (In one optional embodiment, following selection of link 318 the family sharing module 152 displays an input field to receive the credit card verification code for the selected credit card number, thereby further ensuring that the user is authorized to use the credit card number for the purchase account.) The family sharing module 152 transmits the entered information to the purchase server 210 for authentication; once authenticated the updated card information is stored in account with the user's account as the credit card for use with the purchase account.

Following selection of a purchase account (or new payment information), the family sharing module 152 provides 3.5 a family screen 321, such as illustrated in FIG. 3.5. The family screen 321 includes the name 322 of the family organizer, a portion of the credit card number 324 to be used for shared purchases, and links for initiating operations for adding a family member 326 to the family account, and creating a new account for a child family member 328. The family screen 321 serves as a base screen to which each member of the family account is directed when accessing the family sharing module 152.

Following selection of the link 328 for creating a new account for a child family member, the family organizer is prompted 3.6 with a notification explaining that a child account must be linked to an account of an adult family member, such as on screen 323 in FIG. 3.6. This feature further emphasizes that a child generally is not allowed to create an account by themselves on the content sharing system, and thus the child's account can only exist by virtue of being linked to the account of an adult family member. This aids in ensuring that appropriate legal, regulatory and privacy requirements pertaining to online services for children are satisfied. Following selection of a continue link 330, the family sharing module 152 verifies 3.7 that the present user is the an adult family member with authority to create the child account by prompting the user to enter the credit card verification code 332 associated with credit card for the purchase account, such as illustrated by screen 325 in FIG. 3.7. The operative assumption here is that only an adult family member would have this information, not a child of the family. After this verification code 332 in entered and the family organizer selects the continue link 334, the family sharing module 152 transmits the code to the purchase server 210, which authenticates the code against stored information by the user account server 208. If the code is verified, then the family sharing module 152 presents 3.8 a child information screen for receiving information for the child family member, such as screen 327 illustrated in FIG. 3.8. The use of the credit card verification code 332 as a verification mechanism is a very efficient and reliable way of ensuring that an adult family member is actually creating the child account, and beneficially reduces the amount of time and data entry steps (and thereby battery usage) on the computing device 100 to create the child account.

In the child information screen 327, the family organizer (or other adult family member) inputs the child's first and last names (336, 338), and date of birth 340. The family organizer can optionally select link 334 to set customized purchase and access restrictions for child, as further described below. Selection of link 342 transmits this information to the content storage system 200, which provides it to the user accounts server 208. The accounts server 208 creates a new account for the child, and links the child account to the shared family account, and returns an indication of a successful account creation to the family sharing module 152. To create an account for the child, the accounts server 208 creates a new account ID for the child and uses that account ID as an email address associated with the content storage system 200.

During (via link 342) or after the creation of the child account, the family organizer can set 3.9 specific purchase and access restrictions for a child, such as illustrated in screen 329 in FIG. 3.9. By default, for a new child family member purchase and access restrictions are enabled via control 360. The family organizer can deselect control 360 to turn off purchase and access restrictions. Further, the family organizer can select via controls 361 individuals ones of the services (music/media, electronic books, applications) to allow or prohibit access by the child member. In addition, the family organizer can set content ratings, by selecting a rating country 362 (e.g., the USA, UK, Japan, China, etc.) from a plurality of countries; each country is associated with a set of content ratings for movies and games. Responsive to the selected rating country, the appropriate set of available movie 364 and game ratings 366 is retrieved from the content storage system 200 and at least a portion thereof is displayed in corresponding fields, from which the family organizer can select to apply. These ratings are used to restrict the media that the child can access from the various content servers.

Further, the family organizer can select a control 370 to automatically update the restrictions as the child ages. Different templates of content access and purchase restrictions for media, movie ratings, and game ratings for different age ranges are stored by the user account server 208, for example a template for children ages 5-10, a template for children in the U.S. ages 11-13, a template for children ages 14-17, and template for users over age 18. Different sets of content access and purchase restriction templates are stored for different countries (e.g., US, Canada, United Kingdom, Japan, China) to reflect different cultural standards and rating systems. The user account server 208 automatically updates the particular restrictions applied to child member's account based on the age of the child. For example, each time a child member logs into the content storage system 200, the user account server 218 can determine the current age of the child from the birth date information previously entered and the current date. If the child's age in years has changed, the server 218 looks up the appropriate content restriction template for the current age and child's country and updates the restrictions accordingly.

Referring again to FIG. 2, responsive to the indication of the successful account creation for the child account, the family sharing module 152 provides 3.10 an indication that the account has created, and displays the child's name, and account ID, such as on screen 331 illustrated in FIG. 3.10. The screen 331 further includes a link 344 to a screen in which the child can enter a password for their new account, such screen 333 as illustrated in FIG. 3.11. The operative assumption here is that the child is present while the family organizer is creating the child's account, and at this step the family organizer can provide the family organizer's computing device 100A to the child for inputting the password.

As illustrated in FIG. 3.11, screen 333 is configured to receive a password 346 (and a confirmation re-entry) from the child, along with a selection of a security question 348 and an answer 350. The family sharing module 152 transmits the password, security question and answer to the user accounts server 208, which stores the information securely (e.g., stores an encrypted or hashed version thereof). After entering this information, the child would return the computing device 100A back to the family organizer.

Following step 3.11, the family sharing module 152 confirms 3.12 that the family organizer is allowing the child family member to purchase content from the various available content sources using the purchase account, for example using the screen 335 illustrated in FIG. 3.12. In this example, the family organizer is presented with a set of controls 356 to select which content sources, such as a music store (e.g., media server 302), e-book store (e.g., electronic book server 216), or app store (e.g., apps server 204) are available to the child from which to make purchases, using the previously designated purchase account. In one embodiment, all of the available content sources as enabled for purchases by default. The family organizer can deselect individual content sources as desired. Additional confirmations, such as agreement to legal terms and conditions, may be included in confirmation step 3.12.

Another feature of the confirmation step 3.12, as illustrated in FIG. 3.12, is the option to enable a real-time purchase approval process for purchases made by a child family member, via Ask to Buy link 352. Generally, when the real-time purchase approval feature process is enabled, then each time the child family member is about to make a purchase of content to be charged to the purchase account, a notification is sent to computing device 100 of each adult family member (or alternatively to a designated adult, such as the family organizer) identifying the content being purchased and the price, so that the family organizer can approve the purchase. The family member can approve the purchase via an interface on their computing device 100, or optionally in one embodiment via the computing device 100B of the child family member making the purchase. This option can be enabled by default, and is further described below.

Upon selection of the continue link 354, the designated selections are transmitted to the content storage system 200, which passes the selections to the account server 208 to update the account information for the family sharing account and the child member account.

The family sharing module 152 displays 3.13 an updated family screen 321, such as illustrated in FIG. 3.13, where the name of the child family member is now shown, along with the indicia 356 that the child has a child account.

From the family screen 321, the family organizer may also select link 326 to initiate operations for adding a family member to the family account, where the family member already has an account ID with the content storage system 200. Following selection of link 326, the family sharing module 152 displays 3.14 a screen configured to receive the name or email address in field 358 of the family member to be added to the family account, such as screen 337 shown in FIG. 3.14. The family organizer would enter the name or email address 358 and select the continue link 360. In response, the family sharing module 152 passes the name or email address to the contacts module 137 which searches the family organizer's contact directory on the computing device 100A for a match. One (or more) matching names or email address from the family member's contact directory are then presented to the family organizer (not shown) who then selects the appropriate name. The family sharing module 152 transmits the selected name and/or email address to the content storage system 200, which provides the name and/or email address to the user account server 208. The account server 208 verifies that there is an account ID on the content storage system 200 that is associated with the name and/or email address.

If the verification by the account server 208 is successful, the family sharing module 152 is notified and it updates 3.15 the display of the name in field 358 on screen 337 in visually distinguished manner (e.g., change of color, font), as illustrated in FIG. 3.15. Also, the family sharing module 152 displays two new links, including a link 360 to have the identified family member enter their password, and a link 362 to send an email invitation to the identified family member at their email address. These two links present options by which the identified family member can accept being included in the family sharing account.

More specifically, the link 360 is beneficially selected by the family organizer when the identified family member is present in the same location as the family organizer, and as before, allows the family organizer to provide the computing device 100A to the family member to enter their password directly, as illustrated for example by screen 339 in FIG. 3.16. Here, responsive to the family member entering their password, the family sharing module 152 transmits the password and email address (preferably in a secure transmission) the system 200, which passes the information to the user account server 208 to authenticate the family member. Following an indication from the server 208 that the family member has been authenticated, the family sharing module 152 updates 3.17 the family screen 321, to show the name 362 of the newly included family member, for example as shown in FIG. 3.17.

As part of the authentication check by the user account server 208, the server 208 determines from the user's account whether the invited family is a teenager, e.g., has an age in a predetermined age range, such as ages 13-18 (which range can be varied on a country by country basis by a system administrator). If the invited family member is in the teenage age range, then the family sharing module 152 displays 3.12 the confirmation screen 335, such as illustrated in FIG. 3.12, to the family organizer to confirm that the invited family member is allowed to purchase content, and to enable the family organizer to Ask to Buy link 352 to require real-time purchase approval for that family member's purchases.

Referring back to step 3.15 and FIG. 3.15, if the family organizer selected link 362, then the family sharing module 152 transmits an email to the email address of the identified family member with an invitation to have that person join the family account, and then would also return to family screen 321, as in screen 321 shown in FIG. 3.17, and optionally displays an indicia that the member has been sent an invitation. This path would be followed, for example, if the family member to be added to the family was not available to input their password on the computing device 100A of family organizer at step 3.16, described above. Accordingly, at the computing device 100C of the invited family member, an invitation notice is displayed 3.18, such as screen 341 illustrated in FIG. 3.18. The screen 341 lists 364 the family members associated with the family account, and includes links for the user to each accept 366 or ignore 368 the invitation. Following selection of accept link 366, the family sharing module 152 on the computing device 100C displays an indication to family member of the various content sources and service being shared as part of the family account, for example as illustrated on screen 343 in FIG. 3.19. In one embodiment, the invited member by default has access to all of the content sources and services that are associated with the family account; the invited family member can then select which sources and services they do not want access to, by deselecting appropriate controls 372.

As illustrated in FIG. 3.19, in one embodiment an invited family member is automatically associated with an entire platform of services and content sources that are shared among members of the family account. These include access to the various sources of content and media, such as files (e.g., files, photos, documents) managed by the content storage server 201, as well as media (e.g., music, movies, television programs) available via the media server 202, computer applications via the app server 204, electronic books via the e-book server. Following selection of accept link 374, the family sharing module 152 transmits the selected content to the user account server 208, which updates the account information for the family account. The family sharing module 152 on the invited family member's computing device 100C then displays 3.22 an updated family screen 321 as illustrated in FIG. 3.22.

Referring to FIG. 2 again, following the invited family member's acceptance of the invitation, the user account server 208 notifies the family sharing module 152 on the family organizer's computing device 100A that the invitation has been accepted. The family sharing module 152 displays 3.20 a notification screen, such as illustrated in FIG. 3.20. Following selecting of the continue link, the family sharing module 152 displays 3.21 a confirmation screen 375, such as illustrated in FIG. 3.21, indicating which of the various content sources and services the invited family member has elected to share. In the example of FIG. 3.21 the invited family member is has access to the shared content sources for media, books, and applications (e.g., media server 202, apps server 204, and e-books server 206), as well as a shared family calendar, family group messaging, and device location service, as further described below.

When a family member joins a family account, the family member is automatically given access to a shared calendar associated with the family account. More specifically, upon creation of a family account, an online calendar of the family in instantiated and associated with the family account, and with each user account ID associated therewith. Access privileges are predefined by age group. For example, access privileges for each adult family member include the ability to create, edit, and delete calendar entries, as well as invite others, including family members and non-family members to calendared events. Child family members have restricted access privileges, so that they can see but not edit or delete calendar entries created by other family members. Access privileges for teen family members can be to create personal calendar entries only, and see but not edit calendar entries for other family members. The family organizer can modify the access privileges for teen and child family members. Management of these access privileges, as well as updating and distribution of calendar events between family members is handled by the family calendar server 314. More specifically, when a user accesses the calendar module 148 on their respective computing device 100, the module 148 passes the user's credentials (e.g., user account ID, password) to the family calendar server 216; the server 216 uses the account ID to identify the family calendar associated with the user account ID. Upon identification of the appropriate family calendar, the calendar server 216 transmits to the calendar module 148 current calendar information and access restrictions (if any), which calendar can then be displayed to the user on the user's computing device 100.

Another service to which family members are automatically given access to upon being added to a family account is a group messaging service, by which family members can readily use the instant messaging module 141 to communicate with each other. More specifically, in one embodiment, the group messaging server 216 maintains for each family account a list of family members. When a family organizer adds a new family member to the family account, the family sharing module 152 notifies the group messaging server 216 of the account ID and user name of the added member, and the group messaging server 216 updates the list of family members for the family account. When the newly added family member accesses the instant messaging module 141 on their computing device 100C, the module obtains from the group messaging server 216 the current list of family members for the family account. These family members are then added by the instant messaging module 141 to the family member's list of preselected users (e.g. "favorites" or "buddies" or "friends") for messaging, which, for example, can place that the names of these family members at the top of the list for ease of access by the family member. This automatic configuration of the instant messaging module 141 on a user's computing device 100 saves the family member time by eliminating the need to manually configure the instant messaging module 141 to include each family member, and thereby has the beneficial side effect of saving battery life on the device 100.

Another service to which family members are automatically given access upon being added to a family account is a device location service, provided by the device location server 218. As noted above, a computing device 100 preferably includes a GPS module 135 that is enabled to determine the geographic location of the device 100. Referring to FIG. 4.1 a family member can access a find family members screen 400, which displays a list 401 of the family members associated with the family account. The family member can then select one or more family members for locating their respective device. In one embodiment, following selection of find family members link 404, the computing device 100 transmits the account IDs for the selected family members to the device location server 218. The device location server 218 queries the user account server 208 to confirm that the requesting user is a member of a family account including the other account IDs; this ensures that only a family member can locate other family members, thereby preserving the privacy of the family members. Following verification that the requesting user is a member of a family account including the other account IDs as family members, the device location server 218 returns a map 403, such as illustrated in FIG. 4.2 with the locations 405 of each of the other family members shown thereon. Optionally, the device location server 218 can send an instruction to each computing device 100 of the respective family members to play a sound or a tone (e.g., a ping or a ringtone) to alert the user that the device has been located. As illustrated in FIG. 4.1, each adult family member has a link 406 to prevent his or her computing device 100 from being located in this manner. When that option is selected, the family sharing module 152 transmits a message to the device location server 218, which sets a restriction on the account ID for that family member so that future location requests for that account ID are ignored, until such time as the family member elects to remove the restriction. After selection of the link 406, the family sharing module 152 updates the link to indicate an option to unhide the user's device.

Figure 5:
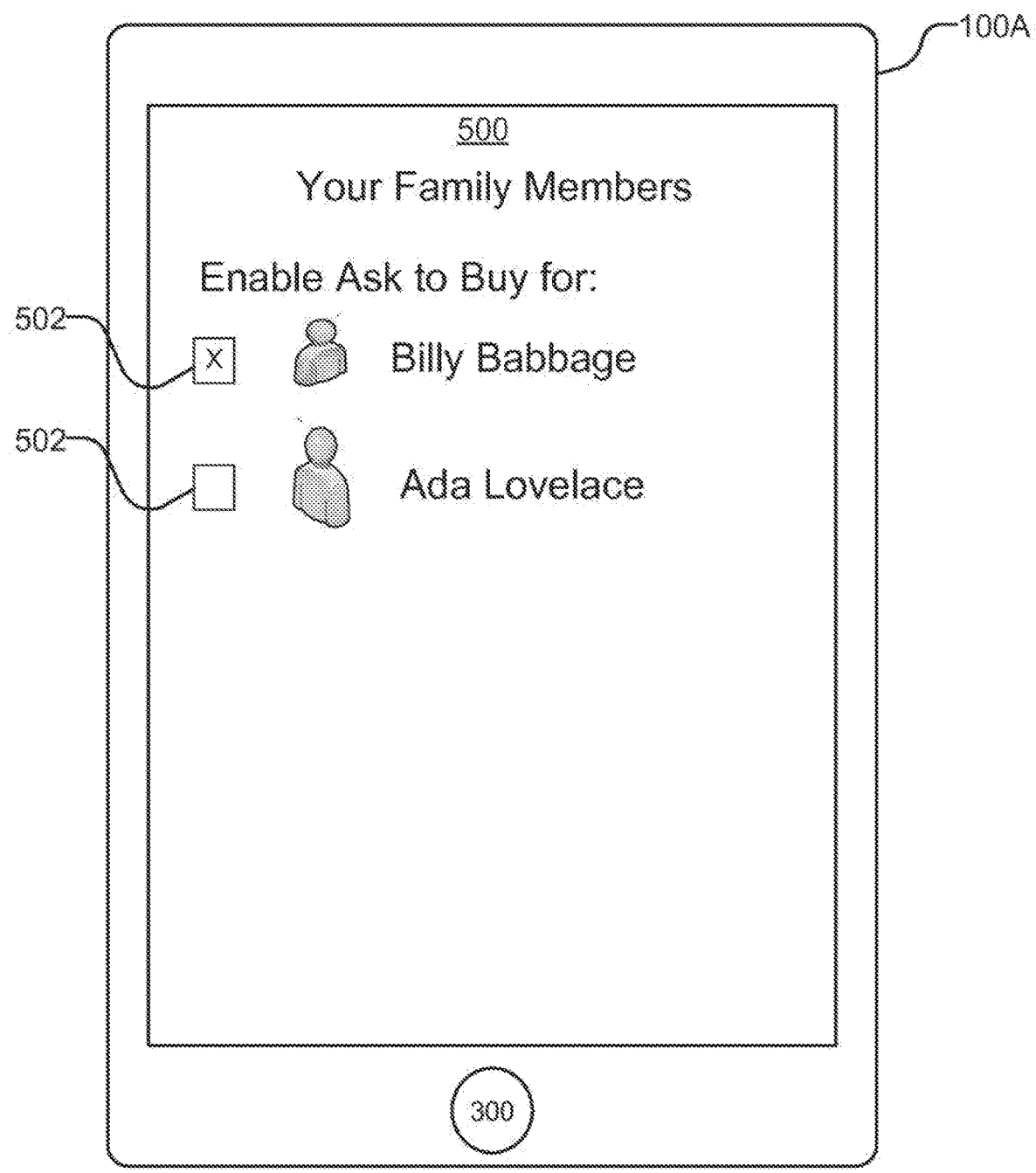
FIG. 5 is an illustration of a screen for configuring a purchase approval process.

Referring to FIG. 5, there is illustrated one embodiment of a screen 500 configured to enable the family organizer to selectively control the application of a real-time purchase approval process for each individual family member. In the illustrated embodiment of FIG. 5, the feature is designated as "Ask to Buy" as shown. Each family member associated with the family account is listed along with a control 502. In the illustrated embodiment, by default the real time purchase approval process is enabled for the accounts of child family members, and disabled for the accounts of adult family members. Generally, the real-time purchase approval process causes a real time notification to be sent to the computing devices 100 of one or more adult family members when a child family members is about to make purchase of digital content from the media server 202, apps server 204, or e-book server 206. The notification provides the adult family member with information identifying the digital content being purchased, and enables that adult family member to approve or decline the purchase (or defer the decision until a later time). This process is synchronous in that the purchase operations started on the computing device 100B of the child family member are dependent for completion on the approval of the adult family member via that member's computing device 100C.

Figure 6A:
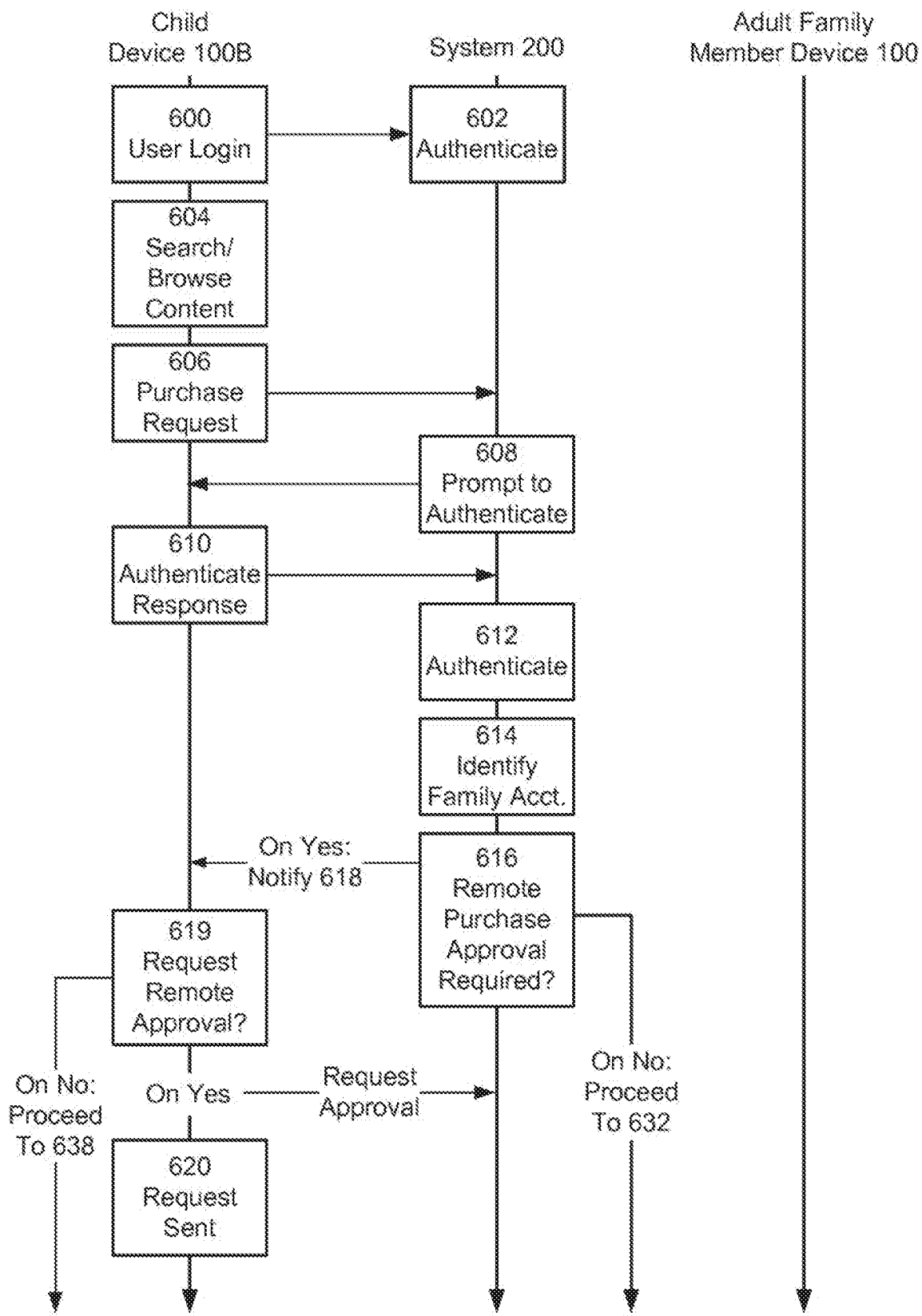
FIGS. 6A-6B are a sequence diagram illustrating the operations for the real-time purchase approval process.
Figure 6B:
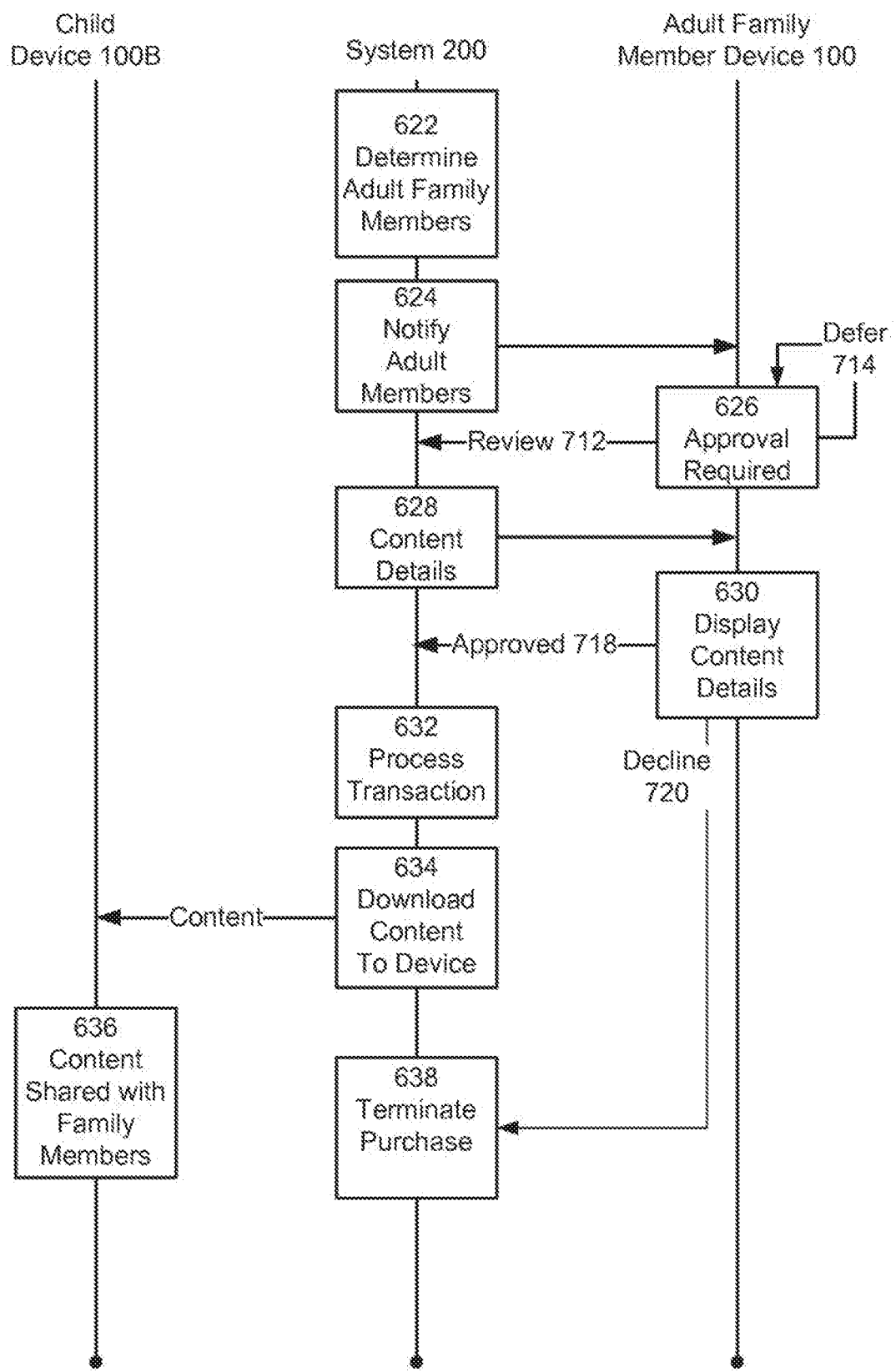

Referring to FIGS. 6A-B, there is shown a diagram illustrating one embodiment of a method for implementing the real-time purchase approval process, in the case of a child family member making a purchase of digital content from the one of the content servers 202, 204, 206 (though the process is applicable as well to any other family member for whom a real time purchase approval is required, such as a teenager). As an initial state, a child family member has logged 600 into the content storage system 200 from their computing device 100B, and has been authenticated 602 by the user account server 208. The child family member can then search and browse 604 for a digital content item (e.g., music, movie, television program, electronic book, computer program, game, etc.) to purchase from one of the content sources, such as the media server 202, app server 204, or e-book server 206. Upon identifying a particular content item of interest, the child family member can make a selection to purchase content item via purchase link 702, as illustrated for example on screen 701 in FIG. 7.1. From the child family member's computing device 100B a purchase request 606 is transmitted to the system 200, for example to the purchase server 210.

The system 200 prompts 608 the child family member to authenticate themselves again using either their account ID or a fingerprint if the computing device 100 supports a fingerprint scanner, or other identification information. The child family member provides an authentication response 610. The system 200 receives and verifies 612 the authentication response using the user account server 208.

The system 200 determines 614 whether a family account is associated with the account ID of the child family member, and further determines 616 whether there a real-time purchase approval process is enabled (as in FIG. 5) for that child family member in the identified family account. The real time purchase approval requirement may be stored as a metadata in the account information for the family account or equivalently in the account information for the user. If there is no family account, or if the real-time purchase approval process is not enabled, then the child family member's purchase is processed 632 (FIG. 6B) for payment.

If the real-time purchase approval process is enabled, then the system 200 transmits 618 a notification to the child family member's computing device 100B indicating the requirement for the purchase approval. The child family member's computing device 100B displays 619 a screen or window indicating that an adult family member is required to approve the purchase of the requested item and prompting the child family member to indicate via a link 704 whether to request such approval, for example from the family organizer or other designated adult family member or decline. An example screen 703 with an overlay 708 is illustrated in FIG. 7.2. The child family member can select the No link 704, which indicating is then transmitted to the system, 200 in which case the purchase process is terminated 638 (FIG. 6B) and the child family member is returned, for example, to a home screen of the content server the child family member was using to make a purchase. Following selection of Yes link 706, the user's computing device 100B transmits to the system 200 an indication that the child family member agrees to have an adult family member approve the purchase. The computing device 100 returns to the previous screen, which is updated 620 to indicate that that a request for permission has been sent, and is awaiting approval by another family member, for example as illustrated by indication 710 on the screen 705 in FIG. 7.3.

In one embodiment, when a child family member requests to purchase 606, the system 200 determines via the content storage server 201 if the item has already been downloaded by another family member, and included in the family account. If so, then the child family member is notified that the content is already available in the family account, for example as illustrated in FIG. 7.3a; the child family member is given a link 711 by which they can immediately access (e.g., play back) the content item.

Referring to FIG. 6B, the system 200 determines 622 from the family account the account IDs and/or email address of all other family members (e.g., the family organizer and other adult family members) who can approve the purchase. The system 200 transmits 624 a message to the computing devices 100 of each of these other family members indicating that approval for a purchase is required.

The family sharing module 152 on each adult family member's computing device 100 receives this message and displays 626 a screen or a banner indicating that the adult family member's approval is required, such as screen 707 illustrated in FIG. 7.4. The screen or banner includes links to different options, including a link 712 to review the request immediately, and a link 714 to defer the review to a later time. Following selection of link 714, the family sharing module 152 closes the screen or banner, sets a timer with a selected amount of time (e.g., 30 minutes) and upon expiration of the timer, displays 626 the screen 707 again (alternative, this timer can be managed by the system 200.) Further, if the request at step 626 is not acted upon by the adult family member in 30 minutes, then the purchase process is terminated; this may be treated by the system 200 as equivalent to the adult family member declining 720 (see below) to review the request. Alternatively, the adult family member can select the amount of time to defer the request.

Following selection of link 712, in one embodiment, the system 200 transmits to the adult family member's computing device 100 the details of the content item that is to purchased, which information is displayed 630 by the computing device, so that the adult family member has sufficient information about the content item, for example as illustrated by screen 709 in FIG. 7.5. The screen 709 includes links for the adult family member to either approve 718 or decline 720 the purchase request. If the adult family member selects the decline link 720, a decline message is sent from the adult family member's computing device 100 to the system 200, which in turn terminates 638 the purchase process; a message can be displayed on the computing device 100B of the child family member indicating that the purchase has not been approved, for example as illustrated in FIG. 7.6.

Following selection of approve link 718, the adult family member's computing device 100 transmits an approval message back to the system 200. In one optional embodiment, following selection of approval link 718, the child family member's computing device 100 display a screen with an input field to receive the credit card authorization code for the purchase account to validate that the user is in fact the adult family member; alternatively, the input may be the user's account password, or other credentials not know to the child family member. The system receives the approval message (and optional authorization information), and using the purchase server 210, proceeds to process 632 the transaction, including authorization of payment using the purchase account associated with the family account. Upon authorization of payment, the content item is downloaded 634 by the download server 212 to the user's computing device 100B. Optionally, the user's computing device 100B receives a message indicating the purchase has been approved, such as illustrated in FIG. 7.7. The content is also shared 636 with other family members, as determined by the account settings in the family account.

In another embodiment, following selection of Yes link 706, the system 200 transmits to the user's computing device 100 a message indicating that the child family member can request permission for the purchase in person, for example by selecting link 722 in banner 724 in FIG. 7.8. This beneficially enables the user, such as a child family member, to immediately obtain approval from an available, adult family member who may be nearby, rather than waiting. In this embodiment, following selection of link 722, the system 200 via computing device 100 provides a selection link 726 for each family member who can approve the purchase, for example as illustrated on screen 713 in FIG. 7.9. Following selection of the link 726 for one of the family members, the user's computing device 100 prompts for an authorization input, such as the password of the identified family member, for example as illustrated by screen 715 in FIG. 7.10; in another embodiment the authorization input is the credit card verification code for the purchase account. The child family member would then hand his or her computing device 100 to the adult family member, who would then input the authorization input, such as their password or credit card verification code. Following input of the authorization input, the family sharing module 152 transmits the password to the system 200, which passes the information to the user account server 208 to authenticate the adult family member. Following an indication from the server 208 that the adult family member has been authenticated, the purchase server 210 proceeds to process the transaction, including authorization of payment using the purchase account associated with the family account. Upon authorization of payment, the content item is downloaded by the download server 212 to the user's computing device. If the authorization input is not authenticated, then the purchase is terminated, and the content is not downloaded to the child family member's computing device 100B.

The disclosure herein has been described in particular detail with respect to one possible embodiment. Those of skill in the art will appreciate that other embodiments may be practiced. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the embodiments disclosed herein include process steps and instructions described herein in the form of an algorithm. It should be noted that the process steps and instructions could be embodied in software, firmware or hardware, and when embodied in software, could be downloaded to reside on and be operated from different platforms used by real time network operating systems.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The embodiments disclosed herein are well suited to a wide variety of computer network systems over numerous topologies. Within this field, the configuration and management of large networks includes storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure herein is intended to be illustrative, but not limiting, of the scope of the invention, which is set forth in the following claims.

What is claimed is:

1. A method, comprising:
at an electronic device in communication with a display device and one or more input devices:
displaying, via the display device, a first screen to initiate setup of a family account at an online content storage system that is to be shared between family members;
responsive to an input, via the one or more input devices, on the first screen initiating setup of the family account, initiating setup of the family account, wherein performing setup of the family account includes:
displaying, via the display device, an identifier of a family organizer and an indication of a source account of the family organizer with the online content storage system to be used as the family account, wherein the source account of the family organizer is already established with the online content storage system when the setup of the family account is initiated;
displaying, via the display device, at least one account to be selected as a purchase account for the family account, wherein purchases of content items by any family member having access to the family account are stored on the online content storage system in association with the family account, and can be accessed by any other family member having access to the family account, and wherein the at least one account to be selected as the purchase account for the family account is already established with the online content storage system when the setup of the family account is initiated;

responsive to receiving an input, via the one or more input devices, selecting an account as the purchase account, displaying, via the display device, credit card information associated with the purchase account;

responsive to receiving an input, via the one or more input devices, confirming the credit card information, sending to the online content storage system an indication to associate the credit card information for the purchase account with the family account;

displaying, via the display device, a list of family members having access to the family account, an indication of the credit card information associated with the family account, and a user interface element to add a family member to the family account, wherein the family member to be added to the family account has a corresponding account that is already established with the online content storage system when the setup of the family account is initiated; and responsive to receiving an input at the user interface element, via the one or more input devices, to add the family member to the family account, initiating a process to send an electronic message, associated with adding the family member to the family account, to an electronic mailing address of the family member to be added to the family account.

2. The method of claim 1, further comprising:
determining an account to which the family organizer is currently logged in, and preselecting as the purchase account the currently logged in account of the family organizer.

3. The method of claim 1, wherein displaying the credit card information comprises requesting from the online content storage system the credit card information associated with the purchase account.

4. The method of claim 1, further comprising displaying, via the display device, a user interface element to create an account identifier for a child family member on the online content storage system.

5. The method of claim 4, further comprising:
responsive to selection, via the one or more input devices, of the user interface element to create the account identifier for the child family member:
displaying, via the display device, an input field for receiving credit card verification information for the credit card information associated with the family account;
responsive to receiving an input, via the one or more input devices, that matches an actual credit card verification information of the credit card information associated with the family account, proceeding with the creation of the account identifier of the account for the child family member, including displaying, via the display device, one or more input fields for receiving identification information for the child family member; and responsive to receiving an input that does not match the actual credit card verification information of the credit card information associated with the family account, terminating the creation of the account identifier of the account for the child family member, and displaying, via the display device, a list of family members having access to the family account, wherein the list of family members does not include the family child member.

6. The method of claim 1, further comprising:
receiving, via the one or more input devices, a user name as an account identifier for a new account of a child family member;
providing the user name to the online content storage system creating the new account of the child family member;
receiving from the online content storage system an account identifier for the child family member, wherein the account identifier operates as a messaging address of the child family member with the online content storage system; and
displaying, via the display device, the account identifier for the child family member.

7. The method of claim 1, further comprising:
displaying, via the display device, a control for receiving an input selectively enabling the online content storage system to transmit to an adult family member associated with the family account, prior to a purchase of content by a child family member, a message indicating the content being purchased by the child family member and indicating that the adult family member has an option to approve the purchase prior to the purchase being processed and the content being transmitted to a computing device of the child family member.

8. An electronic device comprising:
one or more input devices;
one or more processors; and
memory storing instructions, which when executed by the one or more processors, cause the electronic device to perform a method comprising:
displaying, via a display device, a first screen to initiate setup of a family account at an online content storage system that is to be shared between family members;
responsive to an input, via the one or more input devices, on the first screen initiating setup of the family account, initiating setup of the family account, wherein performing setup of the family account includes:
displaying, via the display device, an identifier of a family organizer and an indication of a source account of the family organizer with the online content storage system to be used as the family account, wherein the source account of the family organizer is already established with the online content storage system when the setup of the family account is initiated;
displaying, via the display device, at least one account to be selected as a purchase account for the family account, wherein purchases of content items by any family member having access to the family account are stored on the online content storage system in association with the family account, and can be accessed by any other family member having access to the family account, and wherein the at least one account to be selected as the purchase account for the family account is already established with the online content storage system when the setup of the family account is initiated;

responsive to receiving an input, via the one or more input devices, selecting an account as the purchase account, displaying, via the display device, credit card information associated with the purchase account;

responsive to receiving an input, via the one or more input devices, confirming the credit card information, sending to the online content storage system an indication to associate the credit card information for the purchase account with the family account;

displaying, via the display device, a list of family members having access to the family account, an indication of the credit card information associated with the family account, and a user interface element to add a family member to the family account, wherein the family member to be added to the family account has a corresponding account that is already established with the online content storage system when the setup of the family account is initiated; and responsive to receiving an input at the user interface element, via the one or more input devices, to add the family member to the family account, initiating a process to send an electronic message, associated with adding the family member to the family account, to an electronic mailing address of the family member to be added to the family account.

9. A non-transitory computer-readable storage medium storing instructions, which when executed by one or more processors of an electronic device, cause the electronic device to perform a method comprising:

displaying, via a display device, a first screen to initiate setup of a family account at an online content storage system that is to be shared between family members;

responsive to an input, via one or more input devices, on the first screen initiating setup of the family account, initiating setup of the family account, wherein performing setup of the family account includes:

displaying, via the display device, an identifier of a family organizer and an indication of a source account of the family organizer with the online content storage system to be used as the family account, wherein the source account of the family organizer is already established with the online content storage system when the setup of the family account is initiated;

displaying, via the display device, at least one account to be selected as a purchase account for the family account, wherein purchases of content items by any family member having access to the family account are stored on the online content storage system in association with the family account, and can be accessed by any other family member having access to the family account, and wherein the at least one account to be selected as the purchase account for the family account is already established with the online content storage system when the setup of the family account is initiated;

responsive to receiving an input, via the one or more input devices, selecting an account as the purchase account, displaying, via the display device, credit card information associated with the purchase account;

responsive to receiving an input, via the one or more input devices, confirming the credit card information, sending to the online content storage system an indication to associate the credit card information for the purchase account with the family account;

displaying, via the display device, a list of family members having access to the family account, an indication of the credit card information associated with the family account, and a user interface element to add a family member to the family account, wherein the family member to be added to the family account has a corresponding account that is already established with the online content storage system when the setup of the family account is initiated; and responsive to receiving an input at the user interface element, via the one or more input devices, to add the family member to the family account, initiating a process to send an electronic message, associated with adding the family member to the family account, to an electronic mailing address of the family member to be added to the family account.

* * * * *